US012361885B2

(12) United States Patent
Tanaka et al.

(10) Patent No.: US 12,361,885 B2
(45) Date of Patent: Jul. 15, 2025

(54) DISPLAY DEVICE AND METHOD FOR DRIVING SAME

(71) Applicant: Sharp Display Technology Corporation, Kameyama (JP)

(72) Inventors: Kohhei Tanaka, Kameyama (JP); Masahito Sano, Kameyama (JP); Kaoru Yamamoto, Kameyama (JP); Ryo Yonebayashi, Kameyama (JP); Adnan Heganovic, Oxford (GB)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/683,526

(22) PCT Filed: Sep. 30, 2021

(86) PCT No.: PCT/JP2021/036098
§ 371 (c)(1),
(2) Date: Feb. 14, 2024

(87) PCT Pub. No.: WO2023/053328
PCT Pub. Date: Apr. 6, 2023

(65) Prior Publication Data

US 2024/0355287 A1 Oct. 24, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/06* (2013.01); *G09G 2320/0247* (2013.01); *G09G 2330/02* (2013.01)

(58) Field of Classification Search
CPC .................................................... G09G 3/3233
See application file for complete search history.

(56) References Cited

U.S. PATENT DOCUMENTS

2019/0057646 A1 2/2019 Lin et al.
2020/0118487 A1* 4/2020 Kim .................... G09G 3/3225

* cited by examiner

*Primary Examiner* — Nan-Ying Yang
(74) *Attorney, Agent, or Firm* — Keating & Bennett, LLP

(57) ABSTRACT

When a current-driven display device with an internal compensation method operates in a pause driving mode, a non-light emission period according to a light emission duty is provided in both a refresh frame period and a non-refresh frame period, and an on-bias applying period for applying on-bias to a drive transistor in a pixel circuit is provided in both the non-light emission periods. In the non-light emission period in the refresh frame period, an on-bias applying period is provided in a period from when data writing with threshold compensation is performed to when the light emission period starts. Thus, even when the light emission duty is low, the difference in the stress state of the drive transistor between the refresh frame period and the non-refresh frame period is reduced.

20 Claims, 26 Drawing Sheets

DISPLAY DEVICE AND METHOD FOR DRIVING SAME

TECHNICAL FIELD

The present disclosure relates to a display device, and more particularly to a current-driven display device including a display element driven by a current, such as an organic electro luminescence (EL) element, and a driving method for the display device.

BACKGROUND ART

The last few years have seen the implementation of organic EL display devices provided with a pixel circuit including organic EL elements (also referred to as organic light-emitting diodes (OLEDs)). The pixel circuit in such an organic EL display device includes a drive transistor, a write control transistor, and a holding capacitor in addition to the organic EL elements. A thin film transistor is used for the drive transistor and the write control transistor. The holding capacitor is connected to a gate terminal that serves as a control terminal of the drive transistor. A voltage corresponding to an image signal representing an image to be displayed (more specifically, a voltage indicating the gradation values of pixels to be formed by the pixel circuit) is applied as data voltage to the holding capacitor from the drive circuit via a data signal line. The organic EL element is a self-luminous display element that emits light with luminance according to an electric current flowing through the organic EL element. The drive transistor is connected to the organic EL element in series and controls the electric current passing through the organic EL element according to a voltage held by the holding capacitor.

Variation and shift occur in characteristics of the organic EL element and the drive transistor. Thus, variation and shift in characteristics of these elements need to be compensated in order to perform higher image quality display in the organic EL display device. For the organic EL display device, a method for compensating the characteristics of the elements inside the pixel circuits and a method for compensating the characteristics of the elements outside the pixel circuits are known. One known pixel circuit corresponding to the former method is a pixel circuit configured to charge the holding capacitor with the data voltage via the drive transistor in a diode-connected state after initializing voltage at the gate terminal of the drive transistor, that is, the voltage held in the holding capacitor. In such a pixel circuit, variation and shift of the threshold voltage in the drive transistor are compensated for within the pixel circuit (hereinafter, the compensation of variation and shift of such a threshold voltage is referred to as "threshold compensation" and the method of performing threshold compensation within the pixel circuit in this manner is referred to as the "internal compensation method").

Also, a display device configured to perform pause driving is a known display device with low power consumption. Pause driving is a driving method referred to as "intermittent driving" or "low-frequency driving", in which a drive period (refresh period) and a pause period (non-refresh period) are provided when the same image is continuously displayed. In pause driving, a drive circuit is operated during the drive period and operations of the drive circuit are paused during the pause period. Pause driving can be used when the off-leak current of the transistor in the pixel circuit is small.

CITATION LIST

Patent Literature

PTL 1: US 2019/0057646 A

SUMMARY

Technical Problem

When the organic EL display device performs pause driving, in the drive period, the organic EL element in each pixel circuit is kept off by a light emission control transistor during a non-light emission period provided in each frame period, and in the pause period, the operations of the drive circuit are stopped, and light is continuously emitted at a luminance corresponding to the data voltage written in the previous drive period. In general, the pause period is much longer than the drive period (the drive period includes 1 or a few frame periods and the pause period includes tens of frame periods), and a pause driving method organic EL display device alternates between the drive period and the pause period when activated. For this reason, when performing pause driving, turning off of the organic EL elements within the drive period may be noticeable as a flicker.

Regarding this, in PTL 1 (US 2019/0057646 A), a pixel circuit and a driving method for the same are described. To remove noticeable flicker when performing pause driving (low-frequency driving), the pixel circuit is configured such that a decrease in luminance occurs at an appropriate frequency in a pause period (extended blanking period T_blank) in addition to a decrease in luminance being caused by an organic EL element (light-emitting diode 304) turning off in the drive period (data refresh period T_refrech) (see paragraphs 0049 to 0052 and FIGS. 8A, 8B, 9A, and 9B).

However, even with a configuration in which a decrease in luminance occurs at an appropriate frequency in the pause period (hereinafter, such a configuration is referred to as a "periodic turn-off configuration"), because the thin film transistor functioning as the drive transistor in the pixel circuit has a hysteresis characteristic, flicker remains noticeable at low-frequency driving (pause driving). That is, in this periodic turn-off configuration, the voltage stress applied to the thin film transistor functioning as the drive transistor is different between the drive period and the pause period, so that the turn-off waveform is slightly different between the drive period and the pause period due to the hysteresis characteristic of the drive transistor, which causes a noticeable flicker.

On the other hand, PTL 1 describes that a bias stress voltage (hereinafter referred to as "on-bias stress voltage" or simply "bias voltage") is intentionally applied to the drive transistor not only in the drive period (data refresh period T_refrech) but also in the pause period (extended blanking period T_blank) to balance the effects of the hysteresis characteristics (on the luminance of the organic EL element) (see FIG. 5 and FIG. 10 and paragraph 0053 of PTL 1). With this configuration, it is possible to suppress flicker caused by the hysteresis characteristics of the drive transistor even in low-frequency driving.

However, it has been confirmed by the inventors of the present application that even if an on-bias stress voltage is applied (hereinafter also referred to as "on-bias application") in both the drive period and the pause period, the flicker cannot be sufficiently suppressed in a case where the light emission duty, which is the ratio of the light emission period to the non-light emission period, is small (in the case of a low luminance setting).

Thus, there is a demand for a current-driven display device such as an organic EL display device with a good display without noticeable flicker even when pause driving is performed and light emission duty is set low.

Solution to Problem

A display device according to some embodiments of the disclosure includes:

a display portion including a plurality of pixel circuits:

a drive circuit configured to drive the plurality of pixel circuits; and a display control circuit configured to control the drive circuit in such a manner that a drive period and a pause period alternately appear, the drive period consisting of one or more refresh frame periods in which voltage of a plurality of data signals is written, as data voltage, to the plurality of pixel circuits, the pause period consisting of one or more non-refresh frame periods in which writing of data voltage to the plurality of pixel circuits is stopped.

In the display device, each pixel circuit of the plurality of pixel circuits includes a display element configured to be driven by a current, a drive transistor provided in series with the display element and including a control terminal, a first conduction terminal, and a second conduction terminal, a holding capacitor having one terminal connected to the control terminal of the drive transistor and thus being configured to hold a voltage of the control terminal of the drive transistor, a write control transistor, as a switching element, having a first conduction terminal configured to receive a data voltage to be written to the holding capacitor and a second conduction terminal connected to the first conduction terminal of the drive transistor, a threshold compensation transistor, as a switching element, provided between the second conduction terminal and the control terminal of the drive transistor, the threshold compensation transistor being configured to put the drive transistor in a diode-connected state when in ON state, at least one light emission control transistor, as a switching element, provided in series with the display element and the drive transistor, and a bias applying circuit configured to apply, to the drive transistor, a bias voltage for reducing threshold voltage shift caused by a hysteresis characteristic of the drive transistor, the bias applying circuit has a first terminal configured to receive the bias voltage or a signal for generating the bias voltage and a second terminal connected to the first conduction terminal of the drive transistor, and the display control circuit is configured to control the drive circuit in such a manner that the drive circuit causes the light emission control transistor to be turned on and off and thus the display element emits light at a predetermined light emission duty in the drive period and the display element emits light at a predetermined light emission duty in the pause period, and, in both the drive period and the pause period, the bias voltage is applied to the first conduction terminal of the drive transistor in a period during which the light emission control transistor is in OFF state for the each pixel circuit, and configured to control the drive circuit in such a manner that, in the drive period, in the each pixel circuit, in a period during which the light emission control transistor is in OFF state, the write control transistor and the threshold compensation transistor are put in ON state for a predetermined period, and during a bias period provided from when the threshold compensation transistor changes to OFF state to when the light emission control transistor changes to ON state, the bias applying circuit applies the bias voltage, based on a voltage or signal received at the first terminal, to the first conduction terminal of the drive transistor.

A method for driving according to some other embodiments of the disclosure is a method for driving a display device using a display element driven by a current, the display device including a display portion including a plurality of pixel circuits, each pixel circuit of the plurality of pixel circuits including a display element configured to be driven by a current, a drive transistor provided in series with the display element and having a control terminal, a first conduction terminal, and a second conduction terminal, a holding capacitor having one terminal connected to the control terminal of the drive transistor and thus being configured to hold a voltage of the control terminal of the drive transistor, a write control transistor, as a switching element, having a first conduction terminal configured to receive a data voltage to be written to the holding capacitor and a second conduction terminal connected to the first conduction terminal of the drive transistor, a threshold compensation transistor, as a switching element, provided between the second conduction terminal and the control terminal of the drive transistor, the threshold compensation transistor being configured to put the drive transistor in a diode-connected state when in ON state, at least one light emission control transistor, as a switching element, provided in series with the display element and the drive transistor, and a bias applying circuit configured to apply, to the first conduction terminal of the drive transistor, a bias voltage for reducing threshold voltage shift caused by a hysteresis characteristic of the drive transistor, the method including:

pause driving in which the plurality of pixel circuits is driven in such a manner that a drive period and a pause period alternately appear, the drive period consisting of one or more refresh frame periods in which voltage of a plurality of data signals is written, as data voltage, to the plurality of pixel circuits, the pause period consisting of one or more non-refresh frame periods in which writing of data voltage to the plurality of pixel circuits is stopped, the pause driving including performing light emission control to turn the light emission control transistor on and off in such a manner that the display element emits light at a predetermined light emission duty in the drive period and the display element emits light at a predetermined light emission duty in the pause period; and performing bias application to drive the plurality of pixel circuits in such a manner that, in both the drive period and the pause period, in the each pixel circuit, the bias voltage is applied to the first conduction terminal of the drive transistor in a period during which the light emission control transistor is in OFF state, wherein the bias application includes drive period bias application to drive the plurality of pixel circuits in such a manner that, in the drive period, in the each pixel circuit, in a period during which the light emission control transistor is in OFF state, the write control transistor and the threshold compensation transistor are put in ON state for a predetermined period, and during a bias period provided from when the threshold compensation transistor changes to OFF state to when the light emission control transistor changes to ON state, the bias applying circuit applies the bias voltage to the first conduction terminal of the drive transistor.

Advantageous Effects

According to some embodiments of the disclosure, in the internal compensation method display device including a pixel circuit including a display element driven by the current, a drive transistor, a write control transistor, a threshold compensation transistor, a light emission control transistor, and a holding capacitor, each pixel circuit further includes a bias applying circuit for applying a bias voltage for reducing a threshold voltage shift caused by the hysteresis characteristics of the drive transistor to a first conduction terminal of the drive transistor. In this display device, in a case where a drive period consisting of a refresh frame period and a pause period consisting of a non-refresh frame period alternately appear when performing pause driving, each pixel circuit is driven such that the display element emits light at a predetermined light emission duty in the drive period and the display element emits light at a predetermined light emission duty in the pause period, and in each pixel circuit, the bias voltage is applied to the first conduction terminal of the drive transistor in a period (non-light emission period) during which the light emission control transistor is in OFF state in both the drive period and the pause period. When driving each pixel circuit in this manner, in the drive period, for each pixel circuit, the write control transistor and the threshold compensation transistor are put in ON state for a predetermined period within a period during which the light emission control transistor is in OFF state. Thus, data voltage writing with threshold compensation is performed, and thereafter, the bias voltage is applied to the first conduction terminal of the drive transistor during the bias period provided in a period from when the threshold compensation transistor changes to OFF state to when the light emission control transistor changes to ON state. Accordingly, even when performing pause driving at a low light emission duty in an internal compensation method display device, the difference in the stress state of the drive transistor between the refresh frame period and the non-refresh frame period is reduced. As a result, the luminance difference between the refresh frame period and the non-refresh frame period is reduced and flicker is not noticeable. That is, according to some embodiments, it is possible to obtain a flicker suppression effect that does not depend on the light emission duty in a case where pause driving is performed.

DESCRIPTION OF EMBODIMENTS

0. Basic Study

Before describing the embodiments, a basic study made by the inventors of the present application to solve the above-described problem will be described.

Figure 1:
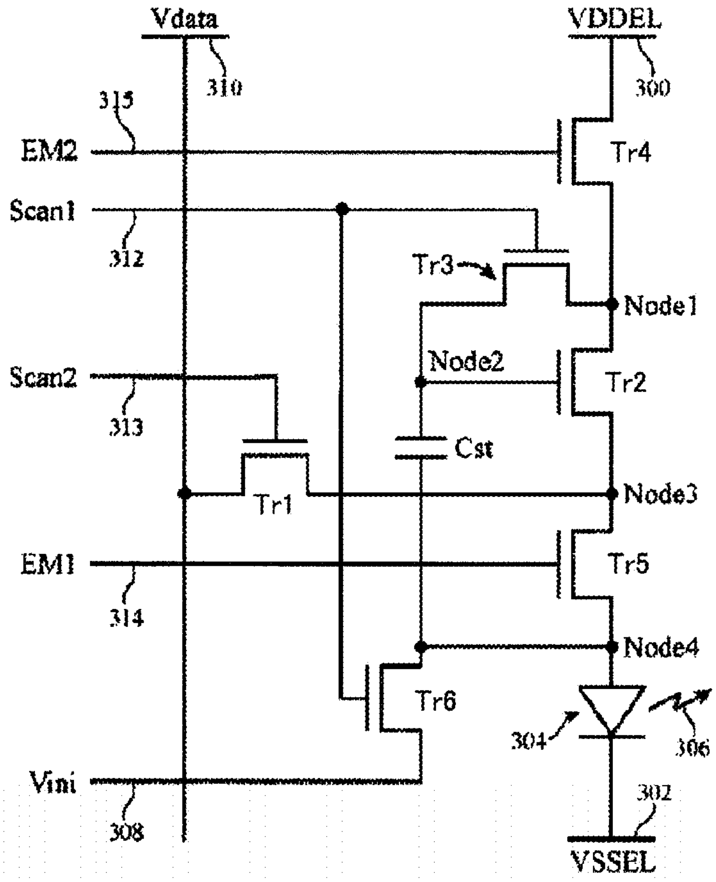
FIG. 1 is a circuit diagram illustrating an example of a pixel circuit in an organic EL display device.

As a pixel circuit of an internal compensation method organic EL display device (OLED display device), for example, a pixel circuit configured as illustrated in FIG. 1 is known (see PTL 1). The pixel circuit includes an organic EL element (OLED) 304, N-channel thin film transistors Tr1 to Tr7 (hereinafter, thin film transistor Trk is referred to as a "k-th transistor") (k=1 to 7), and a holding capacitor Cst, and the pixel circuit is provided with a voltage Vdata corresponding to data voltage, scanning control signals Scan1 and Scan2, light emission control signals EM1 and EM2, an initialization voltage Vini, a high-level power source voltage VDDEL, and a low-level power source voltage VSSEL as illustrated in FIG. 1. In this pixel circuit, the transistor Tr2 is a drive transistor that controls the current flowing through the organic EL element 304 in accordance with the holding voltage of the holding capacitor Cst during the light emission period.

Figure 2:
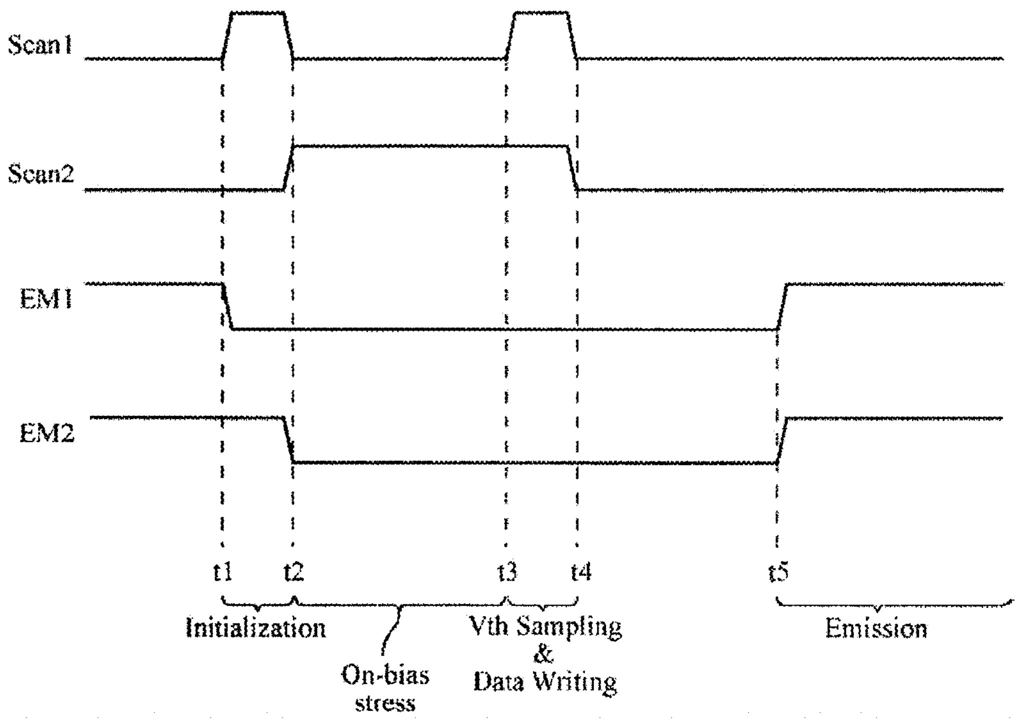
FIG. 2 is a timing chart for describing applying an on-bias voltage in a refresh period in the pixel circuit illustrated in FIG. 1.

FIG. 2 is a timing chart illustrating changes in the scanning control signals Scan1 and Scan2 and the light emission control signals EM1 and EM2 provided to the pixel circuit in a refresh frame period. Due to such signal change, the pixel circuit operates as follows in the refresh frame period. Hereinafter, the operation of the pixel circuit in the refresh frame period will be described with reference to FIG. 2.

At time t1, the transistor Tr5 changes from ON state to OFF state to start the non-light emission period, and the non-light emission period continues until time t5 described later. In an initialization period t1 to t2, which is the period from time t1 to time t2 in the non-light emission period t1 to t5, the transistors Tr3, Tr4, and Tr6 and are in ON state, and the transistors Tr1 and Tr5 are in OFF state. Accordingly, the high-level power source voltage VDDEL and the initialization voltage Vini are provided to one end (Node2) and the other end of the holding capacitor Cst, respectively, and the voltage VDDEL-Vini is held in the holding capacitor Cst at time t2.

At time t2, the transistors Tr3, Tr4, and Tr6 change to OFF state, and the transistor Tr1 changes to ON state. During an on-bias period, which is the period from time t2 to time t3, the transistors Tr3, Tr4, and Tr6 remain in OFF state, and the voltage of the signal line transmitting the voltage Vdata is applied to the source terminal (Node3) of the drive transistor Tr2 via the transistor Tr1 as an on-bias voltage Vob. Accordingly, during the on-bias period t2 to t3, a voltage stress corresponding to the difference between the voltage of one end (Node2) of the holding capacitor Cst and the on-bias voltage Vob (voltage applied to Node3 via the transistor Tr1) is applied across the gate and the source of the drive transistor Tr2.

At time t3, when the transistor Tr3 is turned on, and thus the drive transistor Tr2 is put in a diode-connected state, and the voltage Vdata is provided to one end of the holding capacitor Cst via the transistor Tr1 and the drive transistor Tr2 in the diode-connected state. This state continues during a compensation/writing period t3 to t4, which is the period from time t3 to time t4. At time t4, the voltage Vdata+Vth−Vini is held in the holding capacitor Cst, and a gate-source voltage Vgs of the drive transistor Tr2 is equal to a threshold voltage Vth (>0) of the drive transistor Tr2.

At time t4, the transistors Tr1, Tr3, and Tr6 change to OFF state, and thereafter remain in OFF state. On the other hand, the transistors T4 and T5 remain unchanged in OFF state and remain in OFF state until time t5. Accordingly, during the period from time t4 to time t5, the gate-source voltage Vgs of the drive transistor Tr2 maintained to be equal to the threshold voltage Vth of the drive transistor Tr2.

At time t5, the transistors Tr4 and Tr5 change to ON state. After time t5, the transistors Tr4 and Tr5 remain in ON state, the transistors Tr1, Tr3, and Tr6 remain unchanged in OFF state, a current corresponding to the voltage held in the holding capacitor Cst flows through the organic EL element 304, and the organic EL element 304 emits light at a luminance corresponding to the current.

Figure 3:
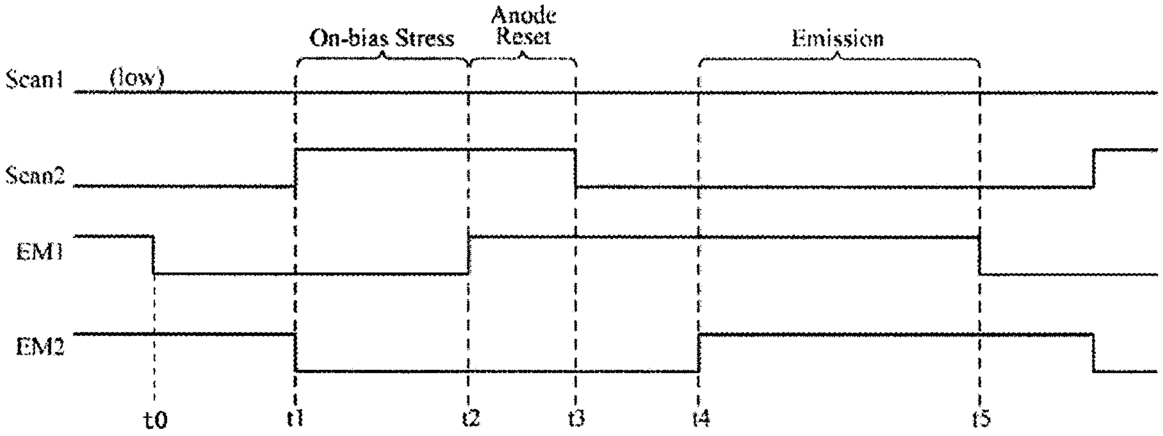
FIG. 3 is a timing chart for describing applying an on-bias voltage in a non-refresh period in the pixel circuit illustrated in FIG. 1.

FIG. 3 is a timing chart illustrating changes in the scanning control signals Scan1 and Scan2 and the light emission control signals EM1 and EM2 provided to the pixel circuit in a non-refresh frame period. Due to such signal change, the pixel circuit operates as follows in the non-refresh frame period. Hereinafter, the operation of the pixel circuit in the non-refresh frame period will be described with reference to FIG. 3.

Also, in the non-refresh frame period, a non-light emission period is provided as in the refresh frame period. In the example illustrated in FIG. 3, at time to, the transistor Tr5 changes from ON state to OFF state to start the non-light emission period, and the non-light emission period continues until time t4 described later. In an on-bias period t1 to t2, which is the period from time t1 to time t2 of the non-light emission period t0 to t4, the transistors Tr3, Tr4, and Tr6 remain in OFF state, and the voltage of the signal line transmitting the voltage Vdata is applied to the source terminal (Node3) of the drive transistor Tr2 as an on-bias voltage Vob. Accordingly, during the on-bias period t2 to t3, a voltage stress corresponding to the difference between the voltage of one end (Node2) of the holding capacitor Cst and the on-bias voltage Vob (voltage applied to Node3 via the transistor Tr1) is applied across the gate and the source of the drive transistor Tr2.

At time t2, the transistor Tr5 changes to ON state, and the voltage of the signal line transmitting the voltage Vdata is provided to the anode of the organic EL element 304 as the anode initialization voltage. The anode initialization voltage is continually applied to the anode of the organic EL element 304 until the transistor Tr1 changes to OFF state at time t3. That is, the period from time t2 to time t3 is the anode initialization period.

At time t3, the transistor Tr1 changes to OFF state, the transistors Tr3 and Tr4 remain in OFF state, and the transistor Tr5 remains in ON state. Thereafter, until time t5, the transistors Tr1, Tr3, and Tr4 are in OFF state and the transistor Tr5 is in ON state. During the period t3 to t4, the voltage held in the holding capacitor Cst is applied across the gate and the source of the drive transistor Tr2, and this corresponds to a voltage stress to the drive transistor Tr2.

At time t4, the transistor Tr4 changes to ON state, the transistor Tr5 remains in ON state, and the transistors Tr1, Tr3, and Tr6 remain in OFF state. In this manner, a current corresponding to the voltage held in the holding capacitor Cst flows through the organic EL element 304, and the organic EL element 304 emits light at a luminance corresponding to the current. This light emission state continues until the transistor Tr5 changes to OFF state at time t5. That is, the period from time t4 to time t5 is a light emission period. During the light emission period t4 to t5 also, the voltage held in the holding capacitor Cst is applied across the gate and the source of the drive transistor Tr2, and this corresponds to a voltage stress to the drive transistor Tr2.

Figure 4:
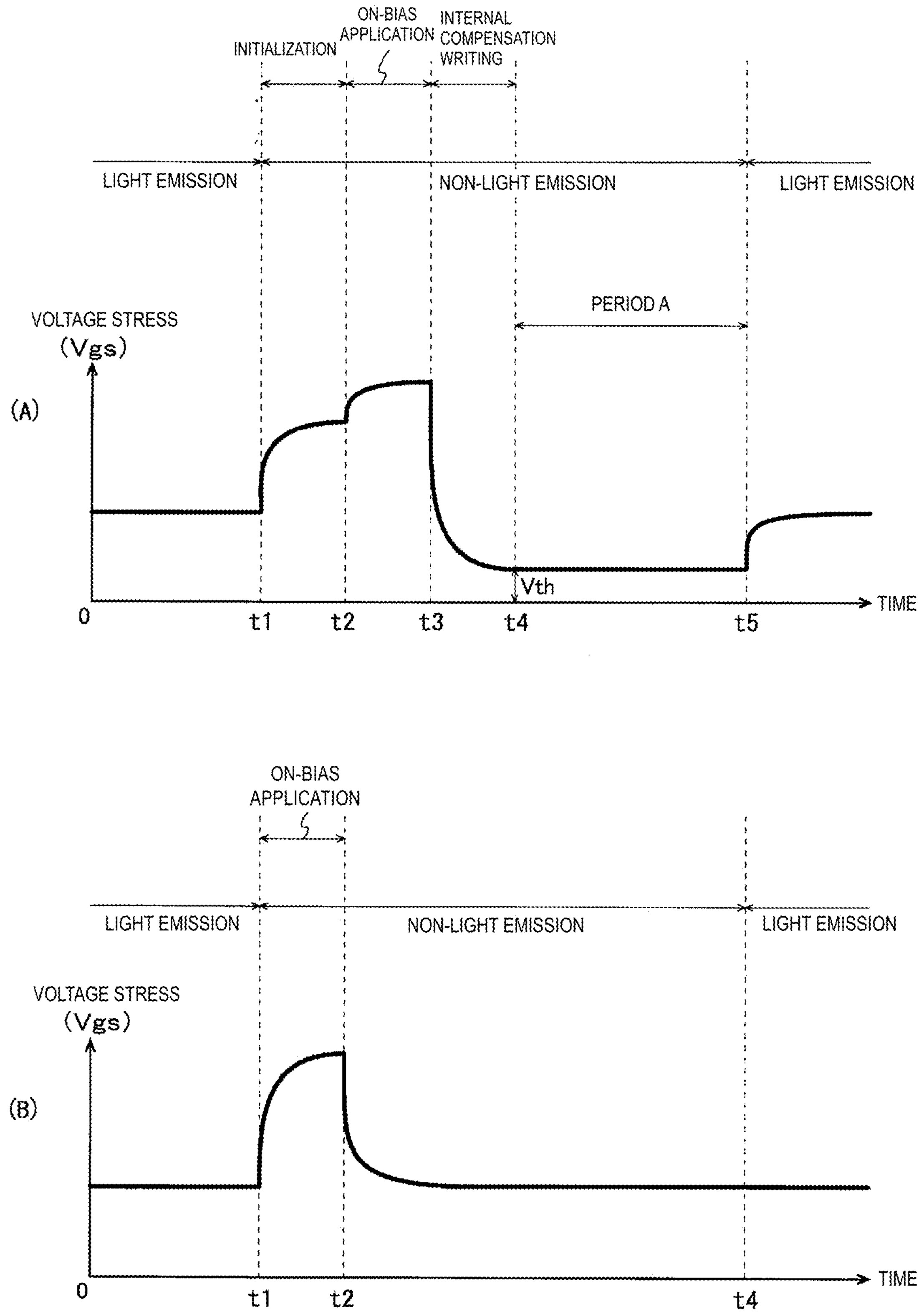
FIG. 4 is waveform diagrams (A, B) for describing a problem caused by the hysteresis characteristics of a drive transistor in the pixel circuit illustrated in FIG. 1 when the light emission duty is low.

FIG. 4 is waveform diagrams for describing a problem caused by the hysteresis characteristics of the drive transistor in the pixel circuit illustrated in FIG. 1 when the light emission duty is low. (A) of FIG. 4 illustrates the voltage Vgs across the gate and the source of the drive transistor Tr2 in the refresh frame period as the voltage stress applied to the drive transistor Tr2, and (B) of FIG. 4 illustrates the voltage Vgs across the gate and the source of the drive transistor Tr2 in the non-refresh frame period as the voltage stress applied to the drive transistor Tr2.

In the refresh frame period, the scanning control signals Scan1 and Scan2 and the light emission control signals EM1 and EM2 change as illustrated in FIG. 2, causing the pixel circuit illustrated in FIG. 1 to operate as described above, whereby the voltage stress (Vgs) applied to the drive transistor Tr2 changes as illustrated in (A) of FIG. 4. That is, based on the above-described operation in the refresh frame period, in the light emission period, the voltage held in the holding capacitor Cst is applied to the drive transistor Tr2 as the voltage stress (Vgs), and, in the initialization period t1 to t2, the high-level power source voltage VDDEL is applied to the gate terminal (Node2) of the drive transistor Tr2 to initialize the holding capacitor Cst, thus increasing the voltage stress (Vgs) applied to the drive transistor Tr2.

In the subsequent on-bias period t2 to t3, the voltage of the signal line that transmits the voltage Vdata is applied as the on-bias voltage Vob to the source terminal (Node3) of the drive transistor Tr2 via the transistor Tr1, thus further increasing the voltage stress (Vgs) applied to the drive transistor Tr2.

In the subsequent compensation/writing period t3 to t4, the voltage Vdata is written to the holding capacitor Cst via the drive transistor Tr2 in the diode-connected state, and the voltage stress (Vgs) applied to the drive transistor Tr2 becomes equal to the threshold voltage Vth of the drive transistor Tr2. Thereafter, during the period from time t4 to time t5 (hereinafter referred to as "period A"), the transistors Tr1 and Tr3 to Tr6 are in OFF state, and the voltage stress (Vgs) applied to the drive transistor Tr2 remains at the threshold voltage Vth.

At time t5, the light emission period starts again, and the voltage held in the holding capacitor Cst by the writing of the voltage Vdata in the compensation/writing period t3 to t4 is applied to the drive transistor Tr2 as the voltage stress (Vgs).

In this manner, in the refresh frame period, as illustrated in (A) of FIG. 4, a relatively large voltage stress (Vgs) is applied to the drive transistor Tr2 during the initialization period t1 to t2 and the on-bias period t2 to t3, but a relatively small voltage stress (Vgs) is applied to the drive transistor Tr2 during the compensation/writing period t3 to t4 and the period A t4 to t5. The period A (t4 to t5) becomes longer as the light emission duty is smaller.

On the other hand, in the non-refresh frame period, the scanning control signals Scan1 and Scan2 and the light emission control signals EM1 and EM2 change as illustrated in FIG. 3, causing the pixel circuit illustrated in FIG. 1 to operate as described above, whereby the voltage stress (Vgs) applied to the drive transistor Tr2 changes as illustrated in (B) of FIG. 4. That is, based on the above-described operation in the non-refresh frame period, in the light emission period, the voltage held in the holding capacitor Cst is applied to the drive transistor Tr2 as the voltage stress (Vgs). In the subsequent on-bias period t1 to t2, the voltage of the signal line that transmits the voltage Vdata is applied as the on-bias voltage Vob to the source terminal (Node3) of the drive transistor Tr2 via the transistor Tr1, thus increasing the voltage stress (Vgs) applied to the drive transistor Tr2.

In the subsequent period t2 to t4 in the non-light emission period t0 to t4, the magnitude of the voltage stress (Vgs) applied to the drive transistor Tr2 slightly changes according to the above-described operation, but a voltage stress (Vgs) substantially equal to the voltage stress (Vgs) in the light emission period is applied to the drive transistor Tr2.

At time t4, the light emission period starts again, and the voltage held in the holding capacitor Cst is applied to the drive transistor Tr2 as the voltage stress (Vgs).

As can be seen from a comparison between (A) of FIG. 4 and (B) of FIG. 4, the voltage stress applied to the drive transistor Tr2 during the non-light emission period is different in the refresh frame period and the non-refresh frame period. In other words, the voltage stress (Vgs) applied to the drive transistor Tr2 is equal to the threshold voltage Vth and relatively small during the period A in the refresh frame period, but is equal to the voltage held in the holding capacitor Cst and relatively large in the period corresponding to the period A in the non-refresh frame period. In a case where the light emission duty is small (in the case of a low luminance setting), the period A becomes long, and thus the voltage stress applied to the drive transistor Tr2 in the refresh frame period and the non-refresh frame period greatly differ from each other. As a result, in a case where the light emission duty is small, even if the on-bias voltage is applied as described above in order to reduce the threshold shift due to the hysteresis characteristics of the drive transistor Tr2, flicker is noticeable.

As described above, with the above-described configuration, even if the on-bias voltage is applied to the drive transistor Tr2, a difference occurs in the stress state of the drive transistor between the refresh frame period and the non-refresh frame period, and in a case where the light emission duty is small, the period A in the refresh frame period becomes long and the difference is increased, making flicker noticeable.

Regarding this, the inventors of the present application has conceived a solution for such a problem of "applying an on-bias voltage to the drive transistor Tr2 in at least a part of the period A included in the refresh frame period, that is, at least a part of the period from the end point t4 of the compensation/writing period to the start point t5 of the next light emission period so as to reduce the difference in the stress state of the drive transistor Tr2 between the refresh frame period and the non-refresh frame period". In this solution, it is preferable that, in the non-light emission period in the non-refresh period, the voltage stress (Vgs) applied to the drive transistor Tr2 by applying the on-bias voltage Vob is maintained until the start of the light emission period.

Figure 5:
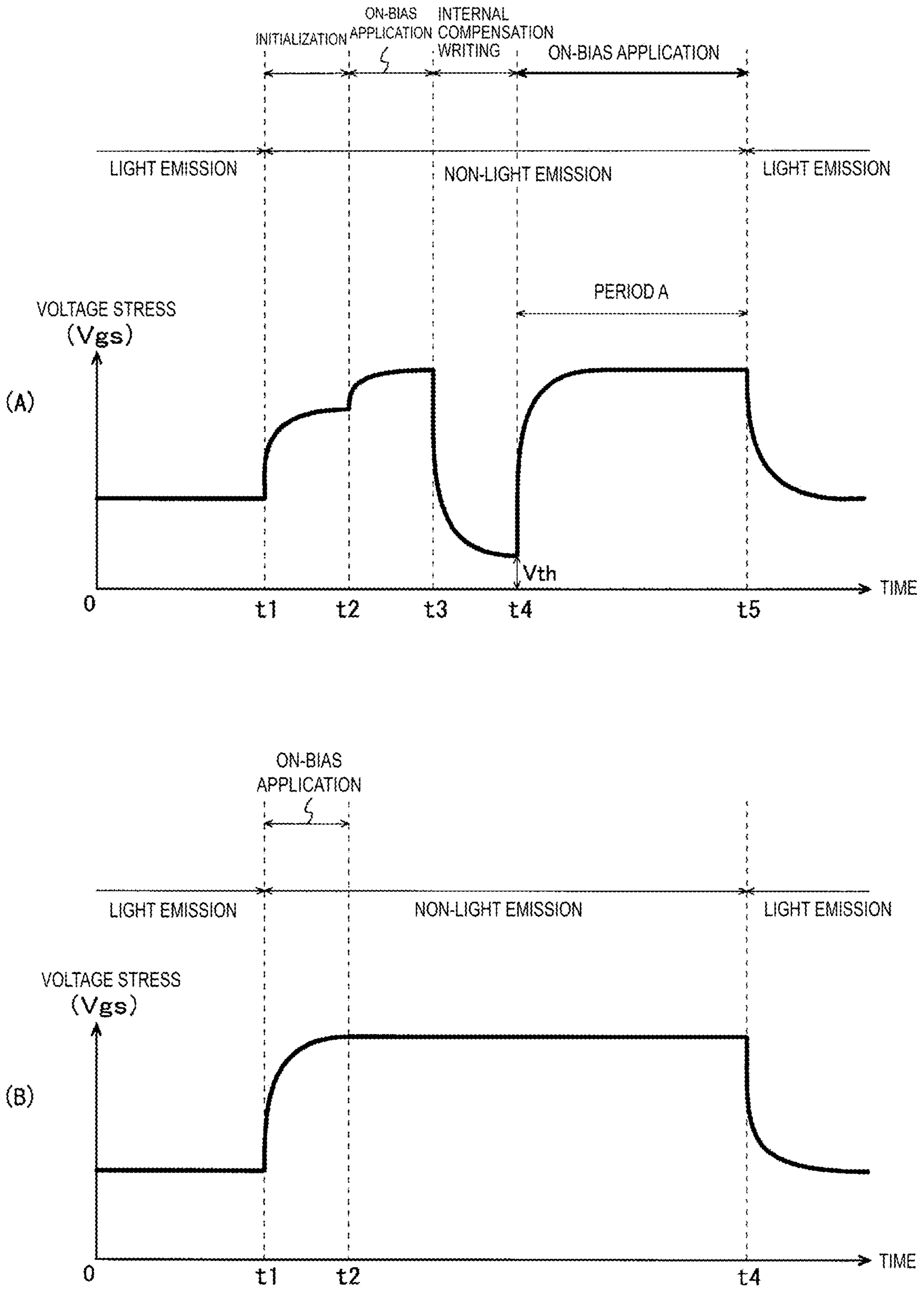
FIG. 5 is waveform diagrams (A, B) for describing how to solve a problem caused by the hysteresis characteristics of a drive transistor in the pixel circuit illustrated in FIG. 1 when the light emission duty is low.

FIG. 5 is waveform diagrams for describing this solution. (A) of FIG. 5 illustrates the voltage stress (the gate-source voltage Vgs) applied to the drive transistor Tr2 in the refresh frame period in the display device to which this solution is applied, and (B) of FIG. 5 illustrates the voltage stress (the gate-source voltage Vgs) applied to the drive transistor Tr2 in the non-refresh frame period in the display device. Here, the pixel circuit is configured such that the voltage stress (Vgs) applied to the drive transistor Tr2 by the application of the on-bias voltage Vob in the non-light emission period in the non-refresh period is maintained until the start time t4 of the light emission period. Thus, the waveform diagram of (B) of FIG. 5 is different from the waveform diagram of (B) of FIG. 4.

According to this solution, as illustrated in (A) of FIG. 5, during the period A (t4 to t5), a relatively large on-bias voltage (a voltage substantially equal to the on-bias voltage applied in the on-bias period t1 to t2) is applied. Thus, even when the light emission duty is low, the difference in the stress state of the drive transistor Tr2 between the refresh frame period and the non-refresh frame period is reduced (see (A) and (B) of FIG. 5). As a result, the luminance difference between the refresh frame period and the non-refresh frame period is reduced, and flicker is not noticeable even when the light emission duty is set low and pause driving is performed.

Embodiments based on the solution described above will be described later with reference to the accompanying drawings. Note that, in each transistor to be referred to below, a gate terminal corresponds to a control terminal, one of a drain terminal and a source terminal corresponds to a first conduction terminal, and the other of the drain terminal and the source terminal corresponds to a second conduction terminal. The transistor according to the following embodiments is, for example, a thin film transistor, but the disclosure is not limited to this. Still further, the term "connection" used herein means "electrical connection" unless otherwise specified, and without departing from the spirit and scope of the disclosure, the term includes not only a case in which direct connection is meant but also a case in which indirect connection with another element therebetween is meant.

1. First Embodiment

1.1 Overall Configuration

Figure 6:
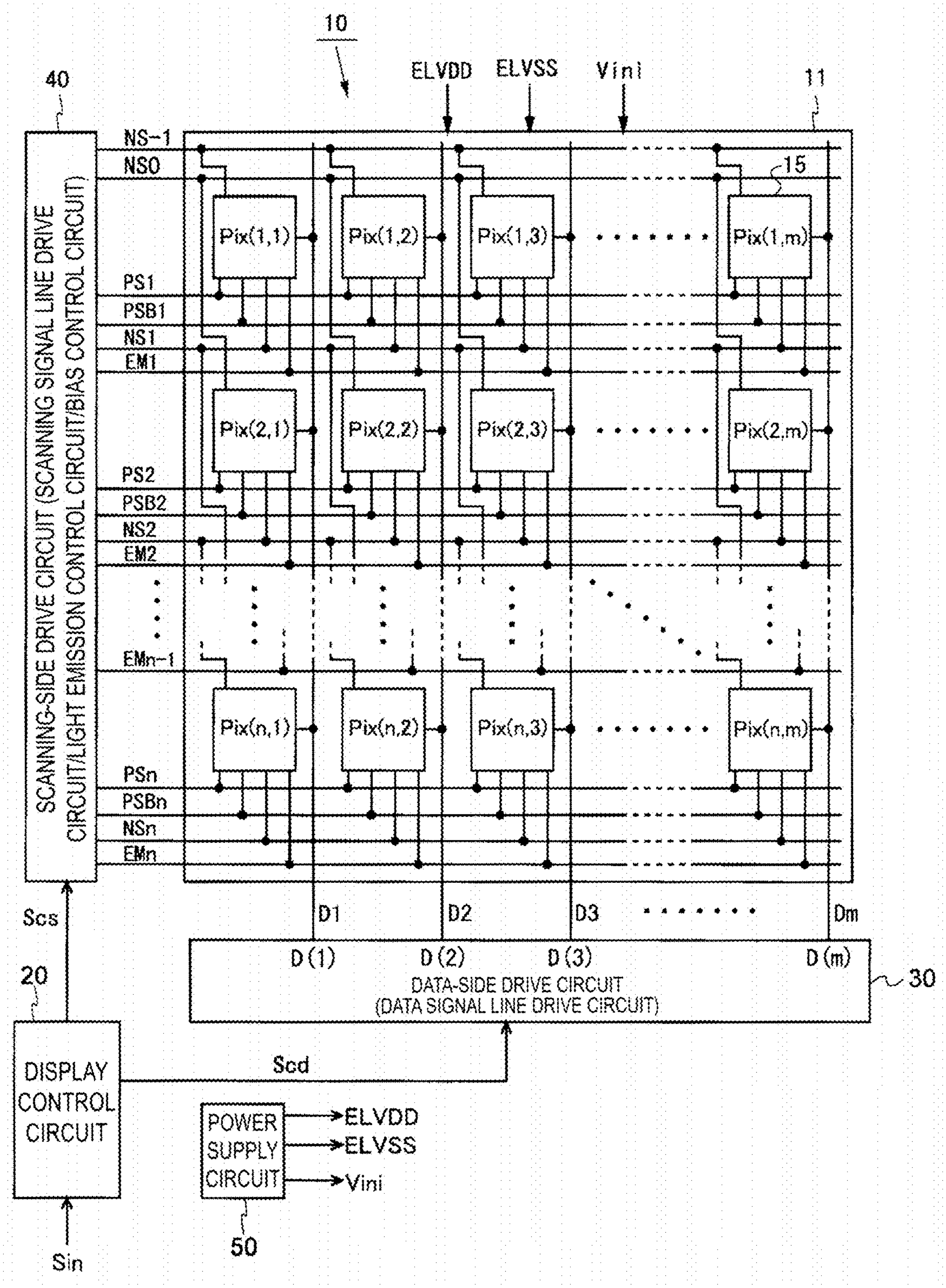
FIG. 6 is a block diagram illustrating an overall configuration of a display device according to a first embodiment.

FIG. 6 is a block diagram illustrating an overall configuration of a display device 10 according to the first embodiment. The display device 10 is an organic EL display device that performs internal compensation. That is, in the display device 10, each pixel circuit has a function of compensating for variations and shifts of the threshold voltage of a drive transistor inside the pixel circuit. Also, the display device 10 has two operation modes, a normal driving mode and a pause driving mode. That is the display device 10 operates such that, in the normal driving mode, a refresh frame period Trf for rewriting image data (data voltage in each pixel circuit) of a display portion continues, and in the pause driving mode, a drive period TD consisting of only the refresh frame period Trf and a pause period TP consisting of a plurality of non-refresh frame periods Tnrf for stopping rewriting of image data of the display portion alternate between one another (see FIG. 8 described later).

As illustrated in FIG. 6, the display device 10 includes a display portion 11, a display control circuit 20, a data-side drive circuit 30, a scanning-side drive circuit 40, and a power source circuit 50. The data-side drive circuit 30 functions as a data signal line drive circuit (also referred to as a "data driver"). The scanning-side drive circuit 40 functions as a scanning signal line drive circuit (also referred to as a "gate driver"), a light emission control circuit (also referred to as an "emission driver"), and a bias control circuit. These three circuits on the scanning side are configured as one scanning-side drive circuit 40 in the configuration illustrated in FIG. 6, but a configuration where the three circuits are separated as needed, or a configuration where the three circuits are disposed separately on different sides of the display portion 11 may be adopted. At least part of the data-side drive circuit and scanning-side drive circuit may be integrally formed with the display portion 11. The same applies to subsequent embodiments and modified examples. The power source circuit 50 generates a high-level power source voltage ELVDD, a low-level power source voltage ELVSS, and an initialization voltage Vini, which will be described later, to be supplied to the display portion 11, and generates power source voltages (not illustrated) to be supplied to the display control circuit 20, the data-side drive circuit 30, and the scanning-side drive circuit 40.

The display portion 11 is provided with m data signal lines D1, D2, . . . , Dm (m is an integer equal to or greater than 2), n first scanning signal lines PS1, PS2, . . . , PSn intersecting with the data signal lines, and n+2 second scanning signal lines NS−1, NS0, NS1, . . . , NSn (n is an integer equal to or greater than 2). Further, n light emission control lines (emission lines) EM1 to EMn are arranged along the n first scanning signal lines PS1 to PSn, respectively, and n scanning signal lines for bias control (hereinafter referred to as "bias control lines") PSB1 to PSBn are arranged along the n first scanning signal lines PS1 to PSn, respectively. The display portion 11 is provided with m×n pixel circuits 15 arranged in a matrix shape along the m data signal lines D1 to Dm and the n first scanning signal lines PS1 to PSn. Each pixel circuit 15 corresponds to one of the m data signal lines D1 to Dm and to one of the n first scanning signal lines PS1 to PSn (hereinafter, when distinguishing between the pixel circuits 15, a pixel circuit corresponding to an i-th first scanning signal line PSi and a j-th data signal line Dj may also be referred to as an "i-th row, j-th column pixel circuit" and denoted by the reference sign "Pix(i, j)"). Also, each pixel circuit 15 corresponds to one of the n second scanning signal lines NS1 to NSn and to one of the n light emission control lines EM1 to EMn. Each pixel circuit 15 also corresponds to one of the n bias control lines PSB1 to PSBn. The data-side drive circuit 30 that drives the data signal lines D1, D2, . . . , Dm and the scanning-side drive circuit 40 that drives the first scanning signal lines PS1, PS2, . . . , PSn, the second scanning signal lines NS−1, NS0, NS1, . . . , NSn, the light emission control lines EM1 to EMn, and the bias control lines PSB1 to PSBn constitute a drive circuit that drives the m×n pixel circuits 15 in the display portion 11 (see FIG. 6).

The display portion 11 is also provided with a power source line (not illustrated) common to each pixel circuit 15. In other words, a first power source line (hereinafter, referred to as a "high-level power source line" and designated by the reference sign "ELVDD" similar to the high-level power source voltage) used for supplying the high-level power source voltage ELVDD for driving the organic EL element described later, and a second power source line (hereinafter, referred to as a "low-level power source line" and designated by the reference sign "ELVSS" similar to the low-level power source voltage) used for supplying the low-level power source voltage ELVSS for driving the organic EL element are provided. The display portion 11 also includes a not illustrated initialization voltage line (denoted by the same reference sign "Vini" as that of the initialization voltage) for supplying the initialization voltage Vini used in a reset operation (also referred to as an "initialization operation") for initializing each pixel circuit 15. The high-level power source voltage ELVDD, the low-level power source voltage ELVSS, and the initialization voltage Vini are supplied from the power source circuit 50.

The display control circuit 20 receives an input signal Sin including image information representing an image to be displayed and timing control information for image display from outside of the display device 10 and, based on the input signal Sin, generates a data-side control signal Scd and a scanning-side control signal Scs, and outputs the data-side control signal Scd to the data-side drive circuit 30 and outputs the scanning-side control signal Scs to the scanning-side drive circuit 40.

The data-side drive circuit 30 drives the data signal lines D1 to Dm based on the data-side control signal Scd output from the display control circuit 20. More specifically, the data-side drive circuit 30 generates m data signals D(1) to D(m) representing the image to be displayed, and applies the data signals D(1) to D(m) to the data signal lines D1 to Dm, respectively, based on the data-side control signal Scd.

The scanning-side drive circuit 40 functions, based on the scanning-side control signal Scs from the display control circuit 20, as a scanning signal line drive circuit that drives the n first scanning signal lines PS1 to PSn and the n+2 second scanning signal lines NS−1 to NSn, a light emission control circuit that drives the light emission control lines EM1 to EMn, and a bias control circuit that drives the bias control lines PSB1 to PSBn.

Figure 9:
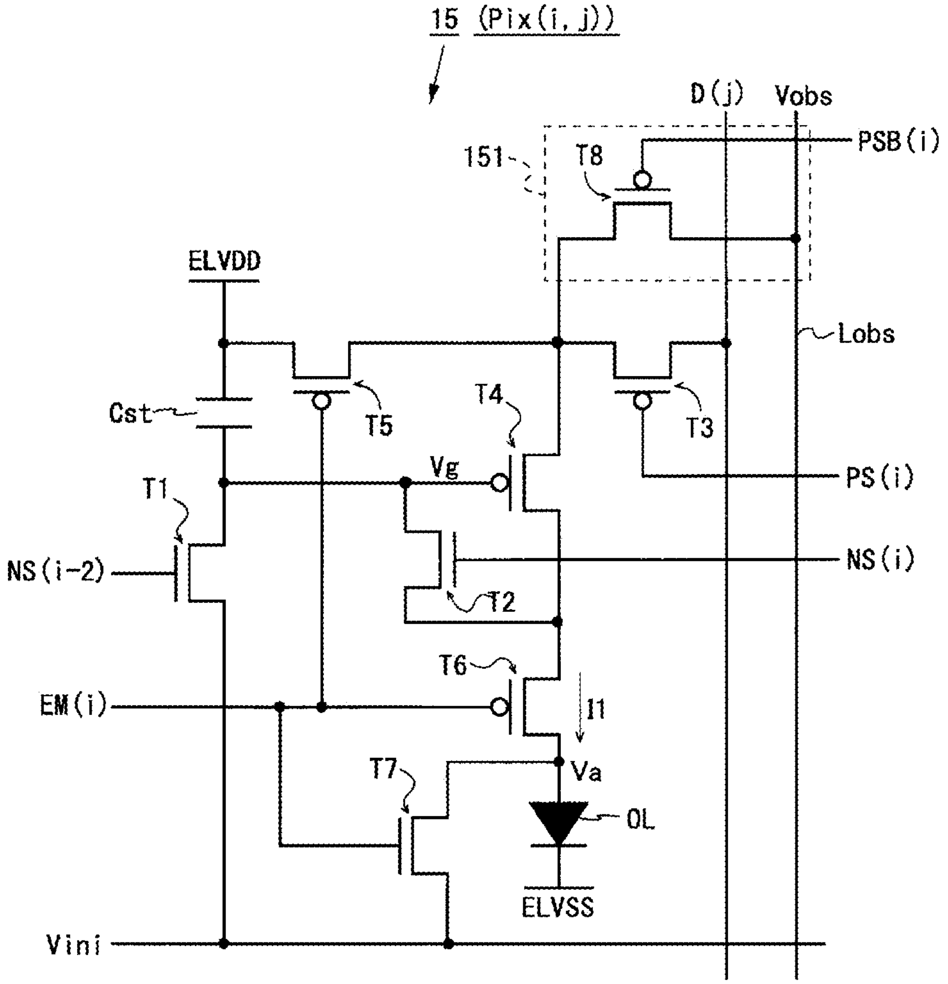
FIG. 9 is a circuit diagram illustrating a configuration of the pixel circuit according to the first embodiment.

More specifically, the scanning-side drive circuit 40, in the refresh frame period Trf, functioning as the scanning signal line drive circuit, based on the scanning-side control signal Scs, sequentially selects the n first scanning signal lines PS1 to PSn each for predetermined period corresponding to one horizontal period and sequentially selects the n+2 second scanning signal lines NS−1 to NSn each predetermined period corresponding to one horizontal period, applies an active signal to the selected first scanning signal line PSK (k is an integer satisfying 1≤k≤n) and applies an active signal to the selected second scanning signal line Nss (s is an integer satisfying −1≤s≤n), and applies a non-active signal to the non-selected first scanning signal lines and applies a non-active signal to the non-selected second scanning signal lines. With this, m pixel circuits Pix(k, 1) to Pix(k, m) corresponding to the selected first scanning signal line PSk are collectively selected. As a result, in the select period of the first scanning signal line PSk (hereinafter referred to as a "kth scanning select period"), the voltages of the m data signals D(1) to D(m) applied to the data signal lines D1 to Dm from the data-side drive circuit 30 (hereinafter also referred to as simply "data voltages" when not distinguished from each other) are written as pixel data to the pixel circuits Pix(k, 1) to Pix(k, m), respectively. Note that as illustrated in FIG. 9 described later, in the present embodiment, a first scanning signal line PSi1 is connected to a gate terminal of a P-channel (hereinafter also referred to as "P-type") transistor in the pixel circuits 15 (i1=1 to n), and a second scanning signal line NSi2 is connected to a gate terminal of an N-channel (hereinafter also referred to as "N-type") transistor in the pixel circuit 15 (i2=−1 to n). Thus, a low-level voltage is applied to the selected first scanning signal line PSi1 as an active signal, and a high-level voltage is applied to the selected second scanning signal line NSi2 as an active signal.

In addition, in the refresh frame period Trf, the scanning-side drive circuit 40 drives the light emission control lines EM1 to EMn such that the light emission control lines EM1 to EMn are selectively inactivated in conjunction with the driving of the first and second scanning signal lines PS1 to PSn and NS−1 to NSn. That is, when functioning as the light emission control circuit, based on the scanning-side control signal Scs, the scanning-side drive circuit 40 applies a light emission control signal (high-level voltage) indicating non-light emission to an i-th light emission control line EMi in a predetermined period including the i-th horizontal period and applies a light emission control signal (low-level voltage) indicating light emission to the i-th light emission control line EMi in other periods (i=1 to n). Organic EL elements in pixel circuits (hereinafter also referred to as "i-th row pixel circuits") Pix(i, 1) to Pix(i, m) corresponding to the i-th first scanning signal line PSi emit light at a luminance corresponding to the data voltages written to the i-th row pixel circuits Pix(i, 1) to Pix(i, m), respectively, while the voltage of the light emission control line EMi is at a low level (activated state). Also in the non-refresh frame period Tnrf, the scanning-side drive circuit 40 drives the light emission control lines EM1 to EMn in the same manner as the driving in the refresh frame period Trf (see FIG. 8 described later).

Further, as the bias control circuit, in the pause driving mode, the scanning-side drive circuit 40 drives the bias control lines PSB1 to PSBn such that they are sequentially selected in both the refresh frame period Trf and the non-refresh frame period Tnrf (see FIG. 8 described later). This operation will be described in detail later. In the normal driving mode, driving of the bias control lines PSB1 to PSBn is stopped, and all of the bias control lines PSB1 to PSBn remain in the inactivated state.

1.2 Schematic Operations

As described above, the display device 10 according to the present embodiment has two operation modes, the normal driving mode and the pause driving mode. First, schematic operations of the display device 10 in the normal driving mode will be described.

Figure 7:
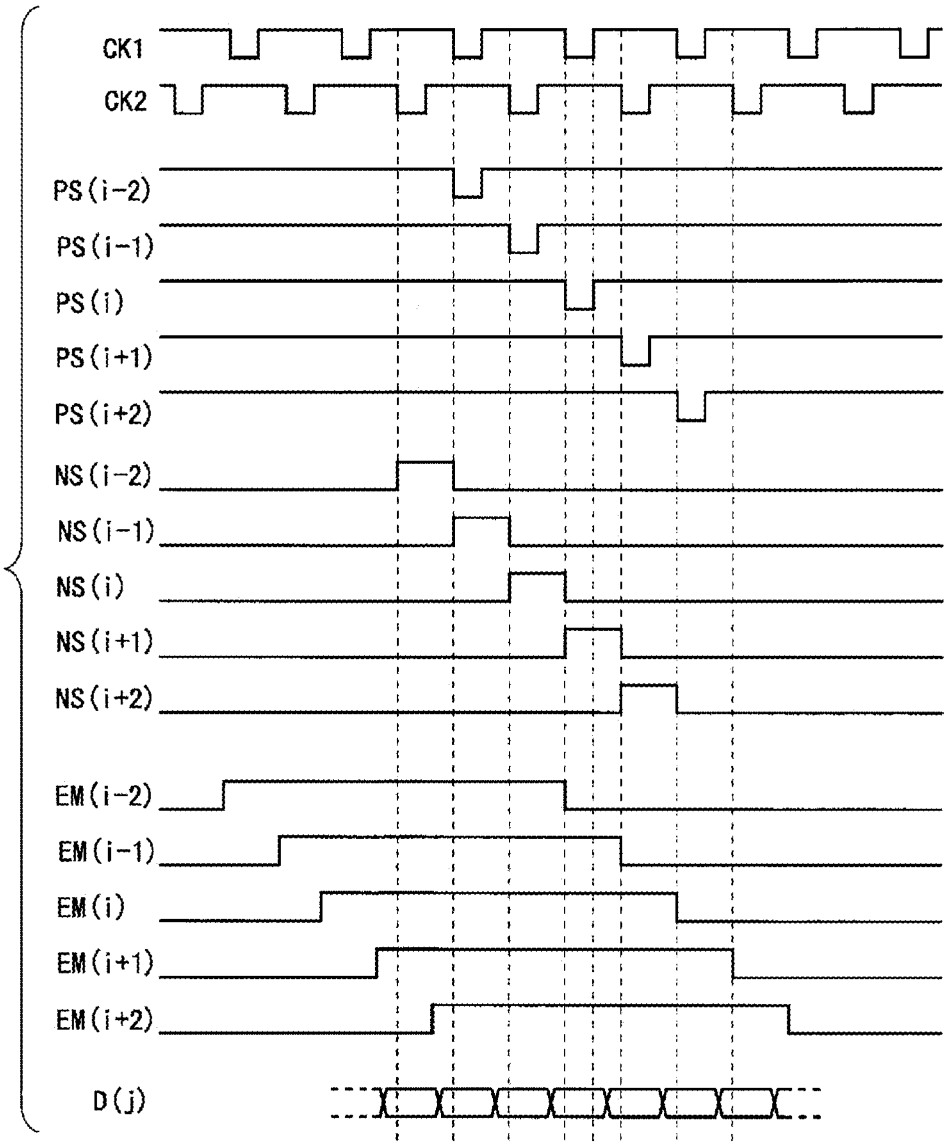
FIG. 7 is a timing chart for describing the schematic operation in a normal driving mode of the display device according to the first embodiment.

FIG. 7 is a timing chart for describing schematic operations of the display device 10 in the normal driving mode. The scanning-side control signal Scs sent from the display control circuit 20 to the scanning-side drive circuit 40 includes a two phase clock signal consisting of first and second gate clock signals CK1 and CK2. In the normal driving mode, the scanning-side drive circuit 40, based on a two phase clock signal, generates first scanning signals PS(1) to PS(n) and second scanning signals NS(−1), NS(0), NS(1), . . . , NS(n) as illustrated in FIG. 7, applies the first scanning signals PS(1) to PS(n) to the first scanning signal lines PS1 to PSn, and applies the second scanning signals NS(−1) to NS(n) to the second scanning signal lines NS−1 to NSn. In addition, the scanning-side drive circuit 40, in response to the two phase clock signal (the first and second gate clock signal CK1 and CK2), generates light emission control signals EM(1) to EM(n) as illustrated in FIG. 7 and applies the light emission control signals EM(1) to EM(n) to the light emission control lines EM1 to EMn. On the other hand, based on the data-side control signal Scd from the display control circuit 20, the data-side drive circuit 30 generates the data signals D(1) to D(m) that change in conjunction with the first scanning signals PS(1) to PS(n) as illustrated in FIG. 7 and applies the data signals D(1) to D(m) to the data signal lines D1 to Dm. In this manner, by driving the first scanning signal lines PS1 to PSn, the second scanning signal lines NS−1 to NSn, the light emission control lines EM1 to EMn, and the data signal lines D1 to Dm in the display portion 11, in a non-light emission period, initialization and data voltage writing is performed on each pixel circuit Pix(i, j) and, in a light emission period, the pixel circuits Pix(i, j) emit light at a luminance corresponding to the written data voltage.

In the normal driving mode, by driving, as described above, the first scanning signal lines PS1 to PSn, the second scanning signal lines NS−1 to NSn, the light emission control lines EM1 to EMn, and the data signal lines D1 to Dm via the various signals illustrated in FIG. 7, in one frame period, the first scanning signal lines PS1 to PSn and the second scanning signal lines NS−1 to NSn are sequentially selected, and the refresh frame period Trf for writing image data to (the pixel circuits Pix(1, 1) to Pix(n, m) of) the display portion 11 is repeated.

Figure 8:
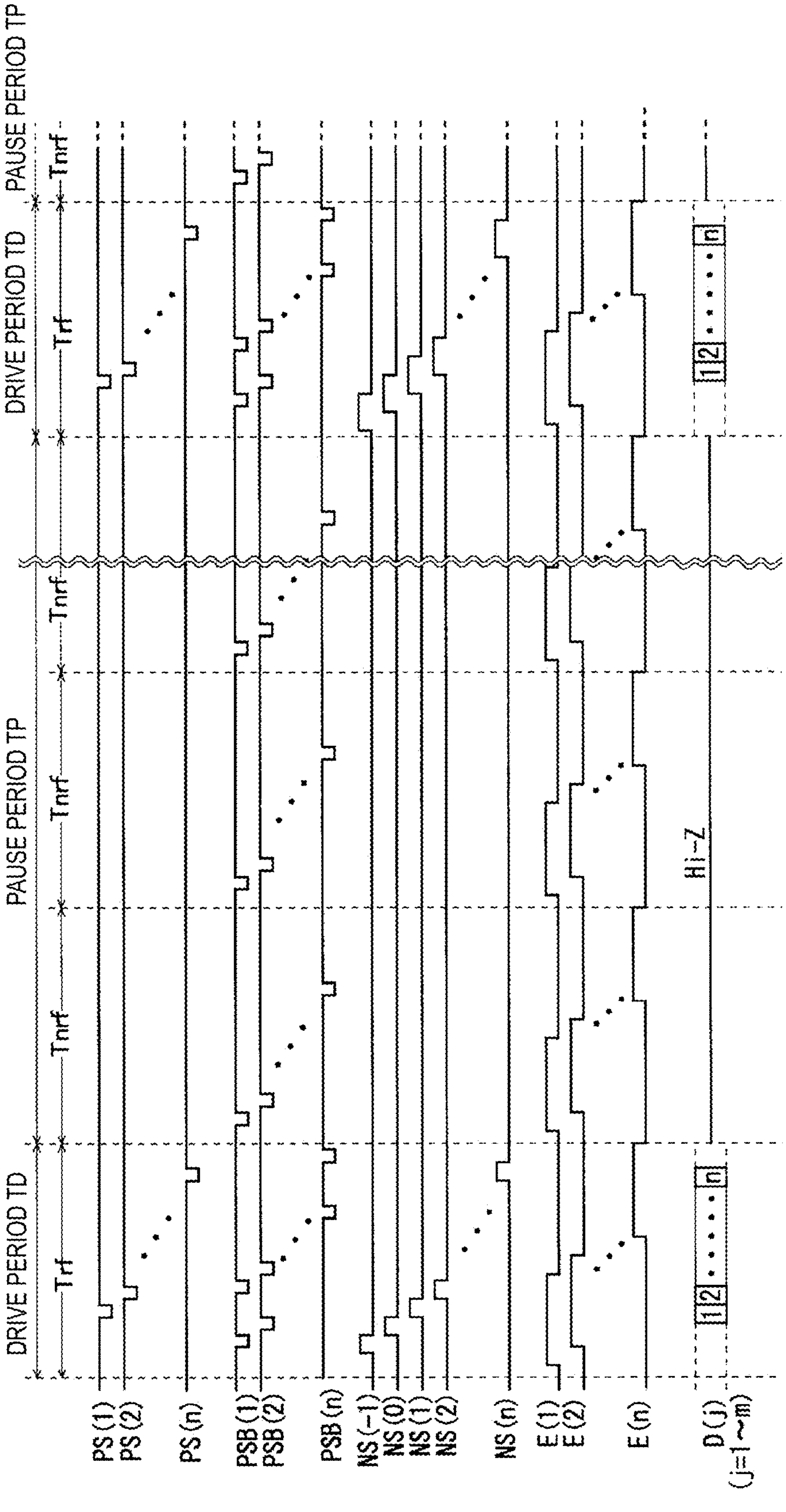
FIG. 8 is a timing chart for describing the schematic operation in a pause driving mode of the display device according to the first embodiment.

On the other hand, in the pause driving mode, as illustrated in FIG. 8, the drive period TD consisting of such a refresh frame period (hereinafter also referred to as "RF frame period") Trf and the pause period TP consisting of a plurality of non-refresh frame periods (hereinafter also referred to as "NRF frame periods") Tnrf are alternately repeated. In the pause period TP (NRF frame period Tnrf), the driving of the first scanning signal lines PS1 to PSn and the second scanning signal lines NS−1 to NSn by the scanning-side drive circuit 40 and the data signal lines D1 to Dm by the data-side drive circuit 30 is stopped, and display using image data written in the immediately preceding drive period TD (RF frame period Trf) continues. Thus, the pause driving mode is effective in reducing the power consumption of the display device 10 when a still image is displayed. As will be described later, in other embodiments, the first scanning signal lines PS1 to PSn are driven even in the pause period TP. In the pause driving mode as illustrated in FIG. 8, the bias control lines PSB1 to PSBn are driven so as to be sequentially selected in both the RF frame period Trf and the NRF frame period Tnrf. Thus, in both the RF frame period Trf and the NRF frame period Tnrf, in each pixel circuit 15, the on-bias voltage is applied to the drive transistor while the corresponding bias control line PSBi is in the activated state (details will be described later). Note that in the example illustrated in FIG. 8, the drive period TD includes only one RF frame period Trf but may include two or more RF frame periods Trf.

The input signal Sin from the outside includes an operation mode signal Sm indicating which operation mode, from among the normal driving mode and the pause driving mode as described above, to drive the display portion 11 with. The operation mode signal Sm is sent to the scanning-side drive circuit 40 as a part of the scanning-side control signal Scs and sent to the data-side drive circuit 30 as a part of the data-side control signal Scd. The scanning-side drive circuit 40 drives the first scanning signal lines PS1 to PSn and the second scanning signal lines NS−1 to NSn according to the operation mode indicated by the operation mode signal Sm and drives the light emission control lines EM1 to EMn in a similar manner (the same period and the same duty) irrespective of whether the normal driving mode or the pause driving mode is used. In addition, the scanning-side drive circuit 40 drives the bias control lines PSB1 to PSBn in the pause driving mode and stops the driving thereof in the normal driving mode. The data-side drive circuit 30 drives the data signal lines D1 to Dn according to the operation mode indicated by the operation mode signal Sm. Note that since the normal driving mode is not relevant to the object of the present application, operations in the pause driving mode will be focused on when describing the operations of the display device 10 or the pixel circuits thereof (the same applies to other embodiments as will be described later).

In the present embodiment, in the drive period TD (RF frame period Trf), at each pixel circuit Pix(i, j), when the corresponding first and second scanning signal lines PSi and NSi are in a select state, a data write operation is performed, when the second previous second scanning signal line NSi−2 of the second scanning signal line NSi is in a select state, an initialization operation is performed. The light emission control line EMi is driven (i=1 to n) such that each pixel circuit Pix(i, j) is in OFF state during a period in which the data writing operation and the initialization operation are performed (see FIG. 8). As described later, in the pixel circuit Pix(i, j) according to the present embodiment, a P-type transistor is used as first and second light emission control transistors T5 and T6. Thus, each light emission control line EMi is put in an activated state when a low-level (L level) voltage is provided and put in an inactivated state when a high-level (H level) voltage is provided.

1.3 Configuration of Pixel Circuit

FIG. 9 is a circuit diagram illustrating a configuration of the pixel circuit 15 in the present embodiment, and more specifically, a configuration of a pixel circuit 15 corresponding to the i-th first scanning signal line PSi and the j-th data signal line Dj, i.e., the i-th row, j-th column pixel circuit Pix(i, j) (1≤i≤n, 1≤j≤m). The pixel circuit 15 includes one organic EL element OL as a display element, seven transistors T1 to T7 (hereinafter referred to as a first initialization transistor T1, a threshold compensation transistor T2, a write control transistor T3, a drive transistor T4, a first light emission control transistor T5, a second light emission control transistor T6, and a second initialization transistor T7), and the one holding capacitor Cst. In addition to these elements, the pixel circuit 15 includes a bias applying circuit 151 including a transistor T8 (hereinafter, the transistor T8 is referred to as a "bias applying transistor").

In the pixel circuit 15, the transistors T1, T2, and T7 are N-type transistors, and the transistors T3 to T6 are P-type transistors. In the present embodiment, the N-type transistors T1, T2, and T7 are thin film transistors (hereinafter referred to as "oxide TFTs") with channel layers formed of oxide semiconductors, and more specifically, are oxide TFTs (hereinafter referred to as "IGZO-TFTs") using indium gallium zinc oxide (InGaZnO) as oxide semiconductors. Since the oxide TFT has a small off-leak current, it is suitable as a switching element in a pixel circuit or the like. Each P-type transistor T3 to T6 is a thin film transistor with a channel layer formed of a low-temperature polysilicon (hereinafter referred to as a "LTPS-TFT"). Since low-temperature polysilicon has high mobility, when a LTPS-TFT is used as a drive transistor, driving capability for an organic EL element in a pixel circuit is improved, and when used as a switching element, on-resistance is reduced. However, the transistor that can be used in the pixel circuit 15 is not limited to such IGZO-TFTs or LTPS-TFTs.

Note that in the pixel circuit 15, the transistors T1 to T3 and T5 to T8 other than the drive transistor T4 operate as switching elements. The holding capacitor Cst is a capacitance element consisting of two electrodes that include a first electrode and second electrode.

As illustrated in FIG. 6 and FIG. 9, to the pixel circuit Pix(i, j) according to the present embodiment, the first scanning signal line corresponding thereto (hereinafter also referred to as "corresponding first scanning signal line" in the description focusing on the pixel circuit) PSi, the second scanning signal line corresponding thereto (hereinafter also referred to as "corresponding second scanning signal line" in the description focusing on the pixel circuit) NSi, the bias control line corresponding thereto (hereinafter also referred to as "corresponding bias control line" in the description focusing on the pixel circuit) PSBi, the light emission control line corresponding thereto (hereinafter also referred to as "corresponding light emission control line" in the description focusing on the pixel circuit) EMi, the data signal line corresponding thereto (hereinafter also referred to as "corresponding data signal line" in the description focusing on the pixel circuit) Dj, the second scanning signal line two previous from the corresponding second scanning signal line NSi (the scanning signal line two previous in scanning order of the second scanning signal lines NS−1 to NSn), that is, the i−2-th second scanning signal line NSi−2 (hereinafter also referred to as "preceding second scanning signal line" in the description focusing on the pixel circuit), an initialization voltage line Vini, an on-bias voltage line Lobs, a high-level power source line ELVDD, and a low-level power source line ELVSS are connected. In another configuration, instead of the preceding second scanning signal line NSi−2, the immediately preceding second scanning signal line NSi−1 may be connected in the pixel circuit Pix(i, j). Hereinafter, signal PS(i) of the corresponding first scanning signal line PSi, signal NS(i) of the corresponding second scanning signal line NSi, signal NS(i−2) of the preceding second scanning signal line NSi−2, signal EM(i) of the corresponding light emission control line EMi, signal PSB(i) of the corresponding bias control line PSBi, and signal D(j) of the corresponding data signal line Dj will be referred to as corresponding first scanning signal PS(i), corresponding second scanning signal NS(i), preceding second scanning signal NS(i−2), corresponding light emission control signal EM(i), corresponding bias control signal PSB(i), and corresponding data signal D(j), respectively.

Although not illustrated in FIG. 3, it is sufficient that the on-bias voltage line Lobs is disposed along each of the data signal lines D1 to Dm, for example, and is provided with the on-bias voltage Vobs from the data-side drive circuit 30. The on-bias voltage Vobs is set in accordance with a display gray scale, a refresh rate, an environment temperature, an on-bias applying period (a length of a period during which the on-bias voltage Vobs is applied), and the like. For example, statistical processing is used to determine in advance a representative value, such as an average value, a median value, a modal value, or the like, of one or more of the operation condition parameters (including the light emission duty), and according to these representative values, an appropriate on-bias voltage Vobs should be determined to be a fixed value for each body or product of the display device 10. Alternatively, instead of this, an appropriate on-bias voltage Vob may be set as a variable based on one or more values of the operation condition parameters.

As illustrated in FIG. 9, in the pixel circuit Pix(i, j), a source terminal of the drive transistor T4 is connected to the corresponding data signal line Dj via the write control transistor T3 and to the high-level power source line ELVDD via the first light emission control transistor T5. A drain terminal of the drive transistor T4 is connected to an anode of the organic EL element OL as a first terminal via the second light emission control transistor T6, and the cathode of the organic EL element OL is connected to the low-level power source line ELVSS. The gate terminal of the drive transistor T4 is connected to the drain terminal of the drive transistor T4 via the threshold compensation transistor T2, connected to the high-level power source line ELVDD via the holding capacitor Cst, and connected to the initialization voltage line Vini via the first initialization transistor T1. The anode of the organic EL element OL is also connected to the initialization voltage line Vini via the second initialization transistor T7 as a display element initialization transistor. The bias applying circuit 151 has a first terminal connected to the on-bias voltage line Lobs to receive the on-bias voltage and a second terminal connected to the source terminal of the drive transistor T4, and includes a bias applying transistor T8 having a source terminal and a drain terminal respectively connected to the first terminal and the second terminal. The gate terminal of the bias applying transistor T8 is connected to the corresponding bias control line PSBi.

1.4 Operation of Pixel Circuit in Drive Period

Figure 10:
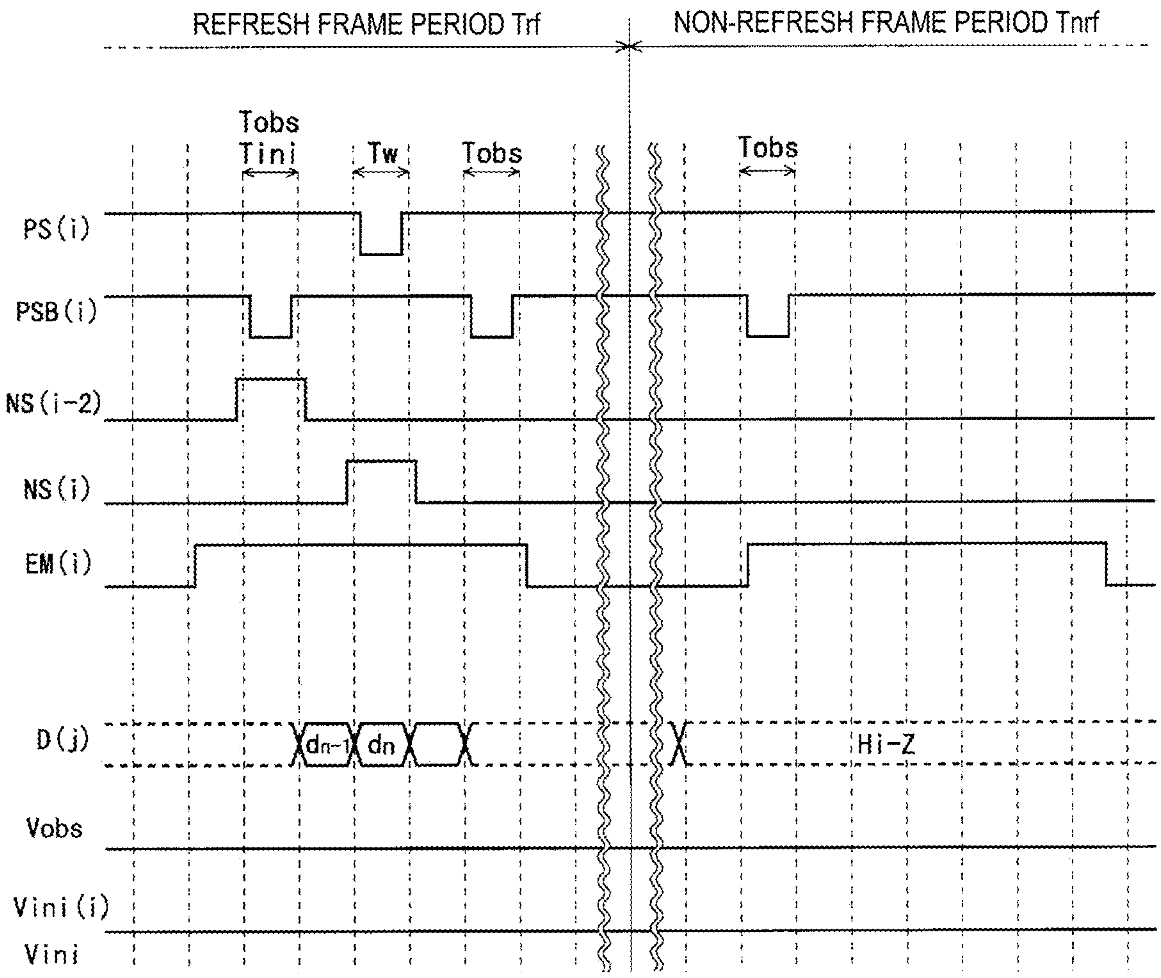
FIG. 10 is a timing chart for describing an operation in a pause driving mode of the pixel circuit according to the first embodiment.

The operations of the pixel circuit 15 illustrated in FIG. 9, that is the pixel circuit Pix(i, j) of the i-th row and j-th column according to the present embodiment will be described below with reference to FIG. 9 and FIG. 10. FIG. 10 is a timing chart for describing the operations of the pixel circuit Pix(i, j) in the non-light emission period included in the refresh frame period (RF frame period) Trf and the non-refresh frame period (NRF frame period) Tnrf. In FIG. 10, a plurality of broken lines extending in the vertical direction are illustrated, and the interval between these broken lines corresponds to one horizontal period. In addition, a period during which the light emission control signal EM(i) is H level is a non-light emission period, and a period during which the light emission control signal EM(i) is L level is a light emission period (the same applies to FIG. 12, FIG. 14, and the like illustrating timing charts to be described later).

First, the operations of the pixel circuit Pix(i, j) in the non-light emission period of the RF frame period Trf will be described. As illustrated in FIG. 10, at the start point of the non-light emission period (the period during which the corresponding light emission control signal EM(i) is H level), the corresponding first scanning signal PS(i) and the corresponding bias control signal PSB(i) are H level, and the preceding second scanning signal NS(i−2) and the corresponding second scanning signal NS(i) are L level. In the non-light emission period, since the first and second light emission control transistors T5 and T6 are in OFF state, the organic EL element OL is in OFF state, and since the second initialization transistor T7 is in ON state, the anode of the organic EL element OL is initialized.

As illustrated in FIG. 10, in the non-light emission period, first, the preceding second scanning signal NS(i−2) is H level only for a predetermined period corresponding to substantially one horizontal period, and in the predetermined period, the corresponding bias control signal PSB(i) is L level only for a predetermined period corresponding to substantially one horizontal period. Here, a horizontal period in which the preceding second scanning signal NS(i−2) is H level and the corresponding bias control signal PSB(i) is L level is referred to as "initialization period Tini". In the initialization period Tini, since the first initialization transistor T1 is in ON state, a voltage (hereinafter referred to as "gate voltage") of the holding capacitor Cst and the gate terminal of the drive transistor T4 is initialized with the initialization voltage Vini. In the initialization period Tini, the bias applying transistor T8 is put in ON state to apply the on-bias voltage Vobs from the on-bias voltage line Lobs to the source terminal of the drive transistor T4 (see FIG. 9). Thus, the initialization period Tini is also an on-bias applying period Tobs.

Thereafter, in the non-light emission period, the corresponding second scanning signal NS(i) is H level only for a predetermined period corresponding to substantially one horizontal period, and in the predetermined period, the corresponding first scanning signal PS(i) is L level only for a predetermined period corresponding to substantially one horizontal period. Here, a horizontal period in which the corresponding second scanning signal NS(i) is H level and the corresponding first scanning signal PS(i) is L level is referred to as "compensation/writing period Tw" or simply as "writing period Tw". In the writing period Tw, the threshold compensation transistor T2 is put in ON state so that the drive transistor T4 is put in a diode-connected state, and the write control transistor T3 is put in ON state so that the voltage Vdata of the corresponding data signal D(j) is written to the holding capacitor Cst via the drive transistor T4 in the diode-connected state. Accordingly, the gate terminal of the drive transistor T4 is held at post-threshold compensation data voltage (Vdata−|Vth|). Here, Vth is the threshold voltage of the drive transistor T4.

Thereafter, in the non-light emission period, the corresponding bias control signal PSB(i) is put at H level again only for a predetermined period corresponding to substantially one horizontal period. In this predetermined period, the corresponding second scanning signal NS(i) remains at L level. Here, a horizontal period in which the corresponding bias control signal PSB(i) is L level is also referred to as the "on-bias applying period Tobs". Also in this on-bias applying period Tobs, the on-bias voltage Vobs is applied from the on-bias voltage line Lobs to the source terminal of the drive transistor T4 via the bias applying transistor T8 in ON state (see FIG. 9). The threshold compensation transistor T2 is in OFF state after the writing period Tw and remains in OFF state even during the on-bias applying period Tobs.

Thereafter, the corresponding light emission control signal EM(i) changes to L level, whereby the light emission period is started. During this light emission period, the first and second light emission control transistors T5 and T6 are in ON state, and the transistors T1, T2, T3, T7, and T8 other than the drive transistor T4 are in OFF state. In this manner, a current I1 corresponding to the data voltage Vdata written to the holding capacitor Cst flows through the organic EL element OL, and the organic EL element OL emits light at a luminance corresponding to the current I1.

As described above, in the pixel circuit Pix(i, j) according to the present embodiment, in the RF frame period Trf, after the compensation/writing period Tw and in the on-bias applying period Tobs provided before the light emission period starts, the on-bias voltage Vobs is applied to the source terminal of the drive transistor T4. Accordingly, the waveform representing the voltage stress (Vgs) applied to the drive transistor T4 in the RF frame period Trf is close to the waveform illustrated in FIG. 5(A).

Next, the operations of the pixel circuit Pix(i, j) in the non-light emission period of the NRF frame period Tnrf will be described. As illustrated in FIG. 10, at the start point of the non-light emission period, as in the RF frame period Trf described above, the corresponding first scanning signal PS(i) and the corresponding bias control signal PSB(i) are H level, and the preceding second scanning signal NS(i−2) and the corresponding second scanning signal NS(i) are L level. Also, in the non-light emission period, since the first and second light emission control transistors T5 and T6 are in OFF state, the organic EL element OL is in OFF state, and since the second initialization transistor T7 is in ON state, the anode of the organic EL element OL is initialized.

As illustrated in FIG. 10, when the non-light emission period is started (when the corresponding light emission control signal EM(i) changes to H level), the corresponding bias control signal PSB(i) is put at L level for only a predetermined period corresponding to substantially one horizontal period, and the bias applying transistor T8 is put in ON state to apply the on-bias voltage Vobs from the on-bias voltage line Lobs to the source terminal of the drive transistor T4. Here, a horizontal period in which the corresponding bias control signal PSB(i) is L level is also referred to as the "on-bias applying period Tobs". In the NRF frame period Tnrf, the first initialization transistor T1, the threshold compensation transistor T2, and the write control transistor T3 remain in OFF state (see FIG. 9 and FIG. 10). In addition, the data signals D(1) to D(m) applied to the data signal lines D1 to Dm all remain in a high impedance state.

Thereafter, the corresponding light emission control signal EM(i) changes to L level, and the light emission period is started. In this light emission period, the pixel circuit Pix(i, j) operates in the same manner as in the light emission period in the RF frame period Trf. In other words, the current I1 corresponding to the data voltage Vdata written to the holding capacitor Cst in the immediately preceding RF frame period Trf flows through the organic EL element OL, and the organic EL element OL emits light at a luminance corresponding to the current I1.

As described above, in the pixel circuit Pix(i, j) according to the present embodiment, in the NRF frame period Tnrf, when the non-light emission period is started, in the on-bias applying period Tobs, the on-bias voltage Vobs is applied to the source terminal of the drive transistor T4. Accordingly, after the on-bias voltage Vobs is applied and until the light emission period starts, a relatively large voltage stress (Vgs) is applied to the drive transistor T4, and the waveform representing the voltage stress (Vgs) applied to the drive transistor T4 in the NRF frame period Tnrf is substantially the same as the waveform illustrated in FIG. 5(B).

1.5 Effect

As described above, in the present embodiment, when the display device using the internal compensation method pixel circuit 15 (Pix(i, j)) performs pause driving, each pixel circuit Pix(i, j) is periodically turned off by the drive of the light emission control signal EM(i) in both the RF frame period Trf (within the drive period TD) and the NRF frame period Tnrf (within the pause period TP) as illustrated in FIG. 10, and the on-bias voltage is applied to the drive transistor T4 in the light-out period (non-light emission period). In the non-light emission period in the RF frame period Trf, the on-bias applying period Tobs is provided not only before the compensation/writing period Tw but also after the compensation/writing period Tw, and the on-bias voltage Vobs is applied to the drive transistor T4 after the period in which the threshold compensation transistor T2 is in ON state for threshold compensation when writing the data voltage Vdata. Accordingly, a relatively large voltage stress (Vgs) is applied to the drive transistor T4 after the compensation/writing period and before the start of the light emission period in the light emission period of the RF frame period Trf, and the period in which such a relatively large voltage stress (Vgs) is applied to the drive transistor T4 becomes longer as the light emission duty becomes smaller. Accordingly, the waveform representing the voltage stress (Vgs) applied to the drive transistor T4 in the RF frame period Trf is close to the waveform illustrated in FIG. 5(A). On the other hand, the waveform representing the voltage stress (Vgs) applied to the drive transistor T4 in the NRF frame period Tnrf is substantially the same as the waveform illustrated in FIG. 5(B).

Thus, according to the present embodiment, even when the light emission duty is low, the difference in the stress state of the drive transistor T4 between the refresh frame period Trf and the non-refresh frame period Tnrf is reduced (see (A) and (B) of FIG. 5). As a result, the luminance difference between the refresh frame period Trf and the non-refresh frame period Tnrf is reduced, and flicker is not noticeable even when the light emission duty is set low and pause driving is performed. That is, according to the present embodiment, it is possible to obtain a flicker suppression effect that does not depend on the light emission duty in a case where pause driving is performed. Since the period during which the voltage stress (Vgs) applied to the drive transistor T4 at the time of data writing in the RF frame period Trf has a small value (Vth) is approximately the length of one horizontal period, which is relatively extremely short, the decrease in the stress voltage (Vgs) during this period does not cause a problem in the suppression of flicker.

2. Second Embodiment

Next, an organic EL display device according to the second embodiment will be described with reference to FIG. 11 and FIG. 12. In this display device, the bias control lines PSB1 to PSBn are provided as in the display device according to the first embodiment, but the on-bias voltage line Lobs is not provided, and the voltage of the first scanning signal line is used as the on-bias voltage Vobs. The pixel circuit according to the present embodiment is provided with a bias applying circuit as in the pixel circuit according to the first embodiment. However, the configuration is slightly different from the configuration of the bias applying circuit in the first embodiment. Other configurations of the display device according to the present embodiment are basically the same as the configurations of the display device according to the first embodiment, and the same portions or corresponding portion are assigned the same reference sign and detailed descriptions are omitted (see FIG. 6).

Figure 11:
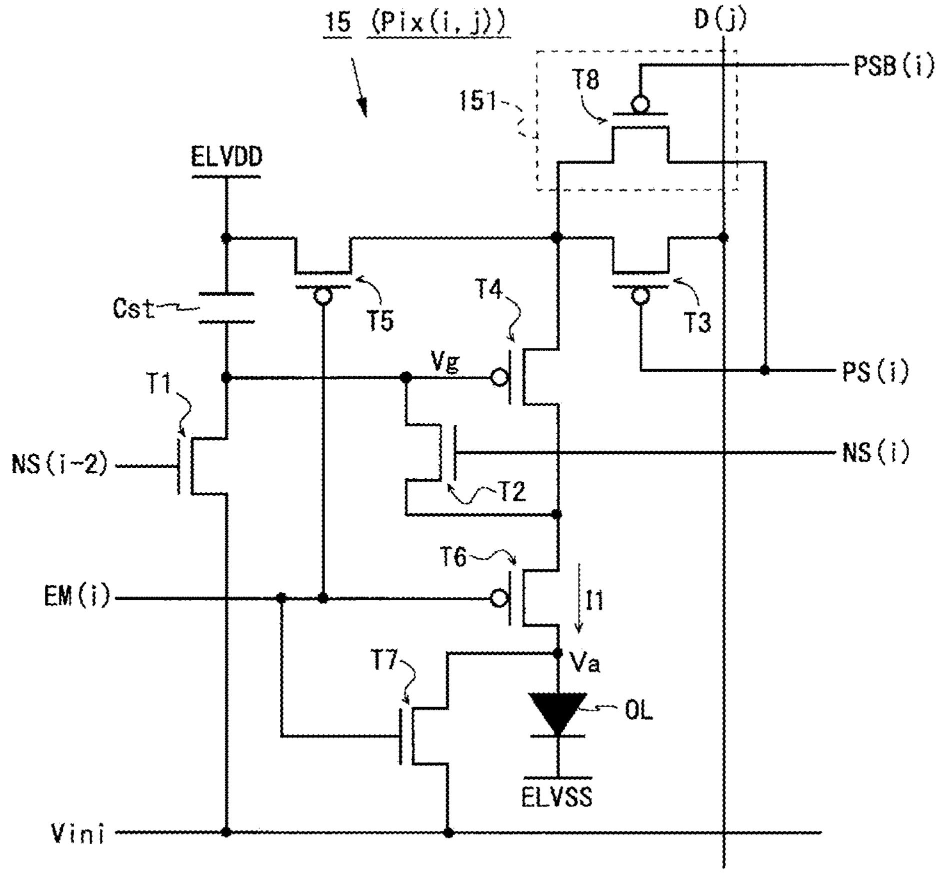
FIG. 11 is a circuit diagram illustrating a configuration of a pixel circuit in a display device according to a second embodiment.

FIG. 11 is a circuit diagram illustrating a configuration of the pixel circuit 15 in the present embodiment, and more specifically, a configuration of a pixel circuit 15 corresponding to the i-th first scanning signal line PSi and the j-th data signal line Dj, i.e., the i-th row, j-th column pixel circuit Pix(i, j) ($1 \leq i \leq n$, $1 \leq j \leq m$). The pixel circuit 15 has a configuration similar to the configuration of the pixel circuit 15 (FIG. 9) according to the first embodiment except for the configuration of the bias applying circuit 151. With respect to portions other than the bias applying circuit 151 in the configuration of the pixel circuit 15, the same components as the components of the pixel circuit 15 in the first embodiment are assigned the same reference signs, and detailed descriptions of those components are omitted.

As illustrated in FIG. 11, to the pixel circuit Pix(i, j) of the i-th row and the j-th column, which is the pixel circuit 15 according to the present embodiment, the corresponding first scanning signal line PSi, the corresponding bias control line PSBi, the corresponding second scanning signal line NSi, the preceding second scanning signal line NSi−2, the corresponding light emission control line EMi, the corresponding data signal line Dj, the initialization voltage line Vini, the high-level power source line ELVDD, and the low-level power source line ELVSS are connected. The bias applying circuit 151 provided in the pixel circuit 15 has a first terminal connected to the corresponding first scanning signal line PSi to receive the voltage of the corresponding first scanning signal PS(i) in the non-active state as the on-bias voltage Vobs and a second terminal connected to the source terminal of the drive transistor T4, and includes a bias applying transistor T8 having a source terminal and a drain terminal respectively connected to the first terminal and the second terminal. The bias applying transistor T8 includes a gate terminal connected to the corresponding bias control line PSBi and operates as a switching element.

Next, the operations of the pixel circuit 15 illustrated in FIG. 11, that is the pixel circuit Pix(i, j) of the i-th row and j-th column according to the present embodiment will be described below with reference to FIG. 12. FIG. 12 is a timing chart for describing the operations of the pixel circuit Pix(i, j) in the non-light emission period included in the RF frame period Trf and the NRF frame period Tnrf.

Figure 12:
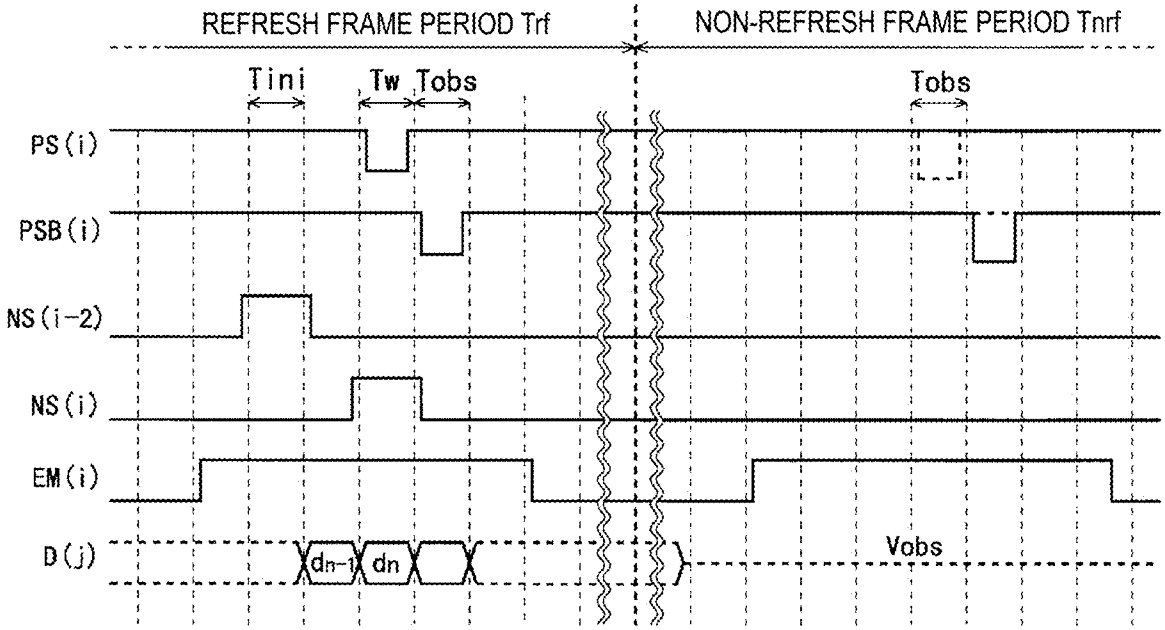
FIG. 12 is a timing chart for describing an operation in a pause driving mode of the pixel circuit according to the second embodiment.

As can be seen by comparing FIG. 12 with FIG. 10, in the RF frame period Trf (within the drive period TD), the first scanning signal PS(i), the second scanning signals NS(i) and NS(i−2), the light emission control signal EM(i), and the data signal D(j) for driving the pixel circuit Pix(i, j) according to the present embodiment change similarly to the first scanning signal PS(i), the second scanning signals NS(i) and NS(i−2), the light emission control signal EM(i), and the data signal D(j) for driving the pixel circuit Pix(i, j) according to the first embodiment. Accordingly, the transistors T1 to T3 and T5 to T7 as the switching elements included in the pixel circuit 15 in the present embodiment operate in the same manner as the transistors T1 to T3 and T5 to T7 as the switching elements included in the pixel circuit 15 in the first embodiment, so that the same initialization operation and data writing operation are performed. As in the first embodiment, in the compensation/writing period Tw, the data writing operation is performed via the drive transistor T4 in the diode-connected state so that threshold compensation is performed.

As illustrated in FIG. 12, in the present embodiment, the corresponding bias control signal PSB(i) remains at H level (non-active) in the initialization period Tini, and is put at L level (active) during a predetermined period in the horizontal period immediately after the compensation/writing period Tw. Here, a horizontal period in which the corresponding bias control signal PSB(i) is L level is referred to as the "on-bias applying period Tobs". Also in the present embodiment, in the pause driving mode as illustrated in FIG. 12, the bias control lines PSB1 to PSBn are driven so as to be sequentially selected in both the RF frame period Trf and the NRF frame period Tnrf. Thus, in both the RF frame period Trf and the NRF frame period Tnrf, in each pixel circuit 15, the voltage of the corresponding first scanning signal PS(i) is applied to the drive transistor T4 as the on-bias voltage Vobs while the corresponding bias control line PSBi is in the activated state. Since the corresponding first scanning signal PS(i) is in a non-select state during the on-bias applying period Tobs, H level voltage of the corresponding first scanning signal PS(i) is applied to the source terminal of the drive transistor T4 as the on-bias voltage Vobs. Thus, in both the RF frame period Trf and the NRF frame period Tnrf, a relatively large voltage stress (Vgs) is applied to the drive transistor T4 from the point in time when the on-bias voltage Vobs is applied to the start point of the light emission period. The period during which this relatively large voltage stress (Vgs) is applied to the drive transistor T4 becomes longer as the light emission duty becomes smaller. The position and length of the period during which such a relatively large voltage stress (Vgs) is applied to the drive transistor T4 are the same in the NRF frame period Tnrf.

Also in the present embodiment, as in the first embodiment, even when the light emission duty is low, the difference in the stress state of the drive transistor T4 between the RF frame period Trf and the NRF frame period Tnrf is reduced. As a result, the luminance difference between the refresh frame period Trf and the non-refresh frame period Tnrf is also reduced, and flicker is not noticeable even when the light emission duty is set low and pause driving is performed. That is, according to the present embodiment, it is possible to obtain a flicker suppression effect that does not depend on the light emission duty in a case where pause driving is performed.

In the present embodiment, the first scanning signal lines PS1 to PSn remain in a non-select state (H level) during the NRF frame period Tnrf. Thus, the data-side drive circuit 30 does not need to output the on-bias voltage Vobs to apply it to the data signal line Dj (j=1 to m) in the NRF frame period Tnrf. However, in the NRF frame period Tnrf, the data-side drive circuit 30 may apply the on-bias voltage Vobs to the data signal line Dj (j=1 to m), and the first scanning signal lines PS1 to PSn may be sequentially selected also in the NRF frame period Tnrf in the same manner as in the RF frame period Trf. In this case, the bias control lines PSB1 to PSBn may remain in an inactivated state in the NRF frame period Tnrf (refer to portions indicated by broken lines in the waveforms of the first scanning signal PS(i) and the bias control signal PSB(i) in FIG. 12).

In the present embodiment, in each pixel circuit Pix(i, j), the corresponding bias control line PSBi is connected to the gate terminal of the bias applying transistor T8 constituting the bias applying circuit 151, and the bias applying transistor T8 is controlled to be turned on and off by the corresponding bias control signal PSB(i). Alternatively, the first scanning signal line PSi+1 immediately after the corresponding first scanning signal line PSi may be connected to the gate terminal of the bias applying transistor T8. Furthermore, in the present embodiment, in each pixel circuit Pix(i, j), the corresponding first scanning signal line PSi is connected to the first terminal of the bias applying circuit 151, and H level voltage of the corresponding first scanning signal PS(i) is provided to the bias applying circuit 151 as the on-bias voltage Vobs. However, other signal lines may be connected to the first terminal as long as the signal lines have a voltage usable as the on-bias voltage Vobs during the on-bias applying period Tobs in which the bias applying transistor T8 is in ON state. For example, instead of the corresponding first scanning signal line PSi, the corresponding light emission control line EMi or the second scanning signal line NSi+1 immediately after the corresponding second scanning signal line NSi may be connected to the first terminal of the bias applying circuit 151. In the present embodiment, the corresponding bias control signal PSB(i) for controlling turning on and off of the bias applying transistor T8 in each pixel circuit P (i, j) changes as illustrated in FIG. 12, but alternatively, the corresponding bias control signal PSB(i) may change as illustrated in FIG. 10. In this case, in the RF frame period Trf, the corresponding bias control signal PSB(i) is put at L level not only after the compensation/writing period Tw but also in the initialization period Tini, and H level voltage of the corresponding first scanning signal PS(i) is applied to the source terminal of the drive transistor T4 as the on-bias voltage Vobs.

3. Third Embodiment

Next, an organic EL display device according to the third embodiment will be described with reference to FIG. 13 to FIG. 15. In this display device, the bias control lines PSB1 to PSBn and the bias voltage line Lobs in the display device according to the first embodiment are not provided, and the voltage of the second scanning signal line is used as the on-bias voltage Vobs. The pixel circuit according to the present embodiment is provided with a bias applying circuit as in the pixel circuit according to the first embodiment, but the configuration is different from the configuration of the bias applying circuit according to the first embodiment. Other configurations of the display device according to the present embodiment are basically the same as the configurations of the display device according to the first embodiment, and the same portions or corresponding portion are assigned the same reference sign and detailed descriptions are omitted (see FIG. 6).

Figure 13:
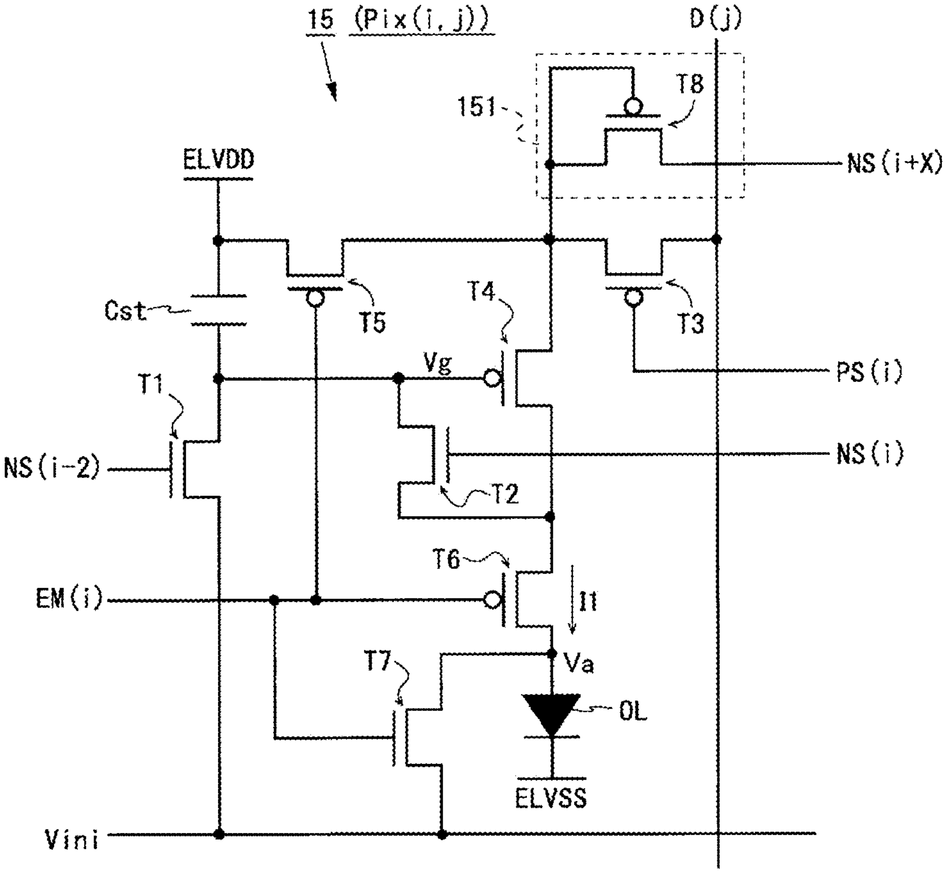
FIG. 13 is a circuit diagram illustrating a first configuration example of a pixel circuit in a display device according to a third embodiment.

FIG. 13 is a circuit diagram illustrating a first configuration of the pixel circuit 15 in the present embodiment, and more specifically, a first configuration of a pixel circuit 15 corresponding to the i-th first scanning signal line PSi and the j-th data signal line Dj, i.e., the i-th row, j-th column pixel circuit Pix(i, j) (1≤i≤n, 1≤j≤m). The pixel circuit 15 has a configuration similar to the configuration of the pixel circuit 15 (FIG. 9) according to the first embodiment except for the configuration of the bias applying circuit 151. With respect to portions other than the bias applying circuit 151 in the configuration of the pixel circuit 15, the same components as the components of the pixel circuit 15 in the first embodiment are assigned the same reference signs, and detailed descriptions of those components are omitted.

As illustrated in FIG. 13, in the pixel circuit Pix(i, j) of the i-th row and the j-th column, which is the pixel circuit 15 according to the present embodiment, the corresponding first scanning signal line PSi, the corresponding second scanning signal line NSi, the preceding second scanning signal line NSi−2, the corresponding light emission control line EMi, the corresponding data signal line Dj, the initialization voltage line Vini, the high-level power source line ELVDD, and the low-level power source line ELVSS are connected, and a succeeding second scanning signal line NSi+X is also connected. Here, X is a positive integer and is selected so that a period during which the second scanning signal NS(i+X) of the succeeding second scanning signal line is H level is included in the non-light emission period of the pixel circuit Pix(i, j) (see FIG. 14 described later). Hereinafter, in the description focusing on the pixel circuit Pix(i, j), such a succeeding second scanning signal line NSi+X specified by X is simply referred to as "succeeding second scanning signal line NSi+X", and a signal of the succeeding second scanning signal line NSi+X is referred to as "succeeding second scanning signal NS(i+X)" (the same applies to other embodiments described later).

As illustrated in FIG. 13, the bias applying circuit 151 provided in the pixel circuit 15 according to the present configuration example has a first terminal connected to the succeeding second scanning signal line NSi+X to receive the voltage of the succeeding second scanning signal NS(i+X) as the on-bias voltage Vobs and a second terminal connected to the source terminal of the drive transistor T4, and includes a P-type bias applying transistor T8 having a source terminal and a drain terminal respectively connected to the first terminal and the second terminal. The bias applying transistor T8 is in a diode-connected state, with the gate terminal connected to the drain terminal.

Next, the operations of the pixel circuit 15 illustrated in FIG. 13, that is the pixel circuit Pix(i, j) of the i-th row and j-th column according to the present configuration example will be described below with reference to FIG. 14. FIG. 14 is a timing chart for describing the operations of the pixel circuit Pix(i, j) in the non-light emission period included in the RF frame period Trf and the NRF frame period Tnrf.

Figure 14:
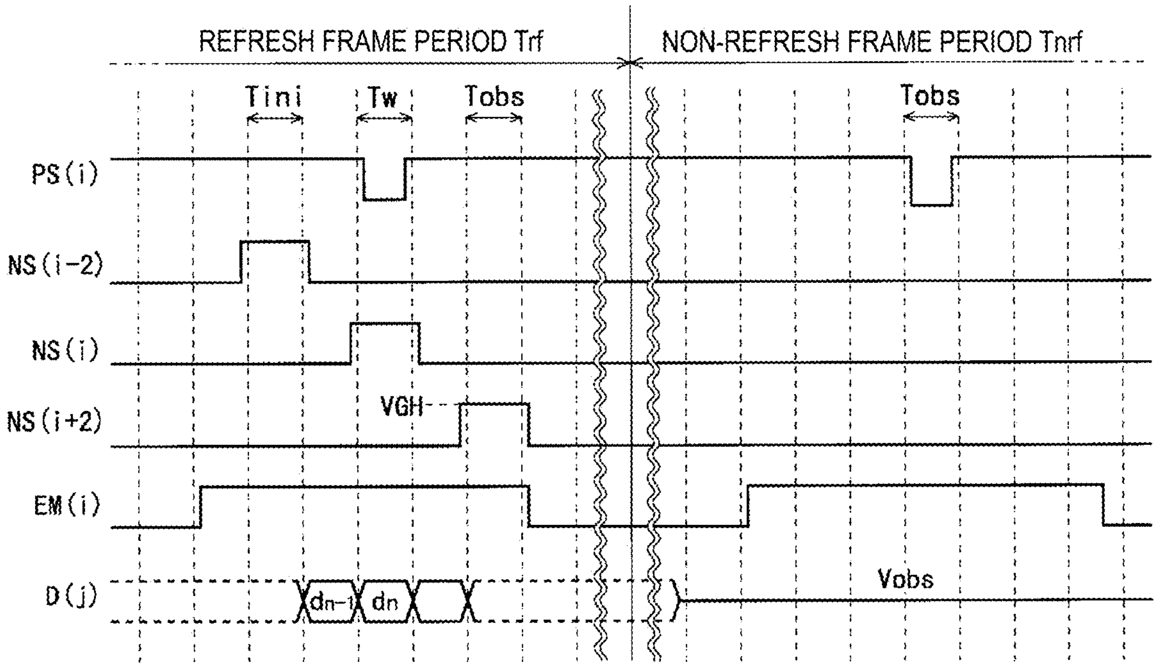
FIG. 14 is a timing chart for describing an operation in a pause driving mode of the pixel circuit according to the first configuration example of the third embodiment.

As can be seen by comparing FIG. 14 with FIG. 10, in the RF frame period Trf (within the drive period TD), the first scanning signal PS(i), the second scanning signals NS(i) and NS(i−2), the light emission control signal EM(i), and the data signal D(j) for driving the pixel circuit Pix(i, j) according to the present embodiment change similarly to the first scanning signal PS(i), the second scanning signals NS(i) and NS(i−2), the light emission control signal EM(i), and the data signal D(j) for driving the pixel circuit Pix(i, j) according to the first embodiment. Accordingly, the transistors T1 to T3 and T5 to T7 as the switching elements included in the pixel circuit 15 in the present embodiment operate in the same manner as the transistors T1 to T3 and T5 to T7 as the switching elements included in the pixel circuit 15 in the first embodiment, so that the same initialization operation and data writing operation are performed. As in the first embodiment, the data writing operation is performed via the drive transistor T4 in the diode-connected state so that threshold compensation is performed.

As illustrated in FIG. 13, in the pixel circuit Pix(i, j) according to the present configuration example, the bias applying circuit 151 receives the succeeding second scanning signal NS(i+X) at the first terminal. As illustrated in FIG. 13, the first terminal is connected to the source terminal of the drive transistor T4 via the bias applying transistor T8 in a diode-connected state. Thus, when the succeeding second scanning signal NS(i+X) is H level, H level voltage is applied to the source terminal of the drive transistor T4 via the bias applying transistor T8.

Since the value of X specifying the succeeding second scanning signal NS(i+X) is selected as described above (X=2 in the example illustrated in FIG. 14), the period during which the succeeding second scanning signal NS(i+X) is H level is included in the period from the end of the compensation/writing period Tw to the start of the light emission period as illustrated in FIG. 14. In the present embodiment, this period is the on-bias applying period Tobs, and during the on-bias applying period Tobs, H level voltage of the succeeding second scanning signal NS(i+X) is applied to the source terminal of the drive transistor T4 as the on-bias voltage Vobs. Thus, in the RF frame period Trf, a relatively large voltage stress (Vgs) is applied to the drive transistor T4 from the point in time when the on-bias voltage Vobs is applied to the start point of the light emission period. The period during which the relatively large voltage stress (Vgs) is applied to the drive transistor T4 in the RF frame period Trf has a start point that does not depend on the light emission duty and has a length that increases as the light emission duty decreases, in a similar manner to the period in the NRF frame period Tnrf described later.

In the present embodiment, as illustrated in FIG. 14, in addition to the light emission control lines EM1 to EMn, the first scanning signal lines PS1 to PSn are also driven so as to be sequentially selected in the same manner in both the RF frame period Trf and the NRF frame period Tnrf. Also, the data-side drive circuit 30 outputs the on-bias voltage Vobs and applies it to the data signal line Dj (j=1 to m) in the NRF frame period Tnrf.

Also in the present embodiment, since the on-bias applying period Tobs for applying the on-bias voltage Vobs is provided between the end of the compensation/writing period Tw and the start of the light emission period in the RF frame period Trf, the difference in the stress state of the drive transistor T4 between the RF frame period Trf and the NRF frame period Tnrf is reduced. Thus, effects similar to the effects of the first and second embodiment can also be obtained with the present embodiment.

Figure 15:
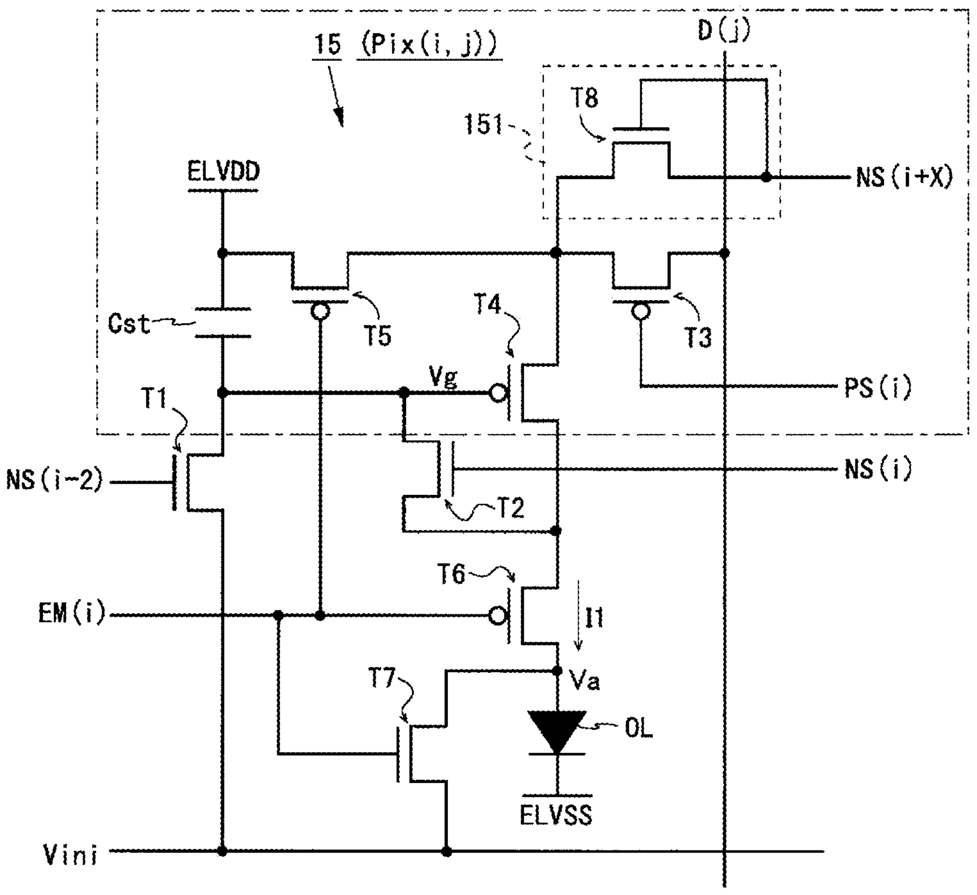
FIG. 15 is a circuit diagram illustrating a second configuration example of the pixel circuit in the display device according to the third embodiment.

FIG. 15 is a circuit diagram illustrating a second configuration of the pixel circuit 15 in the present embodiment, and more specifically, a second configuration of a pixel circuit 15 corresponding to the i-th first scanning signal line PSi and the j-th data signal line Dj, i.e., the i-th row, j-th column pixel circuit Pix(i, j) (1≤i≤n, 1≤j≤m). The pixel circuit 15 is different from the pixel circuit 15 (FIG. 13) according to the first configuration example in that the bias applying transistor T8 in the bias applying circuit 151 is an N-type transistor, but the other configurations are the same as that of the first configuration example. The bias applying circuit 151 in the present configuration example also has a first terminal for receiving the voltage of the succeeding second scanning signal NS(i+X) as the on-bias voltage Vobs and a second terminal connected to the source terminal of the drive transistor T4. The drain terminal and the source terminal of the bias applying transistor T8 are connected to the first and second terminals, respectively, and the bias applying transistor T8 is in a diode-connected state, with the gate terminal connected to the drain terminal.

The pixel circuit Pix(i, j) according to the present configuration example also operates in a similar manner to the pixel circuit Pix(i, j) according to the first configuration example by the first scanning signal PS(i), the second scanning signals NS(i), NS(i−2), and NS(i+2), the light emission control signal EM(i), and the data signal D(j) changing as illustrated in FIG. 14. Thus, even in the case where the pixel circuit Pix(i, j) according to the present configuration example is used in the present embodiment, effects similar to the effects when the pixel circuit Pix(i, j) according to the first configuration example is used can be obtained.

4. Fourth Embodiment

Next, an organic EL display device according to the fourth embodiment will be described with reference to FIG. 16. The display device according to the present embodiment has a configuration similar to the configuration of the display device according to the third embodiment except for the pixel circuit, and the pixel circuit according to the present embodiment has the same configuration as the pixel circuit 15 (FIG. 15) according to the second configuration example in the third embodiment except for the bias applying circuit. Regarding the configurations of the display device according to the present embodiment, portions that are the same or correspond to the configurations of the display device according to the third embodiment are assigned the same reference sign and detailed descriptions are omitted (see FIG. 6, FIG. 14, and FIG. 15). Hereinafter, the present embodiment will be described focusing on the configuration and operations of the bias applying circuit in the pixel circuit of the present embodiment.

Figure 16:
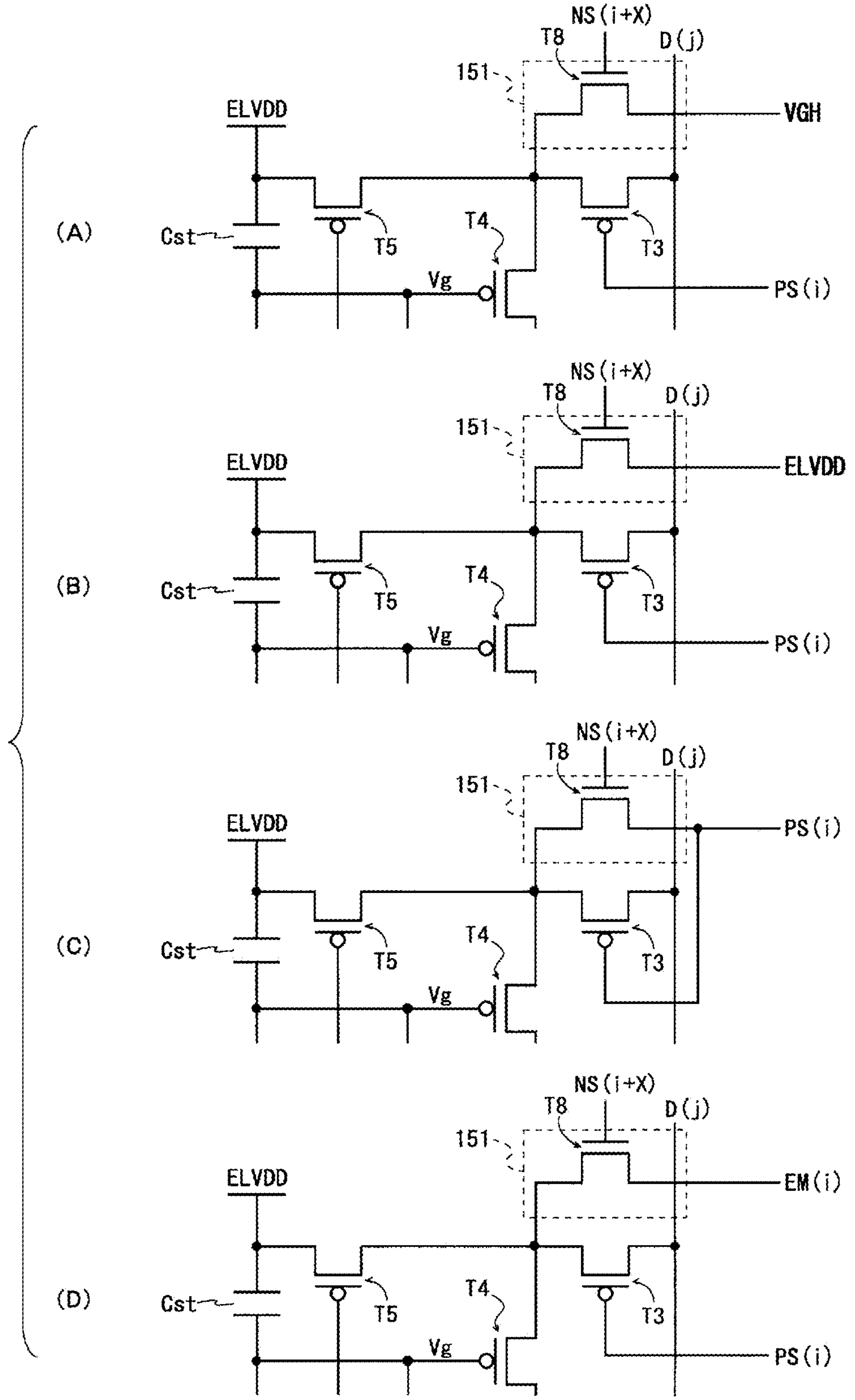
FIG. 16 is circuit diagrams for describing some configuration examples of a pixel circuit according to a fourth embodiment (A to D).

(A) to (D) of FIG. 16 are circuit diagrams for describing first to fourth configuration examples of the pixel circuit according to the present embodiment, with each illustrating a configuration of the portion surrounded by a dashed line in the pixel circuit 15 illustrated in FIG. 15. Each of the pixel circuits 15 according to the first to fourth configuration examples in the present embodiment has the same configuration as the pixel circuit 15 (FIG. 15) according to the second configuration example in the third embodiment except for the bias applying circuit 151. In a similar manner to the third embodiment, to the pixel circuit Pix(i, j) of the i-th row and the j-th column, which is the pixel circuit 15 according to the first to fourth configuration example of the present embodiment, the corresponding first scanning signal line PSi, the corresponding second scanning signal line NSi, the preceding second scanning signal line NSi−2, the succeeding second scanning signal line NSi+X, the corresponding light emission control line EMi, the corresponding data signal line Dj, the initialization voltage line Vini, the high-level power source line ELVDD, and the low-level power source line ELVSS are connected (see FIG. 15). The positive integer X that specifies the succeeding second scanning signal line NSi+X and the succeeding second scanning signal NS(i+X) is selected as in the third embodiment (X=2 in the example illustrated in FIG. 14).

As illustrated in (A) to (D) of FIG. 16, the bias applying circuit 151 provided in any of the pixel circuits 15 according to the first to fourth configuration examples has the first terminal that receives the on-bias voltage Vobs and the second terminal connected to the source terminal of the drive transistor T4 and includes the N-type bias applying transistor T8 having a drain terminal and a source terminal respectively connected to the first and second terminal. In any of the first to fourth configuration examples, the bias applying transistor T8 includes a gate terminal connected to the succeeding second scanning signal line NSi+X and operates as a switching element. In the pixel circuit 15 according to the first to fourth configuration examples, a signal line or voltage line as described later is connected to the first terminal so that the first terminal of the bias applying circuit 151 can receive the on-bias voltage Vobs.

As illustrated in (A) of FIG. 16, in the pixel circuit 15 according to the first configuration example, a voltage line (hereinafter referred to as "gate high-level voltage line") for supplying H level voltage VGH of the first scanning signal PS(i), the second scanning signal NS(i), or the like is connected to the first terminal of the bias applying circuit 151, and the voltage VGH is provided as the on-bias voltage Vobs.

As illustrated in (B) of FIG. 16, in the pixel circuit 15 according to the second configuration example, the high-level power source line ELVDD is connected to the first terminal of the bias applying circuit 151, and the high-level power source voltage ELVDD is provided as the on-bias voltage Vobs.

As illustrated in (C) of FIG. 16, in the pixel circuit 15 according to the third configuration example, the corresponding first scanning signal line PSi is connected to the first terminal of the bias applying circuit 151, and H level voltage of the corresponding first scanning signal PS(i) is provided as the on-bias voltage Vobs.

As illustrated in (D) of FIG. 16, in the pixel circuit 15 according to the fourth configuration example, the corresponding light emission control line EMi is connected to the first terminal of the bias applying circuit 151, and H level voltage of the light emission control signal EM(i) is provided as the on-bias voltage Vobs.

In this manner, the signal line or the voltage line connected to the first terminal of the bias applying circuit 151 (the drain terminal of the bias applying transistor T8) is different between the first to fourth configurations. However, the pixel circuit Pix(i, j) according to the first to fourth configuration example of the present embodiment also operates in a similar manner to the pixel circuit Pix(i, j) according to the third embodiment by the first scanning signal PS(i), the second scanning signals NS(i), NS(i−2), and NS(i+2), the light emission control signal EM(i), and the data signal D(j) changing as illustrated in FIG. 14 (the second scanning signal NS(i+2) in the example illustrated in FIG. 14 corresponds to the succeeding second scanning signal NS(i+X)). Thus, according to the present embodiment, effects similar to those of the third embodiment can also be obtained when applying the first to fourth configuration example to the pixel circuit Pix(i, j).

Although an N-type bias applying transistor T8 is used in the pixel circuit 15 in the present embodiment (see FIG. 16), a P-type bias applying transistor T8 may be used instead, and the first scanning signal line PSi+X succeeding the corresponding first scanning signal line PSi may be connected to the gate terminal of the bias applying transistor T8. Similarly, according to this configuration, effects similar to the effects of the third embodiment can be obtained.

5. Fifth Embodiment

Figure 17:
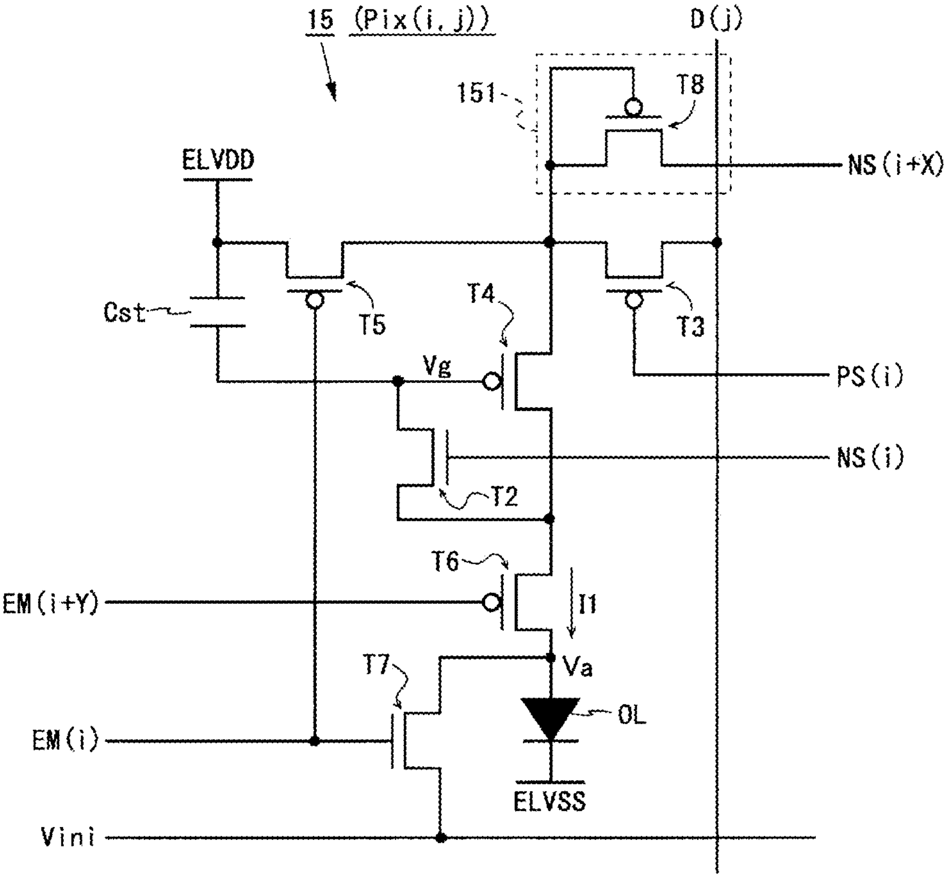
FIG. 17 is a circuit diagram illustrating a configuration of a pixel circuit in a display device according to a fifth embodiment.

Next, an organic EL display device according to the fifth embodiment will be described with reference to FIG. 17 and FIG. 18. The display device according to the present embodiment has a configuration similar to the configuration of the display device according to the third embodiment except for the pixel circuit. The pixel circuit in the present embodiment is different from the pixel circuit in the third embodiment in that the first initialization transistor is not provided, but the other configurations are similar to the configurations of the pixel circuit 15 (FIG. 13) according to the first configuration example in the third embodiment. Regarding the configurations of the display device according to the present embodiment, portions that are the same or correspond to the configurations of the display device according to the third embodiment are assigned the same reference sign and detailed descriptions are omitted (see FIG. 6 and FIG. 13). However, as illustrated in FIG. 17, in the pixel circuit 15 according to the present embodiment, instead of the corresponding light emission control line EMi, a succeeding light emission control line EMi+Y is connected to the gate terminal of the second light emission control transistor T6.

Here, Y is a positive integer and its value is selected as follows. That is, as illustrated in FIG. 18, it is selected so that, in the RF frame period Trf, a succeeding light emission control signal EM(i+Y), which is the signal of the succeeding light emission control line EMi+Y, changes from L level to H level after the corresponding second scanning signal NS(i) changes from L level to H level, and the period (non-active period) during which the succeeding light emission control signal EM(i+Y) is H level partially overlaps the period (active period) during which the corresponding second scanning signal NS(i) is H level. The first scanning signal lines PS1 to PSn are driven such that the select period of the corresponding first scanning signal line PSi is included in the overlap period. Thus, the compensation/writing period Tw is set within this overlap period.

The operations of the pixel circuit 15 illustrated in FIG. 17, that is the pixel circuit Pix(i, j) of the i-th row and j-th column according to the present embodiment will be described below with reference to FIG. 17 and FIG. 18. FIG. 18 is a timing chart for describing the operations of the pixel circuit Pix(i, j) in the non-light emission period included in the RF frame period Trf and the NRF frame period Tnrf.

First, the operations of the pixel circuit Pix(i, j) in the non-light emission period of the RF frame period Trf will be described. As illustrated in FIG. 18, at the start point of the non-light emission period (the point at which the corresponding light emission control signal EM(i) changes from L level to H level), the corresponding first scanning signal PS(i) is H level, and the corresponding second scanning signal NS(i), the succeeding second scanning signal NS(i+X), and the succeeding light emission control signal EM(i+Y) are L level. In the non-light emission period, the second initialization transistor T7 is in ON state. Thus, the anode of the organic EL element OL is initialized.

In the non-light emission period, the period from when the corresponding second scanning signal NS(i) changes to H level to when the succeeding light emission control signal EM(i+Y) changes to H level is the initialization period Tini. As illustrated in FIG. 18, during the initialization period Tini, the corresponding second scanning signal NS(i) and the corresponding light emission control signal EM(i) are H level, and the succeeding light emission control signal EM(i+Y) is L level. Thus, the N-type threshold compensation transistor T2, the N-type second initialization transistor T7, and the P-type second light emission control transistor T6 are all in ON state (see FIG. 17). Accordingly, in the initialization period Tini, a current flows from the holding capacitor Cst connected to the gate terminal of the drive transistor T4 to the initialization voltage line Vini via the threshold compensation transistor T2, the second light emission control transistor T6, and the second initialization transistor T7 in this order, and the gate voltage Vg of the drive transistor T4 is initialized to the initialization voltage Vini.

Since the corresponding second scanning signal NS(i) and the succeeding light emission control signal EM(i+Y) are both H level after the initialization period Tini until the corresponding second scanning signal NS(i) changes from H level to L level, the N-type threshold compensation transistor T2 is in ON state and the P-type second light emission control transistor T6 is in OFF state. Within this period, the period from when the corresponding first scanning signal PS(i) changes from H level to L level to when it returns to H level is the compensation/writing period Tw according to the present embodiment. In the compensation/writing period Tw, since the corresponding first scanning signal PS(i) is L level, the P-type write control transistor T3 is in ON state. Thus, in the compensation/writing period Tw, the voltage of the corresponding data signal D(j) is provided to the holding capacitor Cst as the data voltage Vdata via the drive transistor T4 in a diode-connected state. Accordingly, the post-threshold compensation data voltage is held in the holding capacitor Cst, and the gate voltage Vg of the drive transistor T4 remains at the value of the holding voltage of the holding capacitor Cst.

Figure 18:
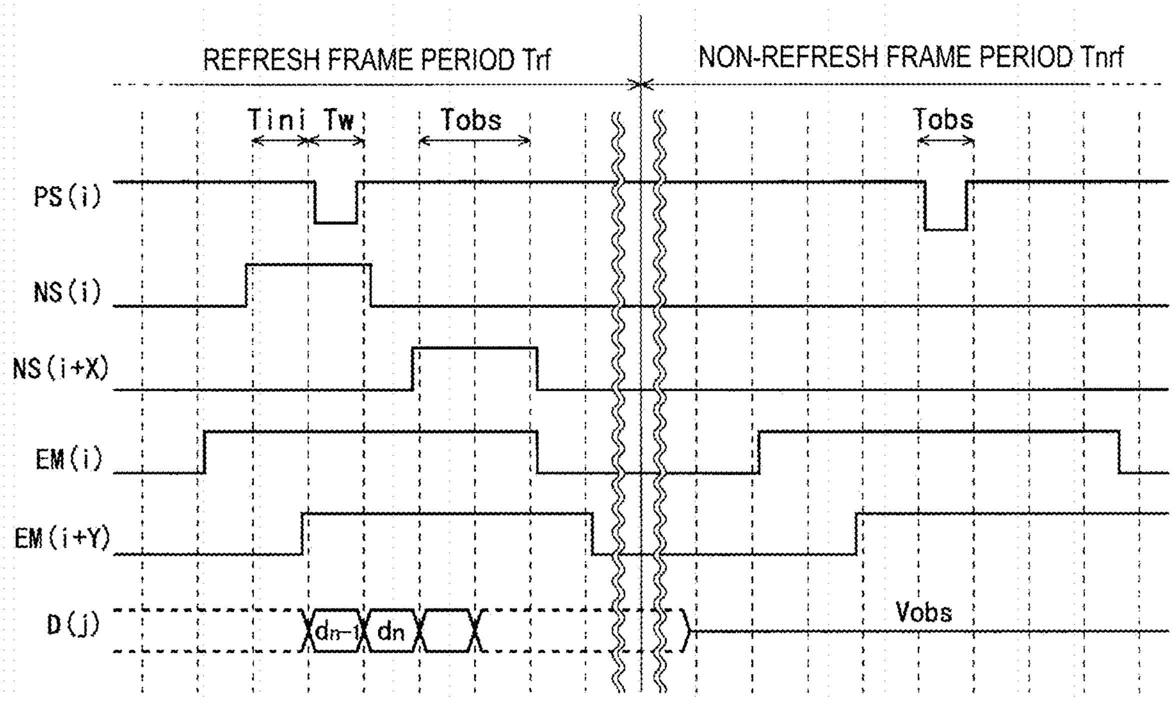
FIG. 18 is a timing chart for describing an operation in a pause driving mode of the pixel circuit according to the fifth embodiment.

The period during which the succeeding second scanning signal NS(i+X) is H level is included in the period from the end of the compensation/writing period Tw to the start of the light emission period as illustrated in FIG. 18, in a similar manner to the third embodiment. In the present embodiment also, this period is the on-bias applying period Tobs, and during the on-bias applying period Tobs, H level voltage of the succeeding second scanning signal NS(i+X) is applied to the source terminal of the drive transistor T4 as the on-bias voltage Vobs via the bias applying transistor T8 in a diode-connected state. Thus, in the RF frame period Trf, a relatively large voltage stress (Vgs) is applied to the drive transistor T4 from the point in time when the on-bias voltage Vobs is applied to the start point of the light emission period. The period during which the relatively large voltage stress (Vgs) is applied to the drive transistor T4 in the RF frame period Trf has a start point that does not depend on the light emission duty and has a length that increases as the light emission duty decreases, in a similar manner to the period in the NRF frame period Tnrf described later. In the present embodiment, the point in time at which the succeeding light emission control signal EM(i+Y) changes from H level to L level is the light emission start point.

In the present embodiment also, as illustrated in FIG. 18, in addition to the light emission control lines EM1 to EMn, the first scanning signal lines PS1 to PSn are also driven so as to be sequentially selected in the same manner in both the RF frame period Trf and the NRF frame period Tnrf. Also, the data-side drive circuit 30 outputs the on-bias voltage Vobs and applies it to the data signal line Dj (j=1 to m) in the NRF frame period Tnrf.

Also in the present embodiment, since the on-bias applying period Tobs for applying the on-bias voltage Vobs is provided between the end of the compensation/writing period Tw and the start of the light emission period in the RF frame period Trf, the difference in the stress state of the drive transistor T4 between the RF frame period Trf and the NRF frame period Tnrf is reduced. Thus, effects similar to the effects of the third embodiment can also be obtained with the present embodiment.

In the present embodiment, in the RF frame period Trf, a path for initializing the gate voltage Vg of the drive transistor T4 is formed by the threshold compensation transistor T2, the second light emission control transistor T6, and the second initialization transistor T7. Thus, it is not necessary to provide a transistor as a switching element for initializing the gate voltage between the holding capacitor Cst and the initialization voltage line Vini (see FIG. 17).

6. Sixth Embodiment

Next, an organic EL display device according to the sixth embodiment will be described with reference to FIG. 19 and FIG. 20. The display device according to the present embodiment has a configuration similar to the configuration of the display device according to the second embodiment except for the pixel circuit. Hereinafter, regarding the configurations of the display device according to the present embodiment, portions that are the same or correspond to the configurations of the display device according to the second embodiment are assigned the same reference sign and detailed descriptions are omitted (see FIG. 6 and FIG. 11).

However, in the present embodiment, in each pixel circuit 15, the first light emission control transistor T5 also functions as a bias applying transistor, and in order to control the first light emission control transistor T5, scanning signal lines for power supply control (hereinafter referred to as "power supply control lines") ES1 to ESn are provided in the display portion 11 instead of the bias control lines PSB1 to PSBn. The power supply control lines ES1 to ESn are arranged along the first scanning signal lines PS1 to PSn, respectively, and are driven by the scanning-side drive circuit 40 so as to be sequentially inactivated each for a predetermined period in both the RF frame period Trf and the NRF frame period Tnrf. As will be described later, the first light emission control transistor T5 according to the present embodiment also functions as a transistor for controlling power source for driving the organic EL element OL. In the present embodiment, as in the second embodiment, the on-bias voltage line Lobs is not necessary, and the high-level power source voltage ELVDD provided to the source terminal of the first light emission control transistor T5 (corresponding to the first terminal of the bias applying circuit 151) functioning as the bias applying transistor is used as the on-bias voltage Vobs.

Figure 19:
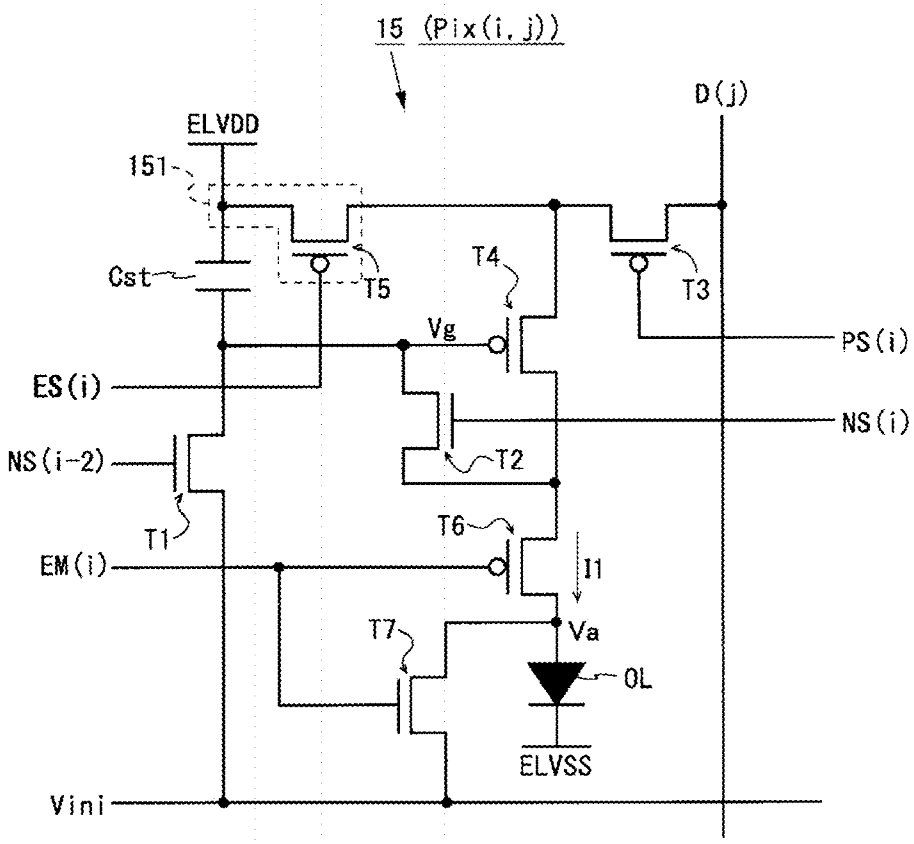
FIG. 19 is a circuit diagram illustrating a configuration of a pixel circuit in a display device according to a sixth embodiment.

FIG. 19 is a circuit diagram illustrating a configuration of the pixel circuit 15 in the present embodiment, and more specifically, a configuration of a pixel circuit 15 corresponding to the i-th first scanning signal line PSi and the j-th data signal line Dj, i.e., the i-th row, j-th column pixel circuit Pix(i, j) ($1 \leq i \leq n$, $1 \leq j \leq m$). The pixel circuit 15 has a configuration similar to the configuration of the pixel circuit 15 (FIG. 11) according to the second embodiment except for the configuration of the bias applying circuit 151. With respect to portions other than the bias applying circuit 151 in the configuration of the pixel circuit 15, the same components as the components of the pixel circuit 15 in the second embodiment are assigned the same reference signs, and detailed descriptions of those components are omitted.

As illustrated in FIG. 19, in the pixel circuit 15 according to the present embodiment, the bias applying transistor T8 in the pixel circuit 15 (FIG. 11) according to the second embodiment is removed, and the first light emission control transistor T5 functions as a bias applying transistor. That is, in the present embodiment, the bias applying circuit 151 includes, as a bias applying transistor, the first light emission control transistor T5 having a source terminal and a drain terminal respectively connected to the first and second terminals thereof, and the first and second terminals of the bias applying circuit 151 are connected to the high-level power source line ELVDD and the source terminal drive transistor T4, respectively. In the present embodiment, each pixel circuit Pix(i, j) corresponds to one of the power supply control lines ES1 to ESn arranged in the display portion 11, and in each pixel circuit Pix(i, j), the corresponding power supply control line ESi is connected to the gate terminal of the first light emission control transistor T5 which also functions as a power supply control transistor instead of the corresponding light emission control line EMi as described later. Hereinafter, the signal of the corresponding power supply control line ESi is referred to as "corresponding power supply control signal ES(i)".

The operations of the pixel circuit 15 illustrated in FIG. 19, that is the pixel circuit Pix(i, j) of the i-th row and j-th column according to the present embodiment will be described later with reference to FIG. 19 and FIG. 20. FIG. 19 is a timing chart for describing the operations of the pixel circuit Pix(i, j) in the non-light emission period included in the RF frame period Trf and the NRF frame period Tnrf.

Figure 20:
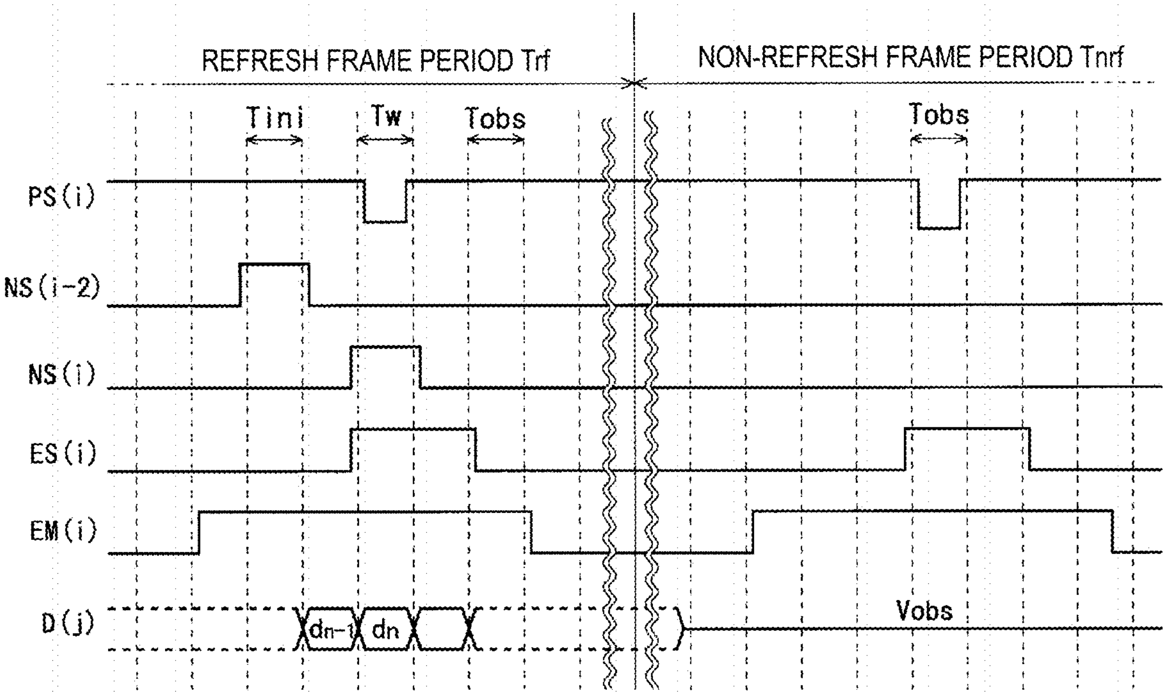
FIG. 20 is a timing chart for describing an operation in a pause driving mode of the pixel circuit according to the sixth embodiment.

As can be seen by comparing FIG. 20 with FIG. 12, in the RF frame period Trf (within the drive period TD), the first scanning signal PS(i), the second scanning signals NS(i) and NS(i−2), the light emission control signal EM(i), and the data signal D(j) for driving the pixel circuit Pix(i, j) according to the present embodiment change similarly to the first scanning signal PS(i), the second scanning signals NS(i) and NS(i−2), the light emission control signal EM(i), and the data signal D(j) for driving the pixel circuit Pix(i, j) according to the second embodiment. Accordingly, the transistors T1 to T3 and T6 to T7 as the switching elements included in the pixel circuit 15 in the present embodiment operate in the same manner as the transistors T1 to T3 and T6 to T7 as the switching elements included in the pixel circuit 15 in the first embodiment, so that the same initialization operation and data writing operation are performed. As in the second embodiment, in the compensation/writing period Tw, the data writing operation is performed via the drive transistor T4 in the diode-connected state so that threshold compensation is performed.

As illustrated in FIG. 20, in the present embodiment, the corresponding power supply control signal ES(i) is L level at the start point of the RF frame period Trf, is H level (non-active) during the compensation/writing period Tw, and changes from H level (non-active) to L level (active) at a constant timing independent of the light emission duty before the start of the light emission period after the compensation/writing period Tw. The period from when the corresponding power supply control signal ES(i) changes to H level to the start of light emission (until the corresponding light emission control signal EM(i) changes to L level) is the on-bias applying period Tobs. During the on-bias applying period Tobs, the high-level power source voltage ELVDD is applied as the on-bias voltage Vobs to the source terminal of the drive transistor T4 via the first light emission control transistor T5 as the bias applying transistor. As described above, in the present embodiment, not only the light emission control lines EM1 to EMn but also the power supply control lines ES1 to ESn are driven in a similar manner in both the RF frame period Trf and the NRF frame period Tnrf. Thus, in both the RF frame period Trf and the NRF frame period Tnrf, a relatively large voltage stress (Vgs) is applied to the drive transistor T4 from the point in time when the on-bias voltage Vobs is applied to the start point of the light emission period. The period during which this relatively large voltage stress (Vgs) is applied to the drive transistor T4 becomes longer as the light emission duty becomes smaller in both the RF frame period Trf and the NRF frame period Tnrf.

According to the present embodiment, since the first light emission control transistor T5 functions as a bias applying transistor, a similar effect as the effect of the second embodiment can be obtained without newly providing the bias applying circuit 151 in each pixel circuit 15. In other words, even when the light emission duty is low, the difference in the stress state of the drive transistor T4 between the RF frame period Trf and the NRF frame period Tnrf is reduced. As a result, the luminance difference between the refresh frame period Trf and the non-refresh frame period Tnrf is also reduced, and flicker is not noticeable even when the light emission duty is set low and pause driving is performed.

As described above, also in the NRF frame period Tnrf, the power supply control lines ES1 to ESn are driven, and the high-level power source voltage ELVDD is applied to the source terminal of the drive transistor T4 as the on-bias voltage Vobs. Thus, in the NRF frame period Tnrf, it is not necessary to provide the on-bias voltage Vobs from the data signal line D(j) to the drive transistor T4. Accordingly, in the NRF frame period Tnrf, the first scanning signal lines PS1 to PSn may remain at H level (non-select state) without being driven, and the data signal lines D1 to Dm may also remain in a high impedance state without being driven. However, in the present embodiment, as illustrated in FIG. 20, in the NRF frame period Tnrf, the data-side drive circuit 30 applies the on-bias voltage Vobs to each data signal line Dj (j=1 to m), and the first scanning signal lines PS1 to PSn are sequentially selected. According to such a configuration, a more preferable on-bias voltage Vobs can be supplied to the drive transistor T4 via the data signal line D(j).

7. Seventh Embodiment

Next, an organic EL display device according to the seventh embodiment will be described with reference to FIG. 21 and FIG. 22. The display device according to the present embodiment has a configuration similar to the configuration of the display device according to the sixth embodiment. Regarding the configurations of the display device according to the present embodiment, portions that are the same or correspond to the configurations of the display device according to the sixth embodiment are assigned the same reference sign and detailed descriptions are omitted (see FIG. 6 and FIG. 19), and hereinafter, the present embodiment will be described focusing on the configurations and operations of the portions that differ between the two.

In the present embodiment, the power supply control lines ES1 to ESn are not provided, and instead of the corresponding power supply control line ESi, a light emission control line EMi+X subsequent to the corresponding light emission control line EMi is used to control on-bias application to the drive transistor in each pixel circuit. In the present embodiment, the light emission control signals EM(1) to EM(n) are used not only for controlling the light emission of the organic EL element but also for controlling on-bias application to the drive transistor T4. For this reason, the waveforms of the light emission control signals EM(1) to EM(n) in the present embodiment are different from the waveforms of the light emission control signals EM(1) to EM(n) in the sixth embodiment (see FIG. 20 and FIG. 22). These details are described later.

Figure 21:
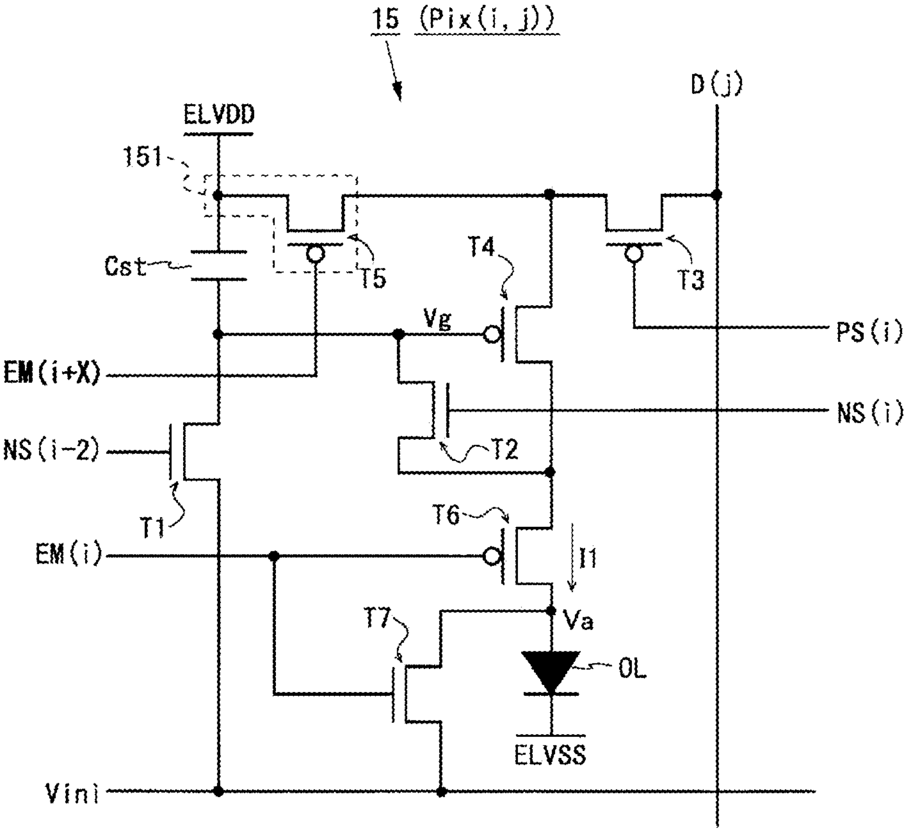
FIG. 21 is a circuit diagram illustrating a configuration of a pixel circuit in a display device according to a seventh embodiment.

FIG. 21 is a circuit diagram illustrating a configuration of the pixel circuit 15 in the present embodiment, and more specifically, a configuration of a pixel circuit 15 corresponding to the i-th first scanning signal line PSi and the j-th data signal line Dj, i.e., the i-th row, j-th column pixel circuit Pix(i, j) ($1 \leq i \leq n$, $1 \leq j \leq m$). As can be seen by comparing FIG. 21 with FIG. 19, the pixel circuit 15 has a configuration similar to the configuration of the pixel circuit in the sixth embodiment, and the first light emission control transistor T5 functions as a bias applying transistor. However, instead of the corresponding power supply control line ESi, a predetermined light emission control line (hereinafter simply referred to as "succeeding light emission control line") EMi+X that succeeds the corresponding light emission control line EMi is connected to the gate terminal of the first light emission control transistor T5. The pixel circuit 15 according to the present embodiment has a configuration similar to the configuration of the pixel circuit 15 (FIG. 19) according to the sixth embodiment except for this point. With respect to the pixel circuit 15, the same components as the components of the pixel circuit 15 in the sixth embodiment are assigned the same reference signs, and detailed descriptions of those components are omitted. Hereinafter, the signal of the succeeding light emission control line EMi+X is referred to as "succeeding light emission control signal EM(i+X)". Further, the value of X specifying the succeeding light emission control line EMi+X will be described in detail below together with the waveform of the light emission control signal EM(i).

The operations of the pixel circuit 15 illustrated in FIG. 21, that is the pixel circuit Pix(i, j) of the i-th row and j-th column according to the present embodiment will be described below with reference to FIG. 21 and FIG. 22. FIG. 22 is a timing chart for describing the operations of the pixel circuit Pix(i, j) in the non-light emission period included in the RF frame period Trf and the NRF frame period Tnrf.

Figure 22:
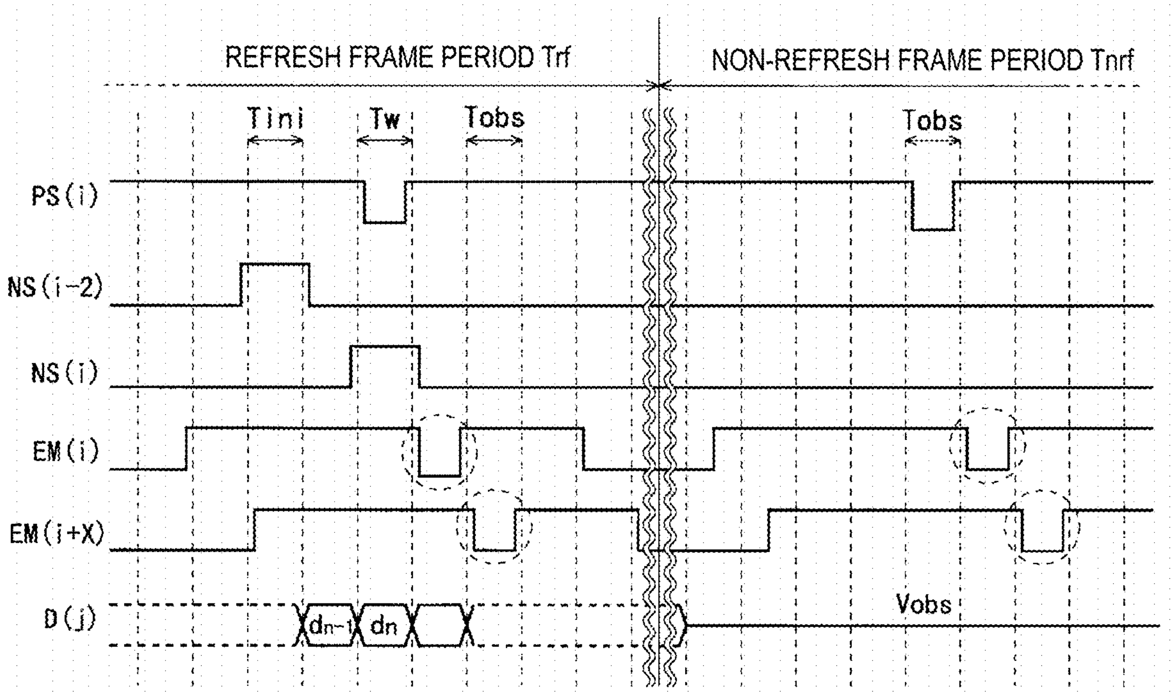
FIG. 22 is a timing chart for describing an operation in a pause driving mode of the pixel circuit according to the seventh embodiment.

As can be seen by comparing FIG. 22 with FIG. 20, in the RF frame period Trf (within the drive period TD), the first scanning signal PS(i), the second scanning signals NS(i) and NS(i−2), and the data signal D(j) for driving the pixel circuit Pix(i, j) according to the present embodiment change similarly to the first scanning signal PS(i), the second scanning signals NS(i) and NS(i−2), and the data signal D(j) for driving the pixel circuit Pix(i, j) according to the sixth embodiment. As illustrated in FIG. 22, during a period in which the first initialization transistor T1 is in ON state due to the preceding second scanning signal NS(i−2) being H level, at least one of the corresponding light emission control signal EM(i) and the succeeding light emission control signal EM(i+X) is H level, and thus at least one of the first light emission control transistor T5 and the second light emission control transistor T6 is in OFF state. Also, during a period in which the threshold compensation transistor T2 is in ON state due to the corresponding second scanning signal NS(i) being H level, both of the corresponding light emission control signal EM(i) and the succeeding light emission control signal EM(i+X) are H level, and thus both of the first light emission control transistor T5 and the second light emission control transistor T6 are in OFF state. Accordingly, the transistors T1 to T3 as the switching elements included in the pixel circuit 15 in the present embodiment operate in the same manner as the transistors T1 to T3 as the switching elements included in the pixel circuit 15 in the first embodiment, so that the same initialization operation and data writing operation are performed. As in the sixth embodiment, in the compensation/writing period Tw, the data writing operation is performed via the drive transistor T4 in the diode-connected state so that threshold compensation is performed.

As described above, the first light emission control transistor functions as a bias applying transistor, and the succeeding light emission control line EMi+X is connected to the gate terminal thereof. Thus, turning the bias applying transistor on and off is controlled by the succeeding light emission control signal EM(i+X). In the present embodiment, as illustrated in FIG. 22, to provide the on-bias applying period Tobs after the compensation/writing period Tw and before the start point of the light emission period (a period in which the control signals EM(i) and EM(i+X) are both L level), in the non-light emission period (a period during which at least one of the control signals EM(i) and EM(i+X) is H level), the succeeding light emission control signal EM(i+X) is put at L level for a predetermined period after the compensation/writing period Tw and before the start of the light emission period (hereinafter, this predetermined period is referred to as "on-bias active period"). The position (start point) of the on-bias active period is set so as not to depend on the light emission duty. The scanning-side drive circuit 40 in the present embodiment generates the light emission control signals EM(1) to EM(n) such that each has such an on-bias active period and drives the light emission control lines EM1 to EMn via the light emission control signals EM(1) to EM(n) in both the RF frame period Trf and the NRF frame period Tnrf.

Here, regarding the pixel circuit Pix(i, j) corresponding to each light emission control line EMi, as illustrated in FIG. 22, the value of X as a positive integer for specifying the succeeding light emission control line EMi+X is selected so that the corresponding light emission control signal EM(i) is put at L level (active) in the on-bias active period after the period in which the corresponding second scanning signal NS(i) is H level (active) for data writing with threshold compensation and before the start of the light emission period, and the on-bias active period of the corresponding light emission control signal EM(i) and the on-bias active period of the succeeding light emission control signal EM(i+X) do not overlap.

According to the present embodiment as described above, since the bias application is controlled by the succeeding light emission control signal EM(i+X) and the on-bias active period of the succeeding light emission control signal EM(i+X) becomes the on-bias applying period Tobs (see FIG. 22), similar effects as the effects of the sixth embodiment are obtained without providing the bias control lines PSB1 to PSBn or the power supply control lines ES1 to ESn corresponding thereto.

In the present embodiment, in the pixel circuit Pix(i, j), the light emission control signal EM(i+X) provided to the gate terminal of the first light emission control transistor T5 functioning as a bias applying transistor is the succeeding light emission control signal EM(i+X), and X specifying this is a positive integer. However, a negative integer may be selected as X, and the preceding light emission control signal EM(i+X) may be provided to the gate terminal of the first light emission control transistor T5 functioning as a bias applying transistor. In this modified example, the corresponding light emission control signal EM(i) and the preceding light emission control signal EM(i+X) for the pixel circuit Pix(i, j) correspond to the succeeding light emission control signal EM(i+X) and the corresponding light emission control signal EM(i) illustrated in FIG. 22, respectively. However, in this modified example, the second light emission control transistor T6 is put in ON state after the on-bias voltage Vobs is applied to the source terminal of the drive transistor T4, thereby lowering the potential of the source terminal. Thus, as X, it is preferable to select a positive integer rather than a negative integer.

8. Eighth Embodiment

Next, an organic EL display device according to the eight embodiment will be described with reference to FIG. 23 and FIG. 24. The display device according to the present embodiment has a configuration substantially similar to the configuration of the display device according to the third embodiment except for the pixel circuit. Regarding the configurations of the display device according to the present embodiment, portions that are the same or correspond to the configurations of the display device according to the third embodiment are assigned the same reference sign and detailed descriptions are omitted (see FIG. 6, FIG. 13, FIG. 15). Hereinafter, the present embodiment will be described focusing on the configuration and operations of the bias applying circuit in the pixel circuit of the present embodiment.

Figure 23:
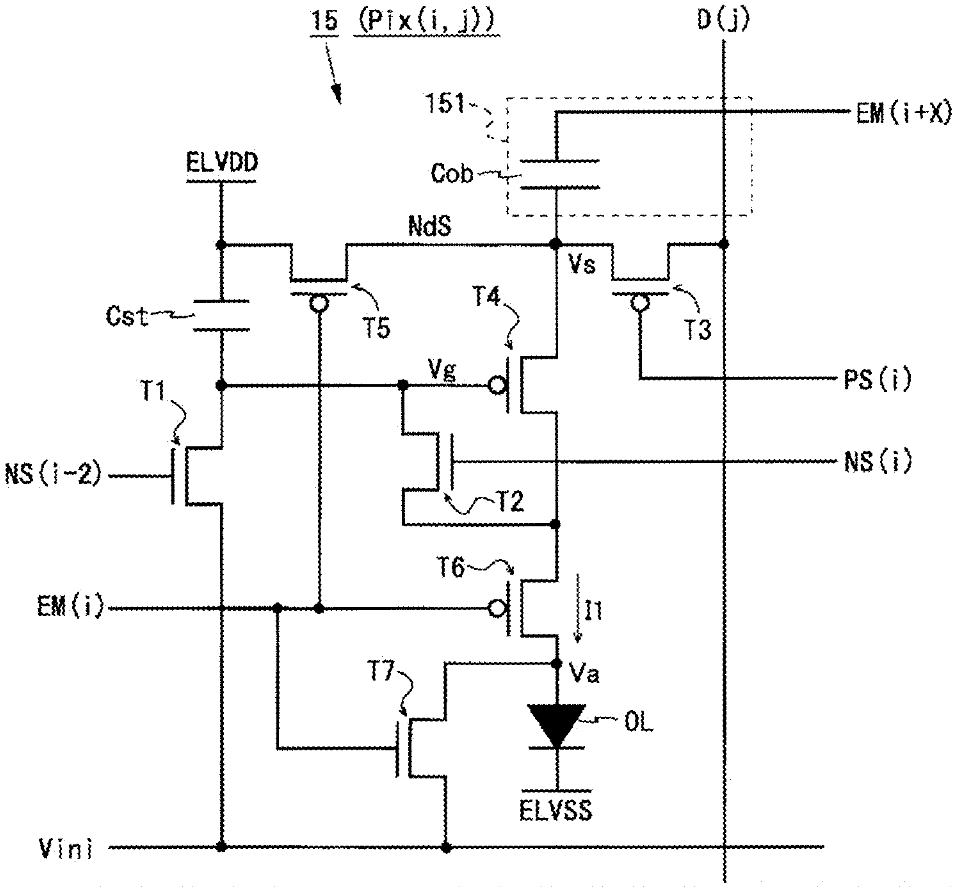
FIG. 23 is a circuit diagram illustrating a configuration of a pixel circuit in a display device according to an eighth embodiment.

FIG. 23 is a circuit diagram illustrating a configuration of the pixel circuit 15 in the present embodiment, and more specifically, a configuration of a pixel circuit 15 corresponding to the i-th first scanning signal line PSi and the j-th data signal line Dj, i.e., the i-th row, j-th column pixel circuit Pix(i, j) ($1 \le i \le n$, $1 \le j \le m$). The pixel circuit 15 has a configuration similar to the configuration of the pixel circuit 15 (FIG. 13 and FIG. 15) according to the third embodiment except for the configuration of the bias applying circuit 151. With respect to portions other than the bias applying circuit 151 in the configuration of the pixel circuit 15, the same components as the components of the pixel circuit 15 in the third embodiment are assigned the same reference signs, and detailed descriptions of those components are omitted.

As illustrated in FIG. 23, to the pixel circuit Pix(i, j) of the i-th row and the j-th column, which is the pixel circuit 15 according to the present embodiment, the corresponding first scanning signal line PSi, the corresponding second scanning signal line NSi, the preceding second scanning signal line NSi−2, the corresponding light emission control line EMi, the corresponding data signal line Dj, the initialization voltage line Vini, the high-level power source line ELVDD, and the low-level power source line ELVSS are connected, and the light emission control line EMi+X succeeding the corresponding light emission control line EMi is also connected. Here, X is a positive integer and is selected so that the light emission control signal EM(i+X) of the succeeding light emission control line EMi+X changes from L level to H level after the data writing with threshold compensation is completed for the pixel circuit Pix(i, j) and before the corresponding light emission control signal EM(i) changes from H level to L level, in the RF frame period Trf (see FIG. 24). Hereinafter, in the description focusing on the pixel circuit Pix(i, j), the light emission control line EMi+X specified by X in this manner is simply referred to as "succeeding light emission control line EMi+X", and a signal of the succeeding light emission control line EMi+X is referred to as "succeeding light emission control signal EM(i+X)".

As illustrated in FIG. 23, the bias applying circuit 151 provided in the pixel circuit 15 in the present embodiment has a first terminal connected to the succeeding light emission control line EMi+X to receive the voltage of the succeeding light emission control signal EM(i+X) as an on-bias applying signal Sobs and a second terminal connected to the source terminal of the drive transistor T4, and includes a bias applying capacitor Cob. In the bias applying circuit 151, the first terminal is connected to the second terminal via the bias applying capacitor Cob.

Next, the operations of the pixel circuit 15 illustrated in FIG. 23, that is the pixel circuit Pix(i, j) of the i-th row and j-th column according to the present embodiment will be described with reference to FIG. 24. FIG. 24 is a timing chart for describing the operations of the pixel circuit Pix(i, j) in the non-light emission period included in the RF frame period Trf and the NRF frame period Tnrf.

Figure 24:
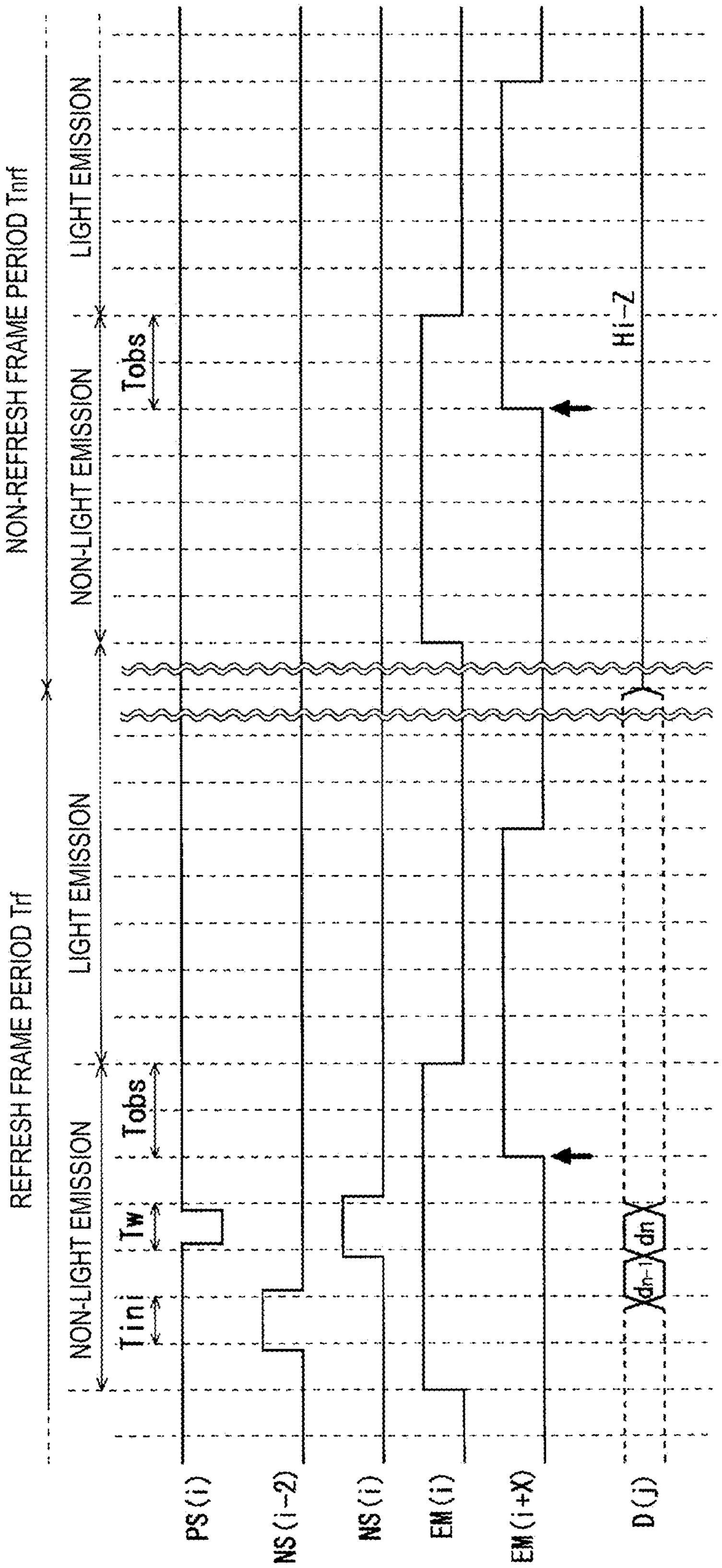
FIG. 24 is a timing chart for describing an operation in a pause driving mode of the pixel circuit according to the eighth embodiment.

As can be seen by comparing FIG. 24 with FIG. 14, in the RF frame period Trf (within the drive period TD), the first scanning signal PS(i), the second scanning signals NS(i) and NS(i−2), the light emission control signal EM(i), and the data signal D(j) for driving the pixel circuit Pix(i, j) according to the present embodiment change similarly to the first scanning signal PS(i), the second scanning signals NS(i) and NS(i−2), the light emission control signal EM(i), and the data signal D(j) for driving the pixel circuit Pix(i, j) according to the third embodiment. Accordingly, the transistors T1 to T3 and T5 to T7 as the switching elements included in the pixel circuit 15 in the present embodiment operate in the same manner as the transistors T1 to T3 and T5 to T7 as the switching elements included in the pixel circuit 15 in the third embodiment, so that the same initialization operation and data writing operation are performed.

As illustrated in FIG. 23, in the pixel circuit Pix(i, j) according to the present embodiment, the bias applying circuit 151 receives the succeeding light emission control signal EM(i+X) at the first terminal. The first terminal is connected to the source terminal (node NdS illustrated in FIG. 23) of the drive transistor T4 via the bias applying capacitor Cob. As described above, in the RF frame period Trf, the succeeding light emission control signal EM(i+X) changes from L level to H level after the data writing with threshold compensation is completed (more precisely, after the threshold compensation transistor T2 changes to OFF state due to the change of the corresponding second scanning signal NS(i) to L level) and before the corresponding light emission control signal EM(i) changes from H level to L level (before the start of the light emission period) (see FIG. 24). At this point in time, the node NdS including the source terminal of the drive transistor T4 is in a floating state, thus the voltage (hereinafter also referred to as "source voltage") Vs of the source terminal changes in the same direction as the change of the succeeding light emission control signal EM(i+X) from L level to H level. That is, the source voltage Vs of the drive transistor T4 rises in response to the change of the succeeding light emission control signal EM(i+X) from L level to H level. The amount of increase in the source voltage Vs can be made substantially equal to the voltage difference between L level and H level of the succeeding light emission control signal EM(i+X) by setting the capacitance of the bias applying capacitor Cob sufficiently larger than the parasitic capacitance added to the node NdS.

In the RF frame period Trf, via the operations described above, a relatively large voltage stress (Vgs) is applied to the drive transistor T4 from the point in time when the succeeding light emission control signal EM(i+X) changes from L level to H level (see the upward arrow in FIG. 24) to the start point of the light emission period. In the present embodiment, the period during which the relatively large voltage stress (Vgs) is applied to the drive transistor T4 in this manner is the on-bias applying period Tobs. In a similar manner to the on-bias applying period Tobs described later in the NRF frame period Tnrf, the start point of the on-bias applying period Tobs does not depend on the light emission duty, and the length of the on-bias applying period Tobs increases as the light emission duty decreases.

In the NRF frame period Tnrf (within the pause period TP) in the present embodiment, none of the first scanning signal lines PS1 to PSn, the second scanning signal lines NS−1 to NSn, and the data signal lines D1 to Dm are driven, the first scanning signals PS(1) to PS(n) remain at H level, the second scanning signals NS(−1) to NS(n) remain at L level, and the data signals D(1) to D(m) are in a high impedance state (see FIG. 24). On the other hand, as illustrated in FIG. 24, the light emission control lines EM1 to EMn are driven in the same manner in both the RF frame period Trf and the NRF frame period Tnrf. Thus, also in the NRF frame period Tnrf, as in the RF frame period Trf, the on-bias applying period Tobs is a period from the point in time (see the upward arrow in FIG. 24) when the succeeding light emission control signal EM(i+X) changes to H level to the point in time when the corresponding light emission control signal EM(i) changes to L level. Also, in this on-bias applying period Tobs, the voltage stress (Vgs) having the same magnitude as the voltage stress (Vgs) in the on-bias applying period Tobs in the RF frame period Trf is applied to the drive transistor T4.

According to the present embodiment, as in the third embodiment, even when the light emission duty is low, the difference in the stress state of the drive transistor T4 between the RF frame period Trf and the NRF frame period Tnrf is reduced. As a result, the luminance difference between the refresh frame period Trf and the non-refresh frame period Tnrf is also reduced, and flicker is not noticeable even when the light emission duty is set low and pause driving is performed. That is, according to the present embodiment also, it is possible to obtain a flicker suppression effect that does not depend on the light emission duty in a case where pause driving is performed.

Further, according to the present embodiment, in the NRF frame period Tnrf, none of the first scanning signal lines PS1 to PSn, the second scanning signal lines NS−1 to NSn, and the data signal lines D1 to Dm are driven (see FIG. 24). Thus, it is possible to greatly reduce the power consumption by the pause driving compared to the other embodiments described above.

9. Ninth Embodiment

Next, an organic EL display device according to the ninth embodiment will be described with reference to FIG. 25 and FIG. 26. In the display device according to the present embodiment, the bias applying circuit included in the pixel circuit is configured with the bias applying capacitor Cob in a similar manner to the display device according to the eighth embodiment. However, the present embodiment differs from the eighth embodiment in the drive signal provided to the bias applying circuit as the on-bias applying signal Sobs, and accordingly differs from the eighth embodiment also in the waveform of the drive signal of the pixel circuit. However, regarding other configurations, the display device according to the present embodiment has a configuration similar to the configuration of the display device according to the eighth embodiment. Regarding the configurations of the display device according to the present embodiment, portions that are the same or correspond to the configurations of the display device according to the eighth embodiment are assigned the same reference sign and detailed descriptions are omitted (see FIG. 6 and FIG. 23).

Figure 25:
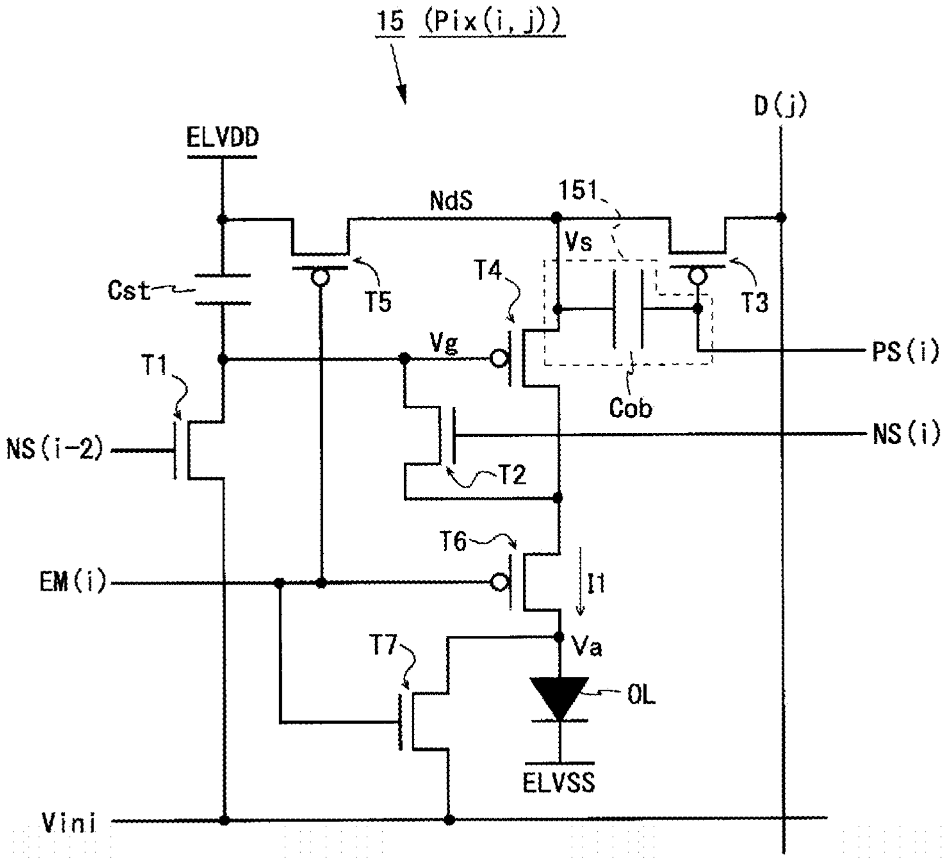
FIG. 25 is a circuit diagram illustrating a configuration of a pixel circuit in a display device according to a ninth embodiment.

FIG. 25 is a circuit diagram illustrating a configuration of the pixel circuit 15 in the present embodiment, and more specifically, a configuration of a pixel circuit 15 corresponding to the i-th first scanning signal line PSi and the j-th data signal line Dj, i.e., the i-th row, j-th column pixel circuit Pix(i, j) ($1 \leq i \leq n$, $1 \leq j \leq m$). The pixel circuit 15 has a configuration similar to the configuration of the pixel circuit 15 (FIG. 23) according to the eighth embodiment except for how the bias applying capacitor Cob constituting the bias applying circuit 151 is connected. With respect to the pixel circuit 15, the same or corresponding components as the components of the pixel circuit 15 in the eighth embodiment are assigned the same reference signs, and detailed descriptions of those components are omitted.

As illustrated in FIG. 25, to the pixel circuit Pix(i, j) of the i-th row and the j-th column, which is the pixel circuit 15 according to the present embodiment, the corresponding first scanning signal line PSi, the corresponding second scanning signal line NSi, the preceding second scanning signal line NSi−2, the corresponding light emission control line EMi, the corresponding data signal line Dj, the initialization voltage line Vini, the high-level power source line ELVDD, and the low-level power source line ELVSS are connected, and the succeeding light emission control line EMi+X is not connected, which is different from the pixel circuit 15 (FIG. 23) according to the eighth embodiment.

The bias applying circuit 151 provided in the pixel circuit Pix(i, j) according to the present embodiment also includes the bias applying capacitor Cob, and in the bias applying circuit 151, the first terminal is connected to the second terminal via the bias applying capacitor Cob (see FIG. 25). As illustrated in FIG. 25, the first terminal of the bias applying circuit 151 is connected to the corresponding first scanning signal line PSi and the second terminal is connected to the source terminal (the node NdS illustrated in FIG. 25) of the drive transistor T4. Thus, the gate terminal of the write control transistor T3 to which the corresponding first scanning signal line PSi is connected is connected to the node NdS including the drain terminal of the write control transistor T3 via the bias applying capacitor Cob. Taking into account this connection configuration, the parasitic capacitance between the gate and the drain of the write control transistor T3 of the pixel circuit Pix(i, j) may be used as the bias applying capacitor Cob.

Next, the operations of the pixel circuit 15 illustrated in FIG. 25, that is the pixel circuit Pix(i, j) of the i-th row and j-th column according to the present embodiment will be described with reference to FIG. 26. FIG. 26 is a timing chart for describing the operations of the pixel circuit Pix(i, j) in the non-light emission period included in the RF frame period Trf and the NRF frame period Tnrf.

Figure 26:
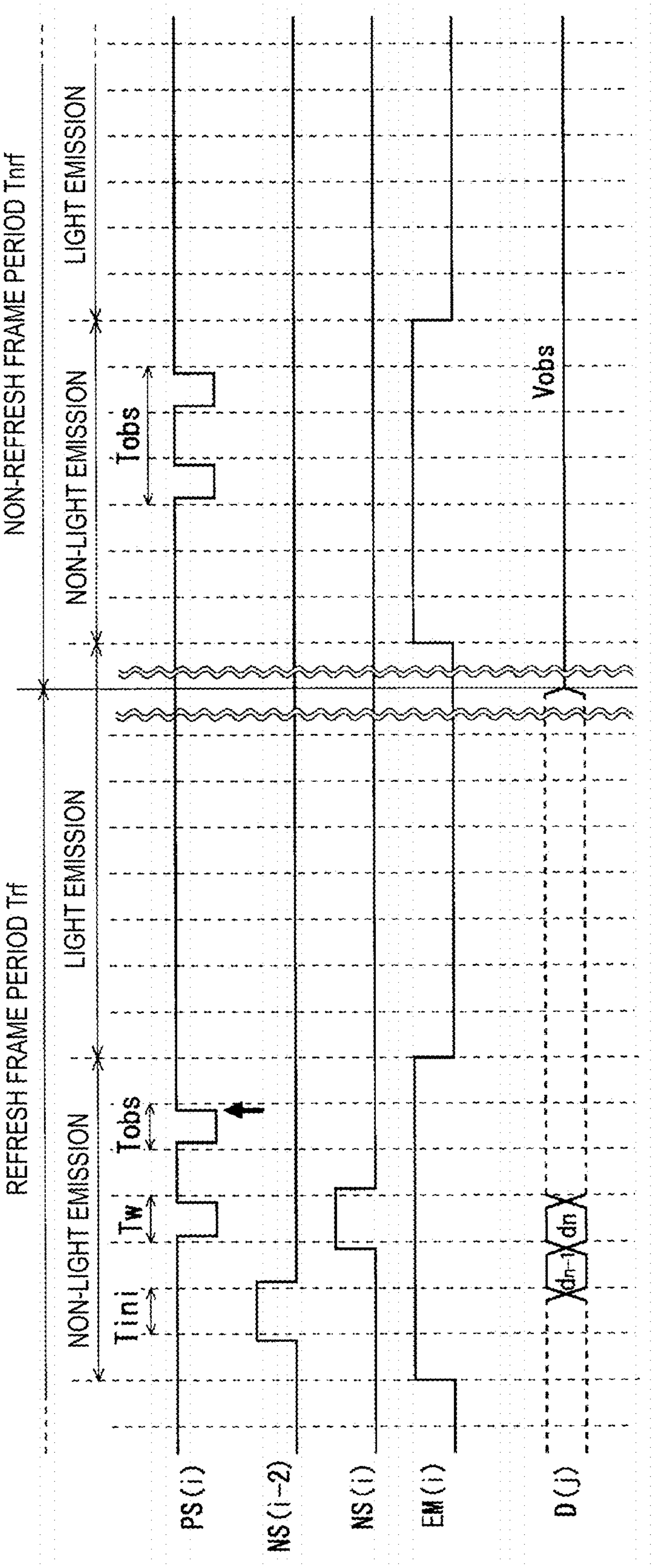
FIG. 26 is a timing chart for describing an operation in a pause driving mode of the pixel circuit according to the ninth embodiment.

As can be seen by comparing FIG. 26 with FIG. 24, in the RF frame period Trf (within the drive period TD), the first scanning signal PS(i), the second scanning signals NS(i) and NS(i−2), the light emission control signal EM(i), and the data signal D(j) for driving the pixel circuit Pix(i, j) according to the present embodiment change similarly to the first scanning signal PS(i), the second scanning signals NS(i) and NS(i−2), the light emission control signal EM(i), and the data signal D(j) for driving the pixel circuit Pix(i, j) according to the eighth embodiment. Accordingly, the transistors T1 to T3 and T5 to T7 as the switching elements included in the pixel circuit 15 in the present embodiment operate in the same manner as the transistors T1 to T3 and T5 to T7 as the switching elements included in the pixel circuit 15 in the eighth embodiment, so that the same initialization operation and data writing operation are performed.

As illustrated in FIG. 25, in the pixel circuit Pix(i, j) according to the present embodiment, the bias applying circuit 151 receives the corresponding first scanning signal PS(i) at the first terminal. As illustrated in FIG. 26, unlike in the eighth embodiment, the corresponding first scanning signal PS(i) is not only L level (active) for a predetermined period in the compensation/writing period Tw, but is also L level again for a predetermined period between when the compensation/writing period Tw is completed and when the light emission period (the period in which the corresponding light emission control signal EM(i) is L level) is started. That is, in the present embodiment, the scanning-side drive circuit 40 drives the first scanning signal lines PS1 to PSn so that, for the pixel circuit Pix(i, j) corresponding to each first scanning signal line PSi, the corresponding first scanning signal line PSi is not only in the select state in the compensation/writing period Tw but is also in the select state for a predetermined period after a period in which the corresponding second scanning signal NS(i) is H level for the data writing with threshold compensation and before the light emission period starts.

By driving the first scanning signal lines PS1 to PSn as described above, in the RF frame period Trf, the corresponding first scanning signal PS(i) of the pixel circuit Pix(i, j) changes from H level to L level after the data writing with threshold compensation is completed (specifically, after the threshold compensation transistor T2 changes to OFF state due to the change of the corresponding second scanning signal NS(i) to L level), remains in L level for a predetermined period, and changes from L level to H level before the corresponding light emission control signal EM(i) changes from H level to L level (see FIG. 26). Thus, at the point in time when the corresponding first scanning signal PS(i) changes from L level to H level after the compensation/writing period Tw and before the start of the light emission period (see the upward arrow in FIG. 26), the node NdS including the source terminal of the drive transistor T4 is in a floating state. Thus, the voltage (source voltage) Vs of the source terminal of the drive transistor T4 changes in the same direction as the change of the corresponding first scanning signal PS(i) from L level to H level. That is, the source voltage Vs of the drive transistor T4 rises in response to the change of the corresponding first scanning signal PS(i) from L level to H level. The amount of increase in the source voltage Vs can be made substantially equal to the voltage difference between L level and H level of the corresponding first scanning signal PS(i) by setting the capacitance of the bias applying capacitor Cob sufficiently larger than the parasitic capacitance added to the node NdS and making the rise time of the corresponding first scanning signal PS(i) sufficiently smaller.

In the RF frame period Trf, via the operations described above, a relatively large voltage stress (Vgs) is applied to the drive transistor T4 from the point in time when the corresponding first scanning signal PS(i) changes from L level to H level after the compensation/writing period Tw and before the start of the light emission period (see the upward arrow in FIG. 26) to the start point of the light emission period. In the present embodiment, the period during which the corresponding first scanning signal PS(i) is L level after the compensation/writing period Tw and before the start of the light emission period is the on-bias applying period Tobs, at the end point of the on-bias applying period Tobs, the corresponding first scanning signal PS(i) changes from L level to H level, and from that point in time onward until the corresponding light emission control signal EM(i) changes from H level to L level, a relatively large voltage stress (Vgs) is applied to the drive transistor T4. The period during which the relatively large voltage stress (Vgs) is applied to the drive transistor T4 in the RF frame period Trf has a start point that does not depend on the light emission duty and has a length that increases as the light emission duty decreases. In the on-bias applying period Tobs, since the node NdS is charged with the data voltage to be written to the pixel circuit Pix(i+2,j) in the (i+2)-th row, the magnitude of the voltage stress (Vgs) depends on the voltage of the data signal D(j) in the (i+2)-th scanning period.

In the NRF frame period Tnrf (within the pause period TP) in the present embodiment, the second scanning signal lines NS−1 to NSn are not driven and the second scanning signals NS(−1) to NS(n) are remain at L level, but unlike in the eighth embodiment, as illustrated in FIG. 26, the first scanning signal lines PS1 to PSn are driven in a similar manner as in the RF frame period even in the NRF frame period Tnrf. The light emission control lines EM1 to EMn are also driven in the NRF frame period Tnrf in a similar manner as in the RF frame period Trf. Further, the on-bias voltage Vobs is applied to each data signal line Dj from the data-side drive circuit 30 in the NRF frame period Tnrf.

With the above-described operations, in the NRF frame period Tnrf, in a similar manner as in the RF frame period, a period during which the corresponding first scanning signal PS(i) is L level for each pixel circuit Pix(i, j) appears twice (see FIG. 26), and the on-bias voltage Vobs output from the data-side drive circuit 30 is provided from the corresponding data signal line Dj to the source terminal (the node NdS) of the drive transistor T4 via the write control transistor T3 in both periods. In the present embodiment, the period from the start point of the preceding period to the end point of the succeeding period of both periods is the on-bias applying period Tobs, and a relatively large voltage stress is applied to the drive transistor T4 during a period from the start point of the on-bias applying period Tobs (a point in time when the corresponding first scanning signal PS(i) first changes from H level to L level in the NRF frame period Tnrf) to the start point of the light emission period (a point in time when the corresponding light emission control signal EM(i) changes from H level to L level). Also, the period during which the relatively large voltage stress is applied to the drive transistor T4 has a start point that does not depend on the light emission duty and has a length that increases as the light emission duty decreases in the NRF frame period Tnrf as well. Since the voltage stress (Vgs) is based on the on-bias voltage Vobs output from the data-side drive circuit 30, the voltage stress (Vgs) can be set to a suitable value in consideration of the magnitude of the voltage stress (Vgs) applied to the drive transistor T4 in the RF frame period Trf.

According to the present embodiment, as in the eighth embodiment, even when the light emission duty is low, the difference in the stress state of the drive transistor T4 between the RF frame period Trf and the NRF frame period Tnrf is reduced. As a result, the luminance difference between the refresh frame period Trf and the non-refresh frame period Tnrf is also reduced, and flicker is not noticeable even when the light emission duty is set low and pause driving is performed. That is, according to the present embodiment, it is possible to obtain a flicker suppression effect that does not depend on the light emission duty in a case where pause driving is performed.

10. Modified Example

The disclosure is not limited to each of the embodiments described above, and various modifications may be made without departing from the scope of the disclosure. For example, the following modified example can be considered.

In each of the embodiments described above, the pixel circuit 15 and the unit circuit in the scanning-side drive circuit 40 include both a P-type transistor and an N-type transistor. Typically, LTPS-TFT with high mobility is used for a P-type transistor, and an oxide TFT such as IGZO-TFT with good off-leakage characteristics is used for an N-type transistor. However, the disclosure is not limited to these TFTs, and the channel of the transistor to be used may be changed as appropriate between the P-type and the N-type, with the transistors being configured to operate in a similar manner. For example, in each embodiment, a configuration in which an N-type LTPS-TFT is used instead of the P-type LTPS-TFT may be employed.

In the display device according to each embodiment described above, the pixel circuit 15 configured as illustrated in FIG. 9 and the like is used. However, the configuration of the pixel circuit is not limited to this. It is sufficient that the pixel circuit of the internal compensation method including a threshold compensation transistor is configured such that a data voltage written to a holding capacitor is held and a bias voltage can be applied for reducing a threshold shift caused by the hysteresis characteristic of a drive transistor.

In an organic EL display device having the pause driving mode as in the display device according to each of the embodiments described above, typically, the light emission control lines EM1 to EMn are driven such that the light emission duty is the same in both the drive period TD and the pause period TP. However, it may be configured such that the light emission duty can be set to be different in the drive period TD and the pause period TP.

In the above description, an organic EL display device has been described as an example and embodiments have been given. However, the disclosure is not limited to an organic EL display device and may be applied to any display device that employs an internal compensation method using a display element driven by a current and that performs pause driving. The display element that can be used in such a configuration includes, for example, an organic EL element, that is, an organic light-emitting diode (OLED), or an inorganic light-emitting diode, a quantum dot light-emitting diode (QLED) or the like.

Note that the features of the display device described above may be optionally combined, without contradicting its properties and without departing from the nature of the disclosure, and a display device including some features of the above-described embodiments and modified examples may be configured.

REFERENCE SIGNS LIST

10 Organic EL display device
11 Display portion
15 Pixel circuit
20 Display control circuit
30 Data-side drive circuit (data signal line drive circuit)
40 Scanning-side drive circuit (scanning signal line drive circuit/light emission control circuit/bias control circuit)
151 Bias applying circuit
Pix(i, j) Pixel circuit (i=1 to n, j=1 to m)
PSi First scanning signal line (i=1, 2, . . . , n)
NSi Second scanning signal line (i=−1, 0, 1, . . . , n)
EMi Light emission control line (i=1 to n)
PSBi Bias control line (i=1 to n)
Lobs On-bias voltage line
Dj Data signal line (j=1 to m)
ELVDD High-level power source line (first power source line), high-level power source voltage
ELVSS Low-level power source line (second power source line), low-level power source voltage
OL Organic EL element (display element)
Cst Holding capacitor
Cob Bias applying capacitor
T1 First initialization transistor
T2 Threshold compensation transistor
T3 Write control transistor
T4 Drive transistor
T5 First light emission control transistor
T6 Second light emission control transistor
T7 Second initialization transistor
T8 Bias applying transistor
TD Drive period
TP Pause period
Trf Refresh frame period (RF frame period)
Tnrf Non-refresh frame period (NRF frame period)
Vobs On-bias voltage
Sobs On-bias signal

The invention claimed is:

1. A display device comprising:

a display portion including a plurality of pixel circuits;

a drive circuit configured to drive the plurality of pixel circuits; and a display control circuit configured to control the drive circuit in such a manner that a drive period and a pause period alternately appear, the drive period consisting of one or more refresh frame periods in which voltage of a plurality of data signals is written, as data voltage, to the plurality of pixel circuits, the pause period consisting of one or more non-refresh frame periods in which writing of data voltage to the plurality of pixel circuits is stopped, wherein each pixel circuit of the plurality of pixel circuits includes a display element configured to be driven by a current, a drive transistor provided in series with the display element and including a control terminal, a first conduction terminal, and a second conduction terminal, a holding capacitor having one terminal connected to the control terminal of the drive transistor and thus being configured to hold a voltage of the control terminal of the drive transistor, a write control transistor, as a switching element, having a first conduction terminal configured to receive a data voltage to be written to the holding capacitor and a second conduction terminal connected to the first conduction terminal of the drive transistor, a threshold compensation transistor, as a switching element, provided between the second conduction terminal and the control terminal of the drive transistor, the threshold compensation transistor being configured to put the drive transistor in a diode-connected state when in ON state, at least one light emission control transistor, as a switching element, provided in series with the display element and the drive transistor, and a bias applying circuit configured to apply, to the drive transistor, a bias voltage for reducing threshold voltage shift caused by a hysteresis characteristic of the drive transistor, the bias applying circuit having a first terminal configured to receive the bias voltage or a signal for generating the bias voltage and a second terminal connected to the first conduction terminal of the drive transistor, and the display control circuit is configured to control the drive circuit in such a manner that the drive circuit causes the light emission control transistor to be turned on and off and thus the display element emits light at a predetermined light emission duty in the drive period and the display element emits light at a predetermined light emission duty in the pause period, and, in both the drive period and the pause period, the bias voltage is applied to the first conduction terminal of the drive transistor in a period during which the light emission control transistor is in OFF state for the each pixel circuit, and configured to control the drive circuit in such a manner that, in the drive period, in the each pixel circuit, in a period during which the light emission control transistor is in OFF state, the write control transistor and the threshold compensation transistor are put in ON state for a predetermined period, and during a bias period provided from when the threshold compensation transistor changes to OFF state to when the light emission control transistor changes to ON state, the bias applying circuit applies the bias voltage, based on a voltage or signal received at the first terminal, to the first conduction terminal of the drive transistor.

2. The display device according to claim 1, wherein the display portion further includes a bias voltage line configured to supply the bias voltage, the bias applying circuit includes a bias applying transistor, as a switching element, having a first conduction terminal and a second conduction terminal that are connected to the first terminal and the second terminal of the bias applying circuit, respectively, and in each pixel circuit of the plurality of pixel circuits, the first terminal of the bias applying circuit is connected to the bias voltage line.

3. The display device according to claim 1, wherein the bias applying circuit includes a bias applying transistor, as a switching element, having a first conduction terminal and a second conduction terminal that are connected to the first terminal and the second terminal of the bias applying circuit, respectively, and each pixel circuit of the plurality of pixel circuits is configured in such a manner that, from among signals provided to a control terminal of a transistor other than the bias applying transistor in the each pixel circuit or another pixel circuit, a signal having a voltage corresponding to the bias voltage in the bias period or a power source voltage corresponding to the bias voltage is provided to the first conduction terminal of the bias applying transistor.

4. The display device according to claim 2, wherein the display portion further includes a plurality of data signal lines, a plurality of first scanning signal lines, a plurality of light emission control lines, a plurality of bias control lines, a first power source line, and a second power source line, the drive circuit includes a data-side drive circuit configured to generate a plurality of data signals and apply the plurality of data signals to the plurality of data signal lines, and a scanning-side drive circuit configured to selectively drive the plurality of first scanning signal lines and selectively inactivate the plurality of light emission control lines, each pixel circuit of the plurality of pixel circuits corresponds to one of the plurality of data signal lines, corresponds to one of the plurality of first scanning signal lines, corresponds to one of the plurality of light emission control lines, and corresponds to one of the plurality of bias control lines, the at least one light emission control transistor includes a first emission control transistor and a second light emission control transistor, the first conduction terminal of the drive transistor is connected to a corresponding data signal line of the plurality of data signal lines via the write control transistor, connected to the first power source line via the first light emission control transistor, and connected, via the bias applying transistor, to a corresponding first scanning signal line of the plurality of first scanning signal lines, a second scanning signal line having a voltage corresponding to the bias voltage in the bias period from among second scanning signal lines succeeding a corresponding second scanning signal line of the plurality of second scanning signal lines, a corresponding light emission control line of the plurality of light emission control lines, the first power source line, or the bias voltage line, the second conduction terminal of the drive transistor is connected to a first terminal of the display element via the second light emission control transistor, a second terminal of the display element is connected to the second power source line, the first light emission control transistor and the second light emission control transistor each further have a control terminal connected to a corresponding light emission control line of the plurality of light emission control lines, the write control transistor further has a control terminal connected to a corresponding first scanning signal line of the plurality of first scanning signal lines, the bias applying transistor further has a control terminal connected to a corresponding bias control line of the plurality of the bias control lines, and the scanning-side drive circuit drives the plurality of bias control lines in such a manner that, in the drive period, each bias control line of the plurality of bias control lines is in an activated state in the bias period for a pixel circuit corresponding to the each bias control line.

5. The display device according to claim 3, wherein the display portion further includes a plurality of data signal lines, a plurality of first scanning signal lines, a plurality of second scanning signal lines, a plurality of light emission control lines, a first power source line, and a second power source line, the drive circuit includes a data-side drive circuit configured to generate a plurality of data signals and apply the plurality of data signals to the plurality of data signal lines, and a scanning-side drive circuit configured to selectively drive the plurality of first scanning signal lines, selectively drive the plurality of second scanning signal lines, and selectively inactivate the plurality of light emission control lines, each pixel circuit of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, the at least one light emission control transistor includes a first light emission control transistor and a second light emission control transistor that are both P-channel transistors and each further have a control terminal connected to a corresponding light emission control line of the plurality of light emission control lines, the write control transistor is a P-channel transistor and further has a control terminal connected to a corresponding first scanning signal line of the plurality of first scanning signal lines, the threshold compensation transistor is an N-channel transistor and further has a control terminal connected to a corresponding second scanning signal line of the plurality of second scanning signal lines, the drive transistor is a P-channel transistor, with the first conduction terminal being connected to a corresponding data signal line of the plurality of data signal lines via the write control transistor and connected to the first power source line via the first light emission control transistor and the second conduction terminal being connected to a first terminal of the display element via the second light emission control transistor, a second terminal of the display element is connected to the second power source line, to a control terminal of the bias applying transistor, a scanning signal line is connected that puts the bias applying transistor in ON state in a period in the drive period from when the threshold compensation transistor changes to OFF state to when the first light emission control transistor changes to ON state, the scanning signal line being selected from a first scanning signal line put in a select state after a corresponding first scanning signal line of the plurality of first scanning signal lines and a second scanning signal line put in a select state after a corresponding second scanning signal line of the plurality of second scanning signal lines, and the first conduction terminal of the bias applying transistor is connected to the first power source line, a corresponding first scanning signal line of the plurality of first scanning signal lines, or a corresponding light emission control line of the plurality of light emission control lines.

6. The display device according to claim 1, wherein the bias applying circuit includes a bias applying transistor, as a switching element, having a first conduction terminal and a second conduction terminal that are connected to the first terminal and the second terminal of the bias applying circuit, respectively, the bias applying transistor is configured in a diode-connected state, and each pixel circuit of the plurality of pixel circuits is configured in such a manner that, from among signals provided to a control terminal of a transistor other than the bias applying transistor in the each pixel circuit or another pixel circuit, a signal having a voltage corresponding to the bias voltage only in a period from when the threshold compensation transistor changes to OFF state to when the light emission control transistor changes to ON state is provided to the first conduction terminal of the bias applying transistor in the drive period.

7. The display device according to claim 6, wherein the display portion further includes a plurality of data signal lines, a plurality of first scanning signal lines, a plurality of second scanning signal lines, a plurality of light emission control lines, a first power source line, and a second power source line, the drive circuit includes a data-side drive circuit configured to generate a plurality of data signals and apply the plurality of data signals to the plurality of data signal lines, and a scanning-side drive circuit configured to selectively drive the plurality of first scanning signal lines, selectively drive the plurality of second scanning signal lines, and selectively inactivate the plurality of light emission control lines, each pixel circuit of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, the at least one light emission control transistor includes a first light emission control transistor and a second light emission control transistor each further having a control terminal connected to a corresponding light emission control line of the plurality of light emission control lines, the write control transistor further has a control terminal connected to a corresponding first scanning signal line of the plurality of first scanning signal lines, the threshold compensation transistor further has a control terminal connected to a corresponding second scanning signal line of the plurality of second scanning signal lines, the first conduction terminal of the drive transistor is connected to a corresponding data signal line of the plurality of data signal lines via the write control transistor, connected to the first power source line via the first light emission control transistor, and connected to a predetermined succeeding scanning signal line via the bias applying transistor, the second conduction terminal of the drive transistor is connected to a first terminal of the display element via the second light emission control transistor, a second terminal of the display element is connected to the second power source line, and the predetermined succeeding scanning signal line is a scanning signal line having a voltage corresponding to the bias voltage only in a period in the drive period from when the threshold compensation transistor changes to OFF state to when the first light emission control transistor changes to ON state, the predetermined succeeding scanning signal line being selected from a first scanning signal line put in a select state after a corresponding first scanning signal line of the plurality of first scanning signal lines and a second scanning signal line put in a select state after a corresponding second scanning signal line of the plurality of second scanning signal lines.

8. The display device according to claim 6,
wherein the bias applying transistor is a P-channel transistor and is configured in a diode-connected state by the second conduction terminal being connected to a control terminal.

9. The display device according to claim 6,
wherein the bias applying transistor is an N-channel transistor and is configured in a diode-connected state by the first conduction terminal being connected to a control terminal.

10. The display device according to claim 1,
wherein the display portion further includes an initialization voltage line,
each pixel circuit of the plurality of pixel circuits further includes a display element initialization transistor, as a switching element, having a first conduction terminal connected to a first terminal of the display element and a second conduction terminal connected to the initialization voltage line,
the at least one light emission control transistor includes
a first light emission control transistor connected between the first power source line and the drive transistor, and
a second light emission control transistor connected between the drive transistor and the display element, and
the drive circuit, when initializing a holding voltage of the holding capacitor, performs control to put the threshold compensation transistor, the second light emission control transistor, and the display element initialization transistor in ON state and performs control to put the write control transistor and the first light emission control transistor in OFF state.

11. The display device according to claim 1,
wherein the bias applying circuit includes a bias applying transistor, as a switching element, having a first conduction terminal and a second conduction terminal that are connected to the first terminal and the second terminal of the bias applying circuit, respectively,
the at least one light emission control transistor includes, as the bias applying transistor, a first light emission control transistor connected between the first power source line and the drive transistor and includes a second light emission control transistor connected between the drive transistor and the display element, and
the drive circuit drives the plurality of pixel circuits in such a manner that, in the drive period, the first light emission control transistor functions as the bias applying transistor by being in ON state for a predetermined period in a period from when writing of data voltage to the holding capacitor is completed to when the second light emission control transistor changes to ON state, regardless of light emission duty.

12. The display device according to claim 11,
wherein the display portion further includes a plurality of data signal lines, a plurality of first scanning signal lines, a plurality of power supply control lines, a plurality of light emission control lines, a first power source line, and a second power source line,
the drive circuit includes
a data-side drive circuit configured to generate a plurality of data signals and apply the plurality of data signals to the plurality of data signal lines, and
a scanning-side drive circuit configured to selectively drive the plurality of first scanning signal lines, selectively inactivate the plurality of light emission control lines according to a predetermined light emission duty, and selectively inactivate the plurality of power supply control lines,
each pixel circuit of the plurality of pixel circuits corresponds to one of the plurality of data signal lines, corresponds to one of the plurality of first scanning signal lines, corresponds to one of the plurality of light emission control lines, and corresponds to one of the plurality of power supply control lines,
the drive transistor is a P-channel transistor, with the first conduction terminal being connected to a corresponding data signal line of the plurality of data signal lines via the write control transistor and connected to the first power source line via the first light emission control transistor and the second conduction terminal being connected to a first terminal of the display element via the second light emission control transistor,
a second terminal of the display element is connected to the second power source line,
the write control transistor further has a control terminal connected to a corresponding first scanning signal line of the plurality of first scanning signal lines,
the first light emission control transistor further has a control terminal connected to a corresponding power supply control line of the plurality of power supply control lines,
the second light emission control transistor further has a control terminal connected to a corresponding light emission control line of the plurality of light emission control lines, and
the scanning-side drive circuit drives the plurality of power supply control lines in such a manner that, in the drive period, each power supply control line of the plurality of power supply control lines is put in an inactivated state in a period during which a light emission control line, of the plurality of light emission control lines, corresponding to a pixel circuit, of the plurality of pixel circuits, corresponding to the each power supply control line is in an inactivated state, the each power supply control line is in an inactivated state in a period in which a data voltage is written to the holding capacitor in a period during which the corresponding light emission control line is an inactivated state, and the each power supply control line is put in an activated state after the data voltage is written to the holding capacitor and before the corresponding light emission control line changes to an activated state.

13. The display device according to claim 11,
wherein the display portion further includes a plurality of data signal lines, a plurality of first scanning signal lines, a plurality of light emission control lines, a first power source line, and a second power source line,
the drive circuit includes
a data-side drive circuit configured to generate a plurality of data signals and apply the plurality of data signals to the plurality of data signal lines, and
a scanning-side drive circuit configured to selectively drive the plurality of first scanning signal lines and selectively inactivate the plurality of light emission control lines according to a predetermined light emission duty,
each pixel circuit of the plurality of pixel circuits corresponds to one of the plurality of data signal lines, corresponds to one of the plurality of first scanning signal lines, and corresponds to one of the plurality of light emission control lines, the drive transistor is a P-channel transistor, with the first conduction terminal being connected to a corresponding data signal line of the plurality of data signal lines via the write control transistor and connected to the first power source line via the first light emission control transistor and the second conduction terminal being connected to a first terminal of the display element via the second light emission control transistor, a second terminal of the display element is connected to the second power source line, the write control transistor further has a control terminal connected to a corresponding first scanning signal line of the plurality of first scanning signal lines, the first light emission control transistor further has a control terminal connected to a predetermined succeeding light emission control line, the second light emission control transistor further has a control terminal connected to a corresponding light emission control line of the plurality of light emission control lines, the scanning-side drive circuit drives the plurality of light emission control lines in such a manner that, in the drive period, each light emission control line of the plurality of light emission control lines is in an activated state for only a bias active period provided after writing of data voltage to the holding capacitor in a non-light emission period of the display element for a pixel circuit, of the plurality of pixel circuits, corresponding to the each light emission control line, and the predetermined succeeding light emission control line is, for the each pixel circuit, a light emission control line selected, from among light emission control lines inactivated after a corresponding light emission control line of the plurality of light emission control lines, in such a manner that a bias active period during which the corresponding light emission control line is in an activated state in the non-light emission period of the display element and a bias active period during which the predetermined succeeding light emission control line is in an activated state in the non-light emission period do not overlap.

14. The display device according to claim 1, wherein the bias applying circuit includes a bias applying capacitor, and has the first terminal connected to the second terminal via the bias applying capacitor, each pixel circuit of the plurality of pixel circuits is configured in such a manner that, from among signals provided to a control terminal of a transistor in a pixel circuit other than the each pixel circuit, a signal that can change, via the bias applying capacitor, a voltage of the first conduction terminal of the drive transistor to a direction in which the drive transistor is turned on, in a period in the drive period from when the threshold compensation transistor changes to OFF state to when the light emission control transistor changes to ON state is provided to the first terminal of the bias applying circuit.

15. The display device according to claim 14, wherein the display portion further includes a plurality of data signal lines, a plurality of first scanning signal lines, a plurality of light emission control lines, a first power source line, and a second power source line, the drive circuit includes a data-side drive circuit configured to generate a plurality of data signals and apply the plurality of data signals to the plurality of data signal lines, and a scanning-side drive circuit configured to selectively drive the plurality of first scanning signal lines and selectively inactivate the plurality of light emission control lines, each pixel circuit of the plurality of pixel circuits corresponds to one of the plurality of data signal lines, corresponds to one of the plurality of first scanning signal lines, and corresponds to one of the plurality of light emission control lines, the at least one light emission control transistor includes a first light emission control transistor and a second light emission control transistor each further having a control terminal connected to a corresponding light emission control line of the plurality of light emission control lines, the write control transistor further has a control terminal connected to a corresponding first scanning signal line of the plurality of first scanning signal lines, the first conduction terminal of the drive transistor is connected to a corresponding data signal line of the plurality of data signal lines via the write control transistor, connected to the first power source line via the first light emission control transistor, and connected to a predetermined succeeding light emission control line via the bias applying capacitor, the second conduction terminal of the drive transistor is connected to a first terminal of the display element via the second light emission control transistor, a second terminal of the display element is connected to the second power source line, and the predetermined succeeding light emission control line is a light emission control line, for the each pixel circuit, selected from among light emission control lines that are put in an inactivated state after a corresponding light emission control line of the plurality of light emission control lines, the predetermined succeeding light emission control line being configured to change a voltage in such a manner that a voltage of the first conduction terminal of the drive transistor changes, via the bias applying capacitor, to a direction in which the drive transistor is turned on, in a period in the drive period from when the threshold compensation transistor changes to OFF state to when the first light emission control transistor changes to ON state.

16. The display device according to claim 1, wherein the bias applying circuit includes a bias applying capacitor, and has the first terminal is connected to the second terminal via the bias applying capacitor, each pixel circuit of the plurality of pixel circuits is configured in such a manner that a first scanning signal to be provided to a control terminal of the write control transistor in the each pixel circuit is provided to the first terminal of the bias applying circuit, and the drive circuit generates the first scanning signal to be provided to the write control transistor in the each pixel circuit such that, in the each pixel circuit, the first scanning signal is active in a writing period in which a data voltage is written to the holding capacitor and is active in a period after the writing period during which the threshold compensation transistor is in OFF state, and such that a voltage of the first conduction terminal of the drive transistor changes to a direction in which the drive transistor is turned on, by the first scanning signal changing to being non-active before the light emission control transistor changes to ON state, in the drive period.

17. The display device according to claim 16, wherein the display portion further includes a plurality of data signal lines, a plurality of first scanning signal lines, a plurality of light emission control lines, a first power source line, and a second power source line, the drive circuit includes a data-side drive circuit configured to generate a plurality of data signals and apply the plurality of data signals to the plurality of data signal lines, and a scanning-side drive circuit configured to selectively drive the plurality of first scanning signal lines and selectively inactivate the plurality of light emission control lines, each pixel circuit of the plurality of pixel circuits corresponds to one of the plurality of data signal lines, corresponds to one of the plurality of first scanning signal lines, and corresponds to one of the plurality of light emission control lines, the at least one light emission control transistor includes a first light emission control transistor and a second light emission control transistor each further having a control terminal connected to a corresponding light emission control line of the plurality of light emission control lines, the write control transistor further has a control terminal connected to a corresponding first scanning signal line of the plurality of first scanning signal lines, the first conduction terminal of the drive transistor is connected to a corresponding data signal line of the plurality of data signal lines via the write control transistor, connected to the first power source line via the first light emission control transistor, and connected to the corresponding first scanning signal line via the bias applying capacitor, the second conduction terminal of the drive transistor is connected to a first terminal of the display element via the second light emission control transistor, a second terminal of the display element is connected to the second power source line, in each pixel circuit of the plurality of pixel circuits, a corresponding first scanning signal line of the plurality of first scanning signal lines is connected to the first terminal of the bias applying circuit, and the scanning-side drive circuit drives the plurality of first scanning signal lines such that each first scanning signal line of the plurality of first scanning signal lines is in a select state in a writing period in which a data voltage is written to the holding capacitor in a pixel circuit, of the plurality of pixel circuits, corresponding to the each first scanning signal line and is in a select state in a period after the writing period during which the threshold compensation transistor is in OFF state, and such that a voltage of the first conduction terminal of the drive transistor changes to a direction in which the drive transistor is turned on, by the each first scanning signal line changing to a non-select state before a corresponding light emission control signal of the plurality of light emission control signals changes to an activated state.

18. A method for driving a display device using a display element driven by a current, the display device including a display portion including a plurality of pixel circuits, each pixel circuit of the plurality of pixel circuits including a display element configured to be driven by a current, a drive transistor provided in series with the display element and having a control terminal, a first conduction terminal, and a second conduction terminal, a holding capacitor having one terminal connected to the control terminal of the drive transistor and thus being configured to hold a voltage of the control terminal of the drive transistor, a write control transistor, as a switching element, having a first conduction terminal configured to receive a data voltage to be written to the holding capacitor and a second conduction terminal connected to the first conduction terminal of the drive transistor, a threshold compensation transistor, as a switching element, provided between the second conduction terminal and the control terminal of the drive transistor, the threshold compensation transistor being configured to put the drive transistor in a diode-connected state when in ON state, at least one light emission control transistor, as a switching element, provided in series with the display element and the drive transistor, and a bias applying circuit configured to apply, to the first conduction terminal of the drive transistor, a bias voltage for reducing threshold voltage shift caused by a hysteresis characteristic of the drive transistor, the method comprising:

pause driving in which the plurality of pixel circuits is driven in such a manner that a drive period and a pause period alternately appear, the drive period consisting of one or more refresh frame periods in which voltage of a plurality of data signals is written, as data voltage, to the plurality of pixel circuits, the pause period consisting of one or more non-refresh frame periods in which writing of data voltage to the plurality of pixel circuits is stopped, the pause driving including performing light emission control to turn the light emission control transistor on and off in such a manner that the display element emits light at a predetermined light emission duty in the drive period and the display element emits light at a predetermined light emission duty in the pause period; and performing bias application to drive the plurality of pixel circuits in such a manner that, in both the drive period and the pause period, in the each pixel circuit, the bias voltage is applied to the first conduction terminal of the drive transistor in a period during which the light emission control transistor is in OFF state, wherein the bias application includes drive period bias application to drive the plurality of pixel circuits in such a manner that, in the drive period, in the each pixel circuit, in a period during which the light emission control transistor is in OFF state, the write control transistor and the threshold compensation transistor are put in ON state for a predetermined period, and during a bias period provided from when the threshold compensation transistor changes to OFF state to when the light emission control transistor changes to ON state, the bias applying circuit applies the bias voltage to the first conduction terminal of the drive transistor.

19. The display device according to claim 1, wherein the display control circuit is configured to control the drive circuit in such a manner that in the drive period, in the each pixel circuit, in a period during which the light emission control transistor is in OFF state, the write control transistor and the threshold compensation transistor are put in ON state for a predetermined period and thereafter change to OFF state, and during a bias period provided from when the threshold compensation transistor changes to OFF state to when the light emission control transistor changes to ON state, the bias applying circuit applies the bias voltage, based on a voltage or a signal received at the first terminal, to the first conduction terminal of the drive transistor.

20. The method according to claim 18, wherein the bias application includes drive period bias application to drive the plurality of pixel circuits in such a manner that, in the drive period, in the each pixel circuit, in a period during which the light emission control transistor is in OFF state, the write control transistor and the threshold compensation transistor are put in ON state for a predetermined period and thereafter change to OFF state, and during a bias period provided from when the threshold compensation transistor changes to OFF state to when the light emission control transistor changes to ON state, the bias applying circuit applies the bias voltage to the first conduction terminal of the drive transistor.

* * * * *